(12) United States Patent
Yoshino

(10) Patent No.: US 6,618,504 B1
(45) Date of Patent: Sep. 9, 2003

(54) BUSINESS MANAGEMENT SYSTEM

(75) Inventor: Eiko Yoshino, Tokyo (JP)

(73) Assignee: Toho Business Management Center, Tokyo (JP)

( * ) Notice: Subject to any disclaimer, the term of this patent is extended or adjusted under 35 U.S.C. 154(b) by 0 days.

(21) Appl. No.: 09/101,387

(22) PCT Filed: Nov. 13, 1997

(86) PCT No.: PCT/JP97/04140
§ 371 (c)(1),
(2), (4) Date: Jul. 15, 1998

(87) PCT Pub. No.: WO98/22898
PCT Pub. Date: May 28, 1998

(30) Foreign Application Priority Data

Nov. 15, 1996 (JP) .............................................. 8-305118

(51) Int. Cl.$^7$ ............................ G06K 9/46; G06K 9/00; G06K 11/06; G08C 21/00

(52) U.S. Cl. ....................... 382/187; 382/209; 382/188; 178/20.01; 178/190.01; 178/18.03; 178/18.01

(58) Field of Search ................................. 382/180, 181, 382/187, 186, 188, 189, 309, 119, 209, 217, 218, 219, 220, 224, 228, 229; 178/18.01, 18.03, 19.01, 20.01; 345/773, 779, 716, 782, 719; 235/380, 382

(56) References Cited

U.S. PATENT DOCUMENTS

| 4,128,829 A | * | 12/1978 | Herbst et al. ............. 340/146.3 |
| 4,495,644 A | | 1/1985 | Parks et al. ..................... 382/3 |
| 4,833,312 A | | 5/1989 | Minematsu et al. ........ 235/379 |
| 5,150,420 A | * | 9/1992 | Haagushi .................... 382/187 |
| 5,215,397 A | * | 6/1993 | Taguchi et al. ............. 401/194 |

(List continued on next page.)

FOREIGN PATENT DOCUMENTS

| EP | 0 532 200 A2 | 3/1993 |
| EP | 0 690 368 A2 | 1/1996 |
| EP | 0690368 A2 | 1/1996 |

(List continued on next page.)

OTHER PUBLICATIONS

Patent Abstracts of Japan; Publication No. 59–165187; Date of Publication—Sep. 18, 1984.
Patent Abstracts of Japan; Publication No. 03–088086; Date of Publication—Apr. 12, 1991.
Patent Abstracts of Japan; Publication No. 64–091288; Date of Publication—Apr. 10, 1989.
Patent Abstracts of Japan; Publication No. 09–091382; Date of Publication—Apr. 4, 1997.
Patent Abstracts of Japan; Publication No. 63–206881; Date of Publication—Aug. 26, 1988.
Patent Abstracts of Japan; Publication No. 03–166677; Date of Publication—Jul. 18, 1991.

(List continued on next page.)

Primary Examiner—Bhavesh Mehta
Assistant Examiner—Yosef Kassa
(74) Attorney, Agent, or Firm—Rosenthal & Osha L.L.P.

(57) ABSTRACT

A reading apparatus (10) comprising means for detecting pen point coordinate changes over time, for handwriting made by pen on writing media, and means for generating handwriting data indicating those coordinate changes for each writing medium, a character recognition apparatus (2) for performing character recognition on handwriting data, and a business processing apparatus (4) for executing business processing in response to recognized character strings are provided. Handwritten particulars entered on vouchers are immediately subjected to character recognition, and used in business management, and handwritten vouchers can also be preserved. Accordingly, the redundant work involved in entering handwritten particulars again to a computer can be reduced, input errors can be prevented, and processing can be done speedily.

40 Claims, 50 Drawing Sheets

U.S. PATENT DOCUMENTS

| | | | | |
|---|---|---|---|---|
| 5,297,202 A | * | 3/1994 | Kapp et al. | 380/9 |
| 5,347,477 A | | 9/1994 | Lee | 364/709.11 |
| 5,444,192 A | | 8/1995 | Shetye et al. | 178/18 |
| 5,479,530 A | * | 12/1995 | Nair et al. | 382/119 |
| 5,544,255 A | | 8/1996 | Smithies et al. | 382/119 |
| 5,559,895 A | | 9/1996 | Lee et al. | 382/119 |
| 5,587,560 A | * | 12/1996 | Crooks et al. | 178/18 |
| 5,592,565 A | * | 1/1997 | Shojima et al. | 382/185 |
| 5,799,107 A | * | 8/1998 | Fukuchi | 382/181 |
| 5,982,928 A | * | 11/1999 | Shimada et al. | 382/187 |
| 6,055,333 A | * | 4/2000 | Fuzik et al. | 382/187 |

FOREIGN PATENT DOCUMENTS

| | | |
|---|---|---|
| GB | 2 234 102 A | 1/1991 |
| JP | 50-98621 | 8/1975 |
| JP | 57-161960 | 10/1982 |
| JP | 58-163081 | 9/1983 |
| JP | 59-135570 | 8/1984 |
| JP | 59-165187 | 9/1984 |
| JP | 61-153787 | 7/1986 |
| JP | 61-182184 | 8/1986 |
| JP | 62-256164 | 11/1987 |
| JP | 63-206881 | 8/1988 |
| JP | 64-73461 | 3/1989 |
| JP | 64-91288 | 4/1989 |
| JP | 01-251271 | 10/1989 |
| JP | 2-311976 | 12/1990 |
| JP | 3-18986 | 1/1991 |
| JP | 3-88086 | 4/1991 |
| JP | 3-166677 | 7/1991 |
| JP | 3-186967 | 8/1991 |
| JP | 04-088488 | 3/1992 |
| JP | 04-251395 | 9/1992 |
| JP | 4-346196 | 12/1992 |
| JP | 04-372090 | 12/1992 |
| JP | 05-020339 | 1/1993 |
| JP | 5-94564 | 4/1993 |
| JP | 5-128129 | 5/1993 |
| JP | 5-191554 | 7/1993 |
| JP | 5-282482 | 10/1993 |
| JP | 06-019605 | 1/1994 |
| JP | 6-89295 | 3/1994 |
| JP | 06-119494 | 4/1994 |
| JP | 6-208631 | 7/1994 |
| JP | 6-236389 | 8/1994 |
| JP | 06-236457 | 8/1994 |
| JP | 6-324797 | 11/1994 |
| JP | 6-332861 | 12/1994 |
| JP | 7-29005 | 1/1995 |
| JP | 7-57123 | 3/1995 |
| JP | 7-98740 | 4/1995 |
| JP | 7-107697 | 11/1995 |
| JP | 7-113954 | 12/1995 |
| JP | 08-007043 | 1/1996 |
| JP | 08-036620 | 2/1996 |
| JP | 8-137800 | 5/1996 |
| JP | 8-186672 | 7/1996 |
| JP | 08-272909 | 10/1996 |
| JP | 8-292711 | 11/1996 |
| JP | 8-297713 | 11/1996 |
| JP | 9-81653 | 3/1997 |
| JP | 09-062780 | 3/1997 |
| JP | 9-91382 | 4/1997 |
| JP | 9-101992 | 4/1997 |
| JP | 09-114926 | 5/1997 |
| JP | 9-171528 | 6/1997 |
| JP | 09-198466 | 7/1997 |

OTHER PUBLICATIONS

Patent Abstracts of Japan; Publication No. 05–282482; Date of Publication—Oct. 29, 1993.

Patent Abstracts of Japan; Publication No. 03–018986; Date of Publication—Jan. 28, 1991.

Patent Abstracts of Japan; Publication No. 58–163081; Date of Publication—Sep. 27, 1983.

Patent Abstracts of Japan; Publication No. 09–198466; Date of Publication—Jul. 31, 1997.

Patent Abstracts of Japan; Publication No. 08–007043; Date of Publication—Jan. 12, 1996.

Patent Abstracts of Japan; Publication No. 08–272909; Date of Publication—Oct. 18, 1996.

Patent Abstracts of Japan; Publication No. 01–251271; Date of Publication—Oct. 6, 1989.

Patent Abstracts of Japan; Publication No. 09–062780; Date of Publication—Mar. 7, 1997.

Patent Abstracts of Japan; Publication No. 04–088488; Date of Publication—Mar. 23, 1992.

Patent Abstracts of Japan; Publication No. 04–251395; Date of Publication—Sep. 7, 1992.

Patent Abstracts of Japan; Publication No. 06–119494; Date of Publication—Apr. 28, 1994.

Patent Abstracts of Japan; Publication No. 06–236457; Date of Publication—Aug. 23, 1994.

Patent Abstracts of Japan; Publication No. 06–019605; Date of Publication—Jan. 28, 1994.

Patent Abstracts of Japan; Publication No. 61–182184; Date of Publication—Aug. 14, 1986.

Patent Abstracts of Japan; Publication No. 05–020339; Date of Publication—Jan. 29, 1993.

Patent Abstracts of Japan; Publication No. 57–161960; Date of Publication—Oct. 5, 1982.

Patent Abstracts of Japan; Publication No. 03–186967; Date of Publication—Aug. 14, 1991.

"Character Recognition: Sensoring the input", Data Processing, vol. 18, No. 2, May 1976.

European Search Report dated Dec. 21, 1999.

"Sensoring the input", Data Processing, vol. 18, No. 2, Mar. 1976, p. 16; IPC Press Ltd. London, GB.

Patent Abstracts of Japan, Publication No. 06162120, Publication Date Jun. 10, 1994, 1 page.

Patent Abstracts of Japan; Publication No. 06236289; Date of Publication—Aug. 23, 1994.

Patent Abstracts of Japan; Publication No. 06324797; Date of Publication—Nov. 25, 1994.

Patent Abstract; Publication No. 61–153787; Date of Publication—Jul. 12, 1986.

Patent Abstract; Publication No. 50–98621; Date of Publication—Aug. 16, 1975.

Patent Abstract; Publication No. 2–311976; Date of Publication—Dec. 27, 1990.

Patent Abstract; Publication No. 5–94564; Date of Publication—Apr. 16, 1993.

Patent Abstracts of Japan; Publication No. 06089295; Date of Publication—Mar. 29, 1994.

Patent Abstract; Publication No. 4–346196; Date of Publication—Dec. 2, 1992.

Patent Abstracts of Japan; Publication No. 06208631; Date of Publication—Jul. 26, 1994.

Patent Abstract; Publication No. 59–135570; Date of Publication—Aug. 3, 1984.

Patent Abstract; Publication No. 62–256164; Date of Publication—Nov. 7, 1987.

Patent Abstracts of Japan; Publication No. 08292711; Date of Publication—Nov. 5, 1996.

Patent Abstracts of Japan; Publication No. 08186672; Date of Publication—Jul. 16, 1996.
Patent Abstract; Publication No. 5-191554; Date of Publication—Jul. 30, 1993.
Patent Abstracts of Japan; Publication No. 07057123; Date of Publication—Mar. 3, 1995.
Patent Abstracts of Japan; Publication No. 07029005; Date of Publication—Jan. 31, 1995.
Patent Abstracts of Japan; Publication No. 07098740; Date of Publication—Apr. 11, 1995.
Patent Abstract; Publication No. 5-128129; Date of Publication—May 25, 1993.
Patent Abstract;Publication No. 64-73461; Date of Publication—Mar. 17, 1989.
Patent Abstracts of Japan; Publication No. 08137800; Date of Publication—May 31, 1996.
Patent Abstracts of Japan; Publication No. 06332861; Date of Publication—Dec. 2, 1994.
Patent Abstracts of Japan; Publication No. 61-249181; Date of Publication—Nov. 6, 1986.
International Search Report; International Application No. PCT/JP97/04140; Date of Mailing—Feb. 24, 1998.

\* cited by examiner

FIG.15

| PRODUCT NAME | QUANTITY | UNIT PRICE | AMOUNT |
|---|---|---|---|
| PRODUCT A | 30 | 150 | 450 |
| PRODUCT B | 11 | 13 | 143 |
| PRODUCT C | 50 | 50 | 2500 |

| INVENTORY CHECK TABLE | | | | NO. | 0120 3639 | |
|---|---|---|---|---|---|---|
| PRODUCT NAME | PRODUCT NUMBER | UNIT PRICE | INVENTORY QUANTITY | REVISED QUANTITY | | |
| A | 1012 | 10 | 542 | | ☑ | |
| B | 1013 | 5111 | 100 | | ☑ | |
| C | 2001 | 58 | 305 | 303 | ☑ | |
| | | | | | ☐ | |
| | | | | | ☐ | |

60a, 60b, 60c, 60, 60d

| MEETING CHECK SHEET | PERSON IN CHARGE | | | CHECK BOX |

PROCESS 1  DOCUMENT PREPARATION ☐

PROCESS 2  PRINT OUT  ☐ SETS ☐

PROCESS 3  FAX  ☐ CUSTOMER A  ☐ CUSTOMER B  ☐ CUSTOMER C  ☐

PROCESS 4  E-MAIL  ☐ CUSTOMER D  ☐ CUSTOMER E  ☐ CUSTOMER F  ☐

*Form 4c — Transfer Request Form*

Fields include: Recipient Bank, Branch; Receiving Party Name (Regular Account / Checking Account / Savings Account / Account Number, Phonetic Characters, MR/MS), Address; Requesting Party Name (Phonetic Characters, MR/MS), Address; Cancellation / Confirmation (40b); Transfer Amount (Millions / Thousands / Yen), Breakdown; Withdrawal Account, Withdrawal Amount; Your Registered Seal.

FIG.51

| | HEALTH INSURANCE DAY-WORKER HEALTH INSURANCE MARINER INSURANCE | | ( INSURED PERSON / DEPENDENT ) | | MEDICAL TREATMENT RECORD | |
|---|---|---|---|---|---|---|

NUMBER

| | INSURANCE CARD | EXPIRATION DATE | | PATIENT | NAME | | SEX | OFFICE | ADDRESS | |
|---|---|---|---|---|---|---|---|---|---|---|
| 6a | | SYMBOL | | | DATE OF BIRTH | DATE | | | NAME | |
| | | NUMBER | | | ADDRESS | | | INSURER | ADDRESS | |
| | NAME OF INSURED | | | | OCCU-PATION | RELATION-SHIP TO THE INSURED | | | NAME | |
| | QUALIFICATION DATE | DATE | | | | | | | | |

| NAME OF DISEASE OR INJURY | OCCUPA-TION | BEGAN | ENDED | TRANS-FERRED | NUMBER OF DAYS TREATED | SCHEDULED TERMINATION DATA |
|---|---|---|---|---|---|---|
| | UP/OUT | DATE | DATE | | DAYS | DATE |
| | UP/OUT | DATE | DATE | | DAYS | DATE |
| | UP/OUT | DATE | DATE | | DAYS | DATE |

| PREEXISTING CONDITIONS, CAUSES, MAJOR SYMPTOMS, ETC. | MEDICATION, SURGERY, TREATMENTS, ETC. |
|---|---|
| 6b | |
| | |

| NAME OF DISEASE OR INJURY | OPINION REGARDING UNFITNESS FOR WORK | | PERIOD OF HOSPITALIZATION |
|---|---|---|---|
| | PERIOD OF UNFITNESS FOR WORK ENTERED IN OPINION FORM | DATE OPINION DELIVERED | |
| 6c | BEGINNING DATE, ENDING DATE, NUMBER OF DAYS | DATE | BEGINNING DATE, ENDING DATE, NUMBER OF DAYS |
| | BEGINNING DATE, ENDING DATE, NUMBER OF DAYS | DATE | BEGINNING DATE, ENDING DATE, NUMBER OF DAYS |
| | BEGINNING DATE, ENDING DATE, NUMBER OF DAYS | DATE | BEGINNING DATE, ENDING DATE, NUMBER OF DAYS |

6d, 6e: DATE RECEIVED, DATE RETURNED

FIG.52

TREATMENT APPLICATION FORM

○ PLEASE DO NOT WRITE OUTSIDE OF HEAVY LINES

7a:

| NAME OF PATIENT | | DATE OF BIRTH | |
|---|---|---|---|
| ADDRESS | | | OCCUPATION |
| PLACE OF OCCUPATION | | | |

7b:

| HEALTH INSURANCE CARD | | | |
|---|---|---|---|
| SYMBOL | NUMBER | INSUREE NUMBER | EXPIRATION DATE |
| | | | |
| PUBLIC EXPENDITURE CLASSIFICATION | | | |
| | | | |
| CONTINUING INSURANCE CERTIFICATE-NAME OF DISEASE | | | |
| | | | |

7c:

| CANCELLATION | |
|---|---|
| CONFIRMATION | |

FIG.59
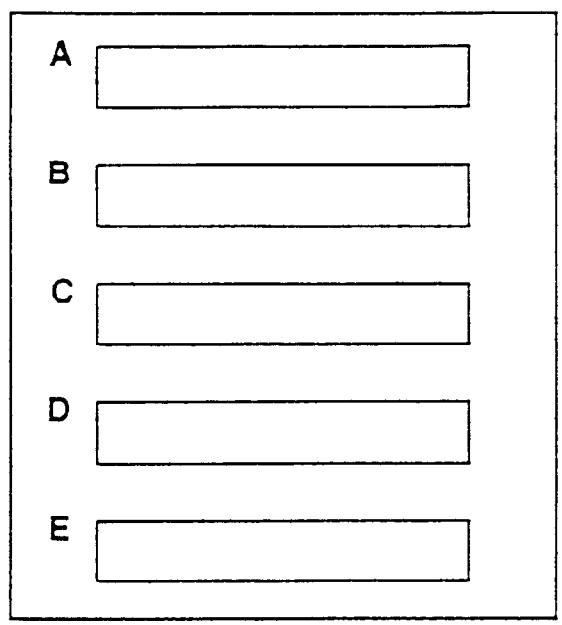
FIG.60
INPUT 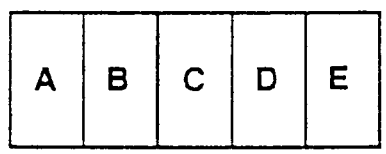 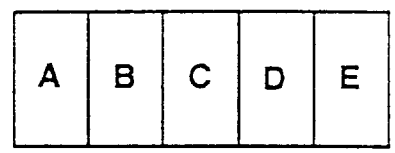
OUTPUT 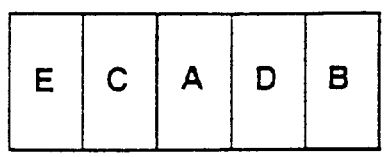 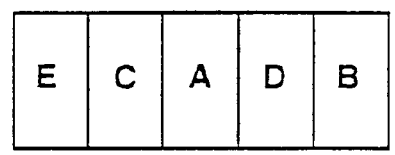

BUSINESS MANAGEMENT SYSTEM

TECHNICAL FIELD

This invention relates to a business management system for managing business in general by computer, and particularly to a business management system for performing input and control of accounting vouchers and other writing media.

BACKGROUND ART

The management of business by means of computers (hereinafter the management of business in general by computer is referred to as "business management") is quite advanced today. As always, however, vouchers, accounting documents, lists, and other forms (hereinafter referred to as "writing media") used in conducting business are indispensable. If data are input to computer, data can easily be totaled, decided on, printed, or otherwise processed. Nevertheless, writing media constitute the medium most frequently employed in conducting business activities. The reasons for this lie in the several outstanding qualities of paper. For example, paper has the property of immediateness, whereby, if one has paper and a writing instrument at hand, character information can be recorded at any time. Paper exhibits the property of portability; it is itself lightweight and convenient to carry about. Paper has the property of being universal, in that it does not require a power source. And paper exhibits the property of retainability and is suitable for storage because the character information written thereon does not readily disappear. Thus, because of these outstanding properties of paper, no matter how efficient computer-based business operations become in the future, it is most unlikely that writing media should ever cease to be used in business activities.

Where business activities are actually conducted, when a product is ordered, for example, an order voucher is used on which the product name, quantity, and delivery destination, etc., are written. This order voucher on which necessary items are written is sent to the manufacturer or wholesaler. At the office of the manufacturer or wholesaler, a purchase voucher is prepared, according to the order voucher. In cases where the order is placed by telephone from a sales office or sales counter to a retail store, the purchase voucher is generated directly at the retail store. In other words, an operator in the retail store uses a purchase voucher for the purpose of recording the particulars communicated over the telephone.

When sales are managed by computer, on the other hand, data entry is performed again, to inform the computer of the data, based on vouchers on which character information is written as described above. At the retail store which takes the order and does the product delivery processing, for example, an operator in the retail store keys in information based on the purchase voucher that was prepared on the bases of a telephone conversation.

Vouchers and accounting documents are also widely used in accounting operations within a company. For example, necessary information is written by hand to accounting vouchers based on such original accounting documents as delivery statements, receipts, and invoices. When accounting processes are performed by a computer-based management system, the particulars written by hand on the accounting vouchers must again be entered from a keyboard to the computer system. The management system thereupon produces accounting documents based on the data so entered.

When stocktaking is performed in conducting inventory management, an inventory list output by a computer is carried to the warehouse, and the quantities of products actually counted are written alongside the inventory quantities printed on the inventory list. This inventory list is then returned and the inventory quantities controlled by computer are updated.

When a questionnaire survey is conducted, a surveyor asks questions of passersby and writes their answers onto a questionnaire form. These questionnaire forms are later collected and totals are produced by an operator using a computer.

In all kinds of business management operations besides these—whether it be the processing of transactions at a store, the processing of teller transactions at a bank, or the entry and processing of medical information at a hospital—vouchers, lists, and other writing media are used.

Thus, in a conventional business management system, a worker writes down information deemed necessary to that business on a specified writing medium, and this information is subsequently reentered into a computer. That is what usually happens.

Conventional business management systems, however, present various problems, as noted below.

In the first place, intricate operations are required for performing keyboard data entry. In a conventional data management system, information written by hand on writing media must be entered to a computer from a keyboard. In other words, the keyboard entry must be performed by hand, placing a large work burden on the operator. In the second place, there is a danger that erroneous data will be entered when keying data in. So long as the keyboard entries are made by hand, the possibility of data entry errors occurring will always exist. Such data entry errors can become an enormous problem in such business management operations as those described in the foregoing. In the event that the product quantity written on an order voucher is entered improperly, for example, the wrong quantity of product will be delivered. Or if the money amount written on an original accounting document is entered incorrectly, the accounting will be in error.

In the third place, rapid business management is very difficult. Character information written down on writing media must be input to a computer by keyboard entry. In other words, even though the character information is written down on the writing media, etc., those characters cannot be immediately processed by computer. For this reason, accounting cannot be done so that daily settlements are performed, wherefore settlements are only performed several days behind. In the processing of orders and purchases, moreover, product deliveries are sometimes delayed.

In conventional inventory management, for example, a number of operations requiring human intervention are necessary for the purpose of correcting data, including the operation of outputting an inventory list from a computer beforehand, the operation of writing information to that output inventory list, and the operation of reentering data into the computer based on the annotated inventory list.

In conventional questionnaire surveys, moreover, the operation of writing information on questionnaire forms and the operation of entering that information, based on those questionnaire forms, into a computer are necessary. Also, the responses to the questionnaire, and the results of totaling those responses, are not known until a later date, making it impossible to provide any kind of immediate feedback to the survey subjects.

In conventional ticket sales, a person wishing to purchase a ticket must appear in person at a reservation center. Even if the reservation is made by telephone, one must perform a reservation operation by telephone, based on information gathered by oneself. Thus it is not possible to select and purchase tickets conveniently, as when buying items at a local convenience store.

Needless to say, moreover, even when the problems noted in the foregoing are resolved, some degree of security must be maintained.

DISCLOSURE OF THE INVENTION

A first object of the present invention, that having been devised with the foregoing problems in view, is to provide a business management system wherewith, by providing a configuration capable of directly entering written information into a computer, the operation of again entering the character information on the writing media, to the computer, can be eliminated, wherefore, business can be made more efficient, keyboard entry errors can be prevented, and rapid processing is facilitated.

A second object of the present invention is to provide a business management system wherewith, by providing a configuration combining both time information and written information, irregular operations such as data alteration can be prevented.

A third object of the present invention is to provide a business management system wherewith, by providing a configuration capable of reading certification information, it is possible to recognize and reject improper writing media and irregular vouchers.

A fourth object of the present invention is to provide a business management system wherewith, by providing a configuration capable of reading handwriting, it is possible to make all kinds of business more efficient, even at indoor or outdoor locations where there are no communications lines available.

A fifth object of the present invention is to provide a business management system wherewith, by providing a configuration capable of displaying responses to written particulars, indoors or outdoors, response information required on site can be rapidly provided.

A sixth object of the present invention is to provide a business management system wherewith, by providing a configuration capable of making corrections even when writing media are not positioned properly, writing is possible without being concerned with the position in which the writing media are loaded.

A seventh object of the present invention is to provide a business management system wherewith, by providing a configuration capable of accessing character information from handwriting on writing media, character information on writing media can be correctly and efficiently recognized.

An eighth object of the present invention is to provide a business management system wherewith, by providing a configuration capable of reading deletions and corrections made to the written content on writing media, the correct information can be recognized even when deletions and corrections have been made in the written content.

A ninth object of the present invention is to provide a business management system wherewith, by providing a configuration wherewith writing media can be designed, it is possible to design writing media of any desired form.

A tenth object of the present invention is to provide a business management system suitable for handling complaints in terms of business processing.

An 11th object of the present invention is to provide a business management system suitable for handling inventory management in terms of business processing.

A 12th object of the present invention is to provide a business management system suitable for handling office operations in terms of business processing.

A 13th object of the present invention is to provide a business management system suitable for the management of bids in terms of business processing.

A 14th object of the present invention is to provide a business management system suitable for the management of scoring in terms of business processing.

A 15th object of the present invention is to provide a business management system suitable for handling ticket sales in terms of business processing.

A 16th object of the present invention is to provide a business management system suitable for managing transactions using credit cards and the like in terms of business processing.

A 17th object of the present invention is to provide a business management system suitable for managing teller transactions at a bank or the like in terms of business processing.

An 18th object of the present invention is to provide a business management system suitable for managing medical information entry at a hospital or the like in terms of business processing.

The business management system of the present invention comprises: a reading apparatus comprising: means for detecting pen point coordinates, for handwriting made by pen on writing media; means for generating handwriting data indicating coordinate changes with the passage of time for a pen point, for each writing medium; and transmission means for transmitting handwriting data; a character recognition apparatus for performing character recognition based on the handwriting data; and a business processing apparatus for performing required business processing in response to recognized character strings.

Here, for the sending and receiving of data between the reading apparatus and the character recognition apparatus, various kinds of data communications means can be used. In addition to general-purpose communications with RS-232C equipped personal computers, for example, usable communications modes include infrared communications, data transfers employing memory media such as IC cards, data communications conducted over subscriber networks using modems or terminal adapters, etc., and communications using PHSs or other portable data communications equipment.

The writing media in view include various kinds of vouchers used in business or in dealing with customers, such as for making or taking orders, for making purchases, for applications, for estimates, for questionnaires, for marketing, for handling complaints, for verifying deliveries, for managing construction operations, for managing clients, and for advertisements, etc., writing media used in offices or factories for reporting employee attendance, for making deposits and withdrawals, for inventory lists, for sales reports, for material utilization reports, and for production process reports, etc., and vouchers or accounting documents used in special operations, such as for police investigations, for police box reports, for handling traffic violations, for citation forms, for hospital records, for diagnostic reports, for test reports, for reports on on-site construction workers, for equipment shipment reports, for material procurement reports, for progress reports, for automobile maintenance checks, for moving expense estimates, for articles being moved, for vending machine product replenishment reports, and for sales collection reports, etc. Recognized characters and recognized character strings refer to those characters or character strings that handwriting data are recognized as indicating. Characters include numerals, English and other foreign alphabetical characters, Japanese characters (hiragana and katakana), Chinese characters (Kanji), and special characters such as ○, Δ, (, and [, as well as special marks and other figures.

Further, there is no need for detection of handwriting data by the reading apparatus and character recognition by the character recognition apparatus to be conducted simultaneously. If one wishes to read the handwriting of a writer by means of the reading apparatus, and subsequently subject that to character recognition, the handwriting data need only be sent to the character recognition apparatus.

Also, it is not necessary for the reading apparatus and the character recognition apparatus to be separate devices. All that is required is that the configuration and functions of these two apparatuses be provided together, and that it be possible to read the handwriting and to perform character recognition thereon.

In the present invention, it is to be preferred that the reading apparatus be provided with means for generating, when handwriting data are being generated, timing as required for time stamp data indicting the time that the handwriting data were generated, and that the transmission means send those time stamp data together with the handwriting data.

The reason for this is that, if the handwriting data have been written and generated properly, then the times indicated by the time stamp data will be continuous, whereas, if they have been written improperly, then the times indicated by the time stamp data will be discontinuous. It is further to be desired that the reading apparatus comprise means also for generating both data for identifying the reading apparatus and other additional information, and that the transmission means send this additional information together with the handwriting data, so that, by means of such additional information, certification accuracy can be further enhanced.

It is also preferable that the reading apparatus be equipped with means for assimilating such images as seals and signatures affixed to the writing media, and generating image data therefrom, and that the transmission means send these image data together with the handwriting data. Thus certification accuracy can be even further improved. By seal is primarily meant seal imprints or thumbprints, etc., made on the actual writing media set in the reading apparatus.

The transmission means in the reading apparatus of the present invention comprise an output circuit for outputting data, inclusive of handwriting data, in conformity with a prescribed bus standard, and input/output slot or slots configured so that it is possible to output the data, inclusive of handwriting data, output from the output circuit. The input/output slot or slots are configured so that portable information communications equipment capable of radio-communicating the data, inclusive of handwriting data, can be attached thereto. Portable data communications equipment includes portable telephones, PHSs (personal handyphone systems), pagers, teleterminals, and equipment used in conjunction with MMAC and other types of radio data communications services. It is preferable that such equipment be capable of connection to a PC bus or the like, and that the input/output slot or slots and output circuit conform to bus standards usable with portable telephones or PHSs. Insofar as it is portable and capable of sending the handwriting data (which are digital data), a commercial radio, transceiver, or other portable data communications equipment may be used.

The present invention also comprises selection means by which a writer may select one writing medium from among a plurality of types of writing media. The transmission means transmit style definition data for specifying the writing medium selected by the user using the selection means.

The style definition data comprise data configurations for defining entry columns according to the writing medium type (delivery voucher, purchase voucher, invoice, bill, etc.). If the writing medium is an order voucher, for example, there might be entry columns for a date, maker, product name, product number, quantity, unit cost, total, writing medium number, signature, and seal, etc. The style definition data specifies, for each entry column, the number of lines, character type, whether to perform character recognition or not, and the relative positioning of the entry columns on the voucher.

It is preferable, here, that the reading apparatus further comprise reception means for receiving data sent from the outside, and character display means for displaying characters based on the data received by the reception means. Thereupon, not only can data, inclusive of handwriting data, be transmitted from the reading apparatus, but characters can also be displayed based on data coming from business processing equipment, thereby contributing to business efficiency. In the reading apparatus, for example, means for detecting pen point coordinates might comprise a pen for outputting the prescribed signals, and a digitizer for receiving the signals output from the pen.

It is further to be desired that the reading apparatus comprise a memory circuit configured so that it can store data, inclusive of handwriting data, for a plurality of writing media, and that the transmission means send the data, inclusive of a plurality of handwriting data, stored in the memory circuit, in batches to the character recognition apparatus. There is then no need to continually communicate, because data containing a plurality of handwriting data can be transmitted, which is more efficient.

The character recognition apparatus comprises means for identifying the writing medium format used, on the basis of the data which specify the writing medium selected by the user, sent from the reader apparatus, and means for performing character recognition based on the style definition data which specify the identified writing medium format.

It is to be desired here that the character recognition apparatus comprise means for detecting the positions of writing relative to the reading apparatus, based on data inclusive of handwriting data, and means for determining the positions of writing media relative to the reading apparatus, based both on the style definition data which specify the writing medium format of the writing media on which handwriting is written, and on the relative positions of the writing relative to the reading apparatus.

In other words, the handwriting data generated by the reader constitute time functions for the coordinate data which indicate the relative positions of the handwriting, wherefore the relative positions between the reading apparatus and the writing are known from the handwriting data. Meanwhile, the shape of the writing medium and positions of the entry columns are also known, from the style definition data. Even if, for example, the writing medium is written to without being placed in the proper position in the reading apparatus, when the writing medium is moved to the position where character strings recognized from the handwriting data fit into the entry columns in the writing medium, that position represents the relative position between the actual position of the writing medium and the standard position on the reading apparatus.

It is further to be desired that means for detecting the relative positions of writing detect positions relative to the reading apparatus for handwriting entered into a plurality of mandatory entry columns which are always to be filled in, and that means for determining the relative position of the writing medium determine the orientation of the writing medium relative to the reading apparatus, based on the position of the writing entered into the mandatory entry columns, relative to the reading apparatus. The reason for this is that, since there is a plurality of mandatory entry columns, if the positions of a plurality of mandatory entry columns are determined, the placement of the writing medium itself is also determined.

It is further to be desired that the character recognition apparatus comprise correction means for correcting positional misalignments of writing media relative to the reading apparatus, based on the relative positions of the writing and the relative position of the writing medium, in relationship to the reading apparatus. The reason for this is that, ordinarily, it is rare that a writing medium will be correctly positioned by hand relative to the reading apparatus. Thus, by having positioning corrections made, it is no longer necessary to be careful about the position in which a writing medium is loaded.

It is further desirable that the correction means of the character recognition apparatus detect inclinations in the writing medium, based on the relative position of the writing and the relative position of the writing medium, in relationship to the reading apparatus, and that the correction means correct the inclination of the writing medium. The reason for this is that, ordinarily, it is rare for a writing medium to be placed at the proper angle by hand relative to the reading apparatus. Thus, by having the angle corrected, it is no longer necessary to be careful about the angle at which the writing medium is loaded. In the present invention, the character recognition apparatus comprises means for segregating characters, symbols, figures, and character and symbol groups comprising character strings representing handwriting data sent from the reading apparatus, and means for recognizing those segregated characters, symbols, figures, and character and symbol groups and converting them to recognized character strings made up of character codes.

The characters noted on the writing media will be written in simplified or run-on form, wherefore, by segregating the characters, they can be resolved into recognition units of single characters, for example, so that character recognition is made easy.

Here, it is to be desired that means for converting to recognized character strings, in the character recognition apparatus, recognize characters both by the results of character recognition based on image data reproduced from handwriting data, and by the results of character recognition based on direction elements that indicate the direction from one sampling point in the handwriting to the next sampling point therein. The reason for this is that, even in cases where the handwriting is done in simplified form, so that it is not possible to recognize what a character is from the image data alone, it will nevertheless be possible to understand what order the character was written in by referencing the direction elements, so that the character can in some cases still be recognized.

It is further to be desired that means for converting to recognized character strings, in the character recognition apparatus, recognize characters on the basis of the stroke count for each character, symbol, figure, or character or symbol group segregated by the means for segregating the characters, symbols, figures, and character and symbol groups. The reason for this is that, if recognizable candidate character groups are established, and associated with stroke counts, it is possible to raise the character recognition rate even though the characters are written in simplified form.

It is further to be desired that means for converting to recognized character strings, in the character recognition apparatus, recognize characters on the basis of the number of intersections found in each character, symbol, figure, or character or symbol group segregated by the means for segregating the characters, symbols, figures, and character and symbol groups. The reason for this is that, if recognizable candidate character groups are established, and associated with the numbers of intersections, it is possible to raise the character recognition rate even though the characters are written in simplified form.

It is further to be desired that means for converting to recognized character strings, in the character recognition apparatus, recognize characters on the basis of whether or not each character, symbol, figure, or character or symbol group segregated by the means for segregating the characters, symbols, figures, and character and symbol groups are contained within prescribed areas. The reason for this is that, if characters are written in prescribed areas, character size will be constant, making it possible to raise the character recognition rate.

In the present invention, means for converting to recognized character strings, in the character recognition apparatus, when it has detected, in a recognized character string, a character string wherein a predetermined special figure has been written superimposed thereupon, the recognition of the character string to which the special figure has been superimposed is disallowed.

If a symbol such as a double line has been drawn over a character, for example, then character strings deleted by such double lines can be removed from the recognized character string. The character string written over in this manner may consist of a single character or multiple characters.

It is further to be desired that means for converting to recognized character strings, in the character recognition apparatus, be configured so that, in cases where a character string having a predetermined special figure written superimposed thereupon is detected in a recognized character string, and another character string is recognized written alongside or above the original character string, recognition of the character string over which the special figure is written is disallowed, and, in its place, the character string written alongside or above is recognized and inserted into the recognized character string.

When a character string has a double line drawn over it, and revised characters are written above it, the revised characters are inserted in place of that character string deleted by the double line. It is not necessary, furthermore, that the overwritten character string and the character string added alongside or above have the same number of characters. These character strings may be made up of a single character or of multiple characters.

It is further to be desired that the character recognition apparatus comprise means for determining, in cases where it has been recognized that a predetermined type of characters, symbols, or figures have been written in prescribed columns on the writing medium, whether such writing medium should be deleted.

Prescribed columns might be provided at the four corners of a writing medium, for example, so that, when a large X is written across these prescribed columns in the four corners, it may be determined that this writing medium is to be deleted in its entirety.

It is further to be desired that the character recognition apparatus comprise means for determining, in cases where it has been recognized that a predetermined type of characters, symbols, or figures have been written in prescribed columns on the writing medium, that a recognized character string based on handwriting data written in a column associated with the prescribed column should be deleted.

In a writing medium concerning sales, for example, a square box might be provided as a prescribed column for one record comprising the product name, quantity, unit cost, and money amount, etc., next to the column for that record. If an X is marked in this square box, the recognized character string pertaining to that record will be deleted.

In the present invention, the character recognition apparatus recognizes character strings, writing medium by writing medium, taking handwriting data corresponding to each single writing medium as a unit, based on handwriting data units output respectively from a plurality of reading apparatuses.

This is well suited to processing vouchers and the like because handwriting data sent from multiple reading apparatuses are recognized writing medium by writing medium.

In the present invention, the character recognition apparatus comprises means for setting style definition data that specify the writing medium based on data inclusive of handwriting data sent from reading apparatuses connected to the character recognition apparatus, and means for transmitting the style definition data so set to the reading apparatuses. When a new writing medium format is designed, for example, the inputting party sets either an existing writing medium or a roughly represented writing medium in a reading apparatus. Thereupon, for a column which one wishes to input, for example, pen point coordinates are entered by pressing the pen on the diagonal line for that column. A writing medium design apparatus reads the pen point coordinates designated in the reading apparatus. Also, separately, attribute data for a designated area (input from some kind of input device) related to the area specified by the coordinates are stored in memory together with the coordinates for the column. Accordingly, by implementing these steps, style definition data can be designed for defining a new writing medium format.

It is to be desired, at this time, when multiple coordinates have been designated by data inclusive of handwriting data, that means for establishing the style definition data in the character recognition apparatus establish the range specified by the plurality of coordinates as one input column. The reason for this is so that, when designating a box, if the apex of the box is designated, then the placement and size of the input column can be determined without ambiguity. Means for establishing the style definition data in the character recognition apparatus are configured so that, when establishing one input column, the attributes therefor can be set also.

The business processing apparatus, moreover, takes, from among character strings recognized by the character recognition apparatus, character strings corresponding to one or to two or more predetermined columns in a writing medium, making these retrieval index data, comprises a database wherein are contained these index data, associated with data that include writing medium handwriting data, and, based on the index data, reads, writes, and performs retrieval operations on records contained in this database. Thus file management can be effected on the basis of the index data, without reading the handwriting data content, whereupon file operations can be performed at higher speed.

The character recognition apparatus, with respect to handwriting data output from a reading apparatus, disallows character recognition for prescribed areas of the writing media, and outputs the handwriting data contained in those areas, without modification, as image data, to the business processing apparatus. It is sufficient that it be possible to process data requiring no recognition as image data. The signature of an inputting party, for example, might be transmitted without alteration as handwriting data.

Based on the present invention, the business processing apparatus compares comparative handwriting data written in specified columns on the writing medium and output as is, after having character recognition by the character recognition apparatus disallowed, against pre-registered comparative handwriting data, and performs business processing based on the results of the comparison.

If the comparative handwriting data constitute the signature of the inputting party, for example, the signatures of persons qualified to handle the reading apparatuses might be stored in memory as the pre-registered handwriting data. The business processing apparatus compares the handwriting data transferred to it from a reading apparatus against the pre-registered handwriting data, and allows character recognition to be performed on writing media, or other processing, only when the compared data agree.

It is to be desired here that the comparison be performed with reference to the stroke order indicated in the handwriting data. It is also to be desired that such be performed with reference to the writing time indicated in the handwriting data.

It is further to be desired, at this time, that the business processing apparatus, when an authorization operation has been performed, indicating the authorization of the writing medium for the handwriting data subjected to character recognition by the character recognition apparatus, append seal print data verifying the fact that the writing medium has been authorized to the handwriting data at issue. The reason for this is that thereupon processing corresponding to ordinary examination and authorization processing can be implemented by this business management system.

It is further to be desired that the business processing apparatus permit the processing of handwriting data only when a code indicating that a writing medium authorization process has been performed for those handwriting data is added. The reason for this is to allow the examination and authorization to be verified using a code.

Based on the present invention, the business processing apparatus is configured so that it can identify the reading apparatus which is the processing object of that business processing apparatus, by pre-registering reading apparatus identification data. When a reading apparatus sends out an identifier code for itself, a decision is made whether to enable or disable business processing according as to whether or not the identifier code for that reading apparatus coincides with a pre-registered identifier code.

Based on the present invention, the business processing apparatus is configured so that it can identify users qualified to use a reading apparatus by pre-registering handwriting data for each user's signature. When a reading apparatus sends out handwriting data for the signature of a user wishing to use that reading apparatus, a decision is made to allow or disallow business processing depending on whether or not the user's handwriting matches pre-registered handwriting.

Based on the present invention, the business processing apparatus comprises means for sequentially reading time stamp data contained in the handwriting data, and means for performing prescribed processing on the writing medium at issue when the time indicated by the time stamp data so read indicates that a certain period of time has elapsed. If there is no continuity in the time information indicated by the time stamp data, it can then be determined that the writing was not done properly.

Means for performing the prescribed processing, in the business processing apparatus, might, for example, as that prescribed process, treat a certain writing medium as invalid when the time stamp data detected indicate that a certain period of time has elapsed.

Based on the present invention, the business processing apparatus accumulates usage times for each reading apparatus, based on the time stamp data contained in the handwriting data, and performs prescribed processing according to the accumulated usage times.

Based on the present invention, the writing media are designed to be suitable for receiving clients; the reading apparatus is used by the party receiving the clients; the character recognition apparatus conducts character recognition based on data inclusive of handwriting data sent from the reading apparatus while the party receiving the clients is meeting with them; and the business processing apparatus comprises a database containing information on the clients, searches the database on the basis of character strings recognized by the character recognition apparatus, and, when information concerning the clients meeting with the receiving party is available, produces character strings based on that information and transmits them so that they can be displayed on the reading apparatus. Business processing for client reception can thus be performed.

The writing media might be a complaint submission form, questionnaire form, or question and answer form, for example, and the database might contain information on complaints received from a client in the past, responses to a questionnaire, or answers to questions, etc.

Based on the present invention, the writing media are designed to be suitable for inventory processing; the reading apparatuses are used by inventory supervisors; and the business processing apparatus comprises a database containing information on product inventory quantities, searches the database on the basis of character strings recognized by the character recognition apparatus, and updates the database with product inventory quantities indicated by the recognized character strings. Thus business management can be conducted for inventory operations.

The writing media might be stock lists or inventory sheets, for example, and the database might contain inventory quantities and so forth corresponding to the products. The business processing apparatus sends the product inventory quantities read out from the database so that they can be read by the reading apparatuses.

Based on the present invention, the writing media are designed so that they designate a series of steps pertaining to a prescribed business operation, having a check box for each step; the reading apparatuses are used by those in charge of implementing the prescribed business operation; and the business processing apparatus is configured so that, when the results of character recognition by the character recognition apparatus indicate that a check box has been marked, it can process the step associated with that check box. Thus business management can be conducted for office operations.

The writing medium, for example, whether a fax, printout, e-mail message, or whatever, might be displayed together with the check box as a step necessary for the business operation.

Based on the present invention, the writing media are designed so that an entry column is provided for use with prescribed bidding; the reading apparatuses are used, respectively, by a plurality of bidders; and the business processing apparatus is configured so that, referencing character strings that have been sent from a plurality of reading apparatuses for each reading apparatus that has been recognized by the character recognition apparatus, any desired character string can be displayed, based on the size of a numerical value indicated by each character string. Thus business management can be performed for bidding operations.

The writing medium, for example, might have a column provided in it for entering a money amount, whereupon the business processing apparatus performs character recognition on handwriting data from a plurality of reading apparatuses, based on the money amounts entered. The identity of the person with the largest recognized character string, that is, the largest amount, is displayed. The dealer sees this display and determines the bidder.

Based on the present invention, the writing media are designed so as to comprise solution columns for prescribed problems; the reading apparatuses are used by examinees submitting solutions to the prescribed problems; and the business processing apparatus, based on character strings sent from the reading apparatuses and recognized by the character recognition apparatus, performs scoring processing such as scoring each examinee, finding the overall average, finding averages for each problem, and determining deviation values. Thus business management can be performed for scoring operations.

It is to be desired here that the writing media be designed so as to comprise, in addition to the solution columns, columns for entering the steps in the solution, that the character recognition apparatus send the handwriting entered in the columns for solution step entry, as image data, to the business processing apparatus, and that the business processing apparatus be configured so that it can display images based on the image data from the columns for solution step entry wherein entries have been made by any examinee. The reason for this is that, because the solution steps are displayed as images, a system can be provided that is suitable for critiquing examinations.

Based on the present invention, the writing media are configured so as to comprise entry columns relating to ticket reservation and sales; the reading apparatuses are used by persons acting as ticket reservation and sales agents; and the business processing apparatus comprises a database wherein are recorded remaining numbers of salable tickets, references the database when a character string recognized by the character recognition apparatus constitutes data indicting a desire to purchase prescribed tickets, and sends data to the reading apparatuses indicating that it is permissible to sell those tickets when there is a remaining number of those tickets. Thus business management can be conducted for ticket sales.

It is here to be desired that a ticket issuing apparatus also be provided which receives data sent from the business processing apparatus, and, when the data so sent indicate that it is permissible to sell tickets, issues those tickets.

It is further to be desired that a cash register be provided which receives data sent from the business processing apparatus, and, when the data so sent indicate that it is permissible to sell tickets, is capable of charging the price of those tickets.

BRIEF DESCRIPTION OF THE DRAWINGS

FIG. 15 is a diagram for describing other cancellation processing in the business management system in the first embodiment of the present invention;

FIG. 43 is a plan of a voucher in the tenth embodiment;

FIG. 44 is a plan of a voucher in the tenth embodiment;

FIG. 45 is a plan of a voucher in the tenth embodiment;

FIG. 51 is a plan of a medical chart in the 11th embodiment;

FIG. 52 is a plan of an examination request form in the 11th embodiment;

FIG. 59 is a diagram for describing voucher design processing in the 11th embodiment; and FIG. 60 is a diagram for describing voucher design processing in the 11th embodiment.

BEST MODE FOR CARRYING OUT THE INVENTION (First Embodiment)

Figure 1:
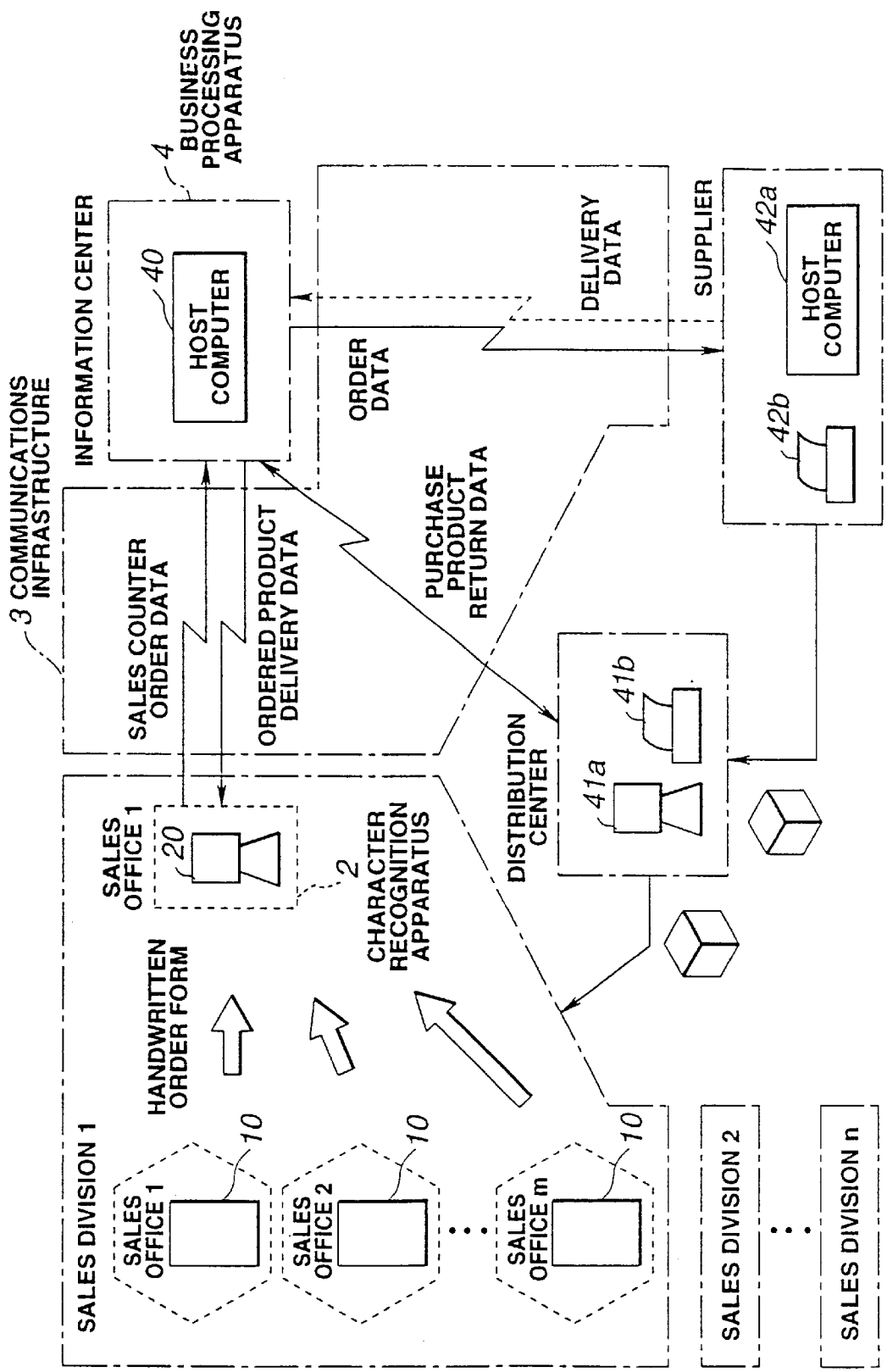
FIG. 1 is a block diagram of a business management system in a first embodiment of the present invention.

System configuration in a first embodiment is now described. FIG. 1 gives an overview of a business management system in the first embodiment of the present invention. The business management system depicted in this figure is set up so that it can manage product orders and other transactions. The business management system is configured so that sales divisions 1 to n (where n is any natural number), an information center, customers, and a distribution center can mutually communicate through a communications infrastructure 3.

The sales divisions 1 to n indicate, for example, sales divisions in a department store. Each of these sales divisions 1 to n is made up of one or more sales counters 1 to m (where m is any natural number) and a sales office. Each sales counter is provided with a reading apparatus 10 of the present invention, operated by a salesperson, while in the sales office is installed the character recognition apparatus 2 of the present invention.

Figure 4:
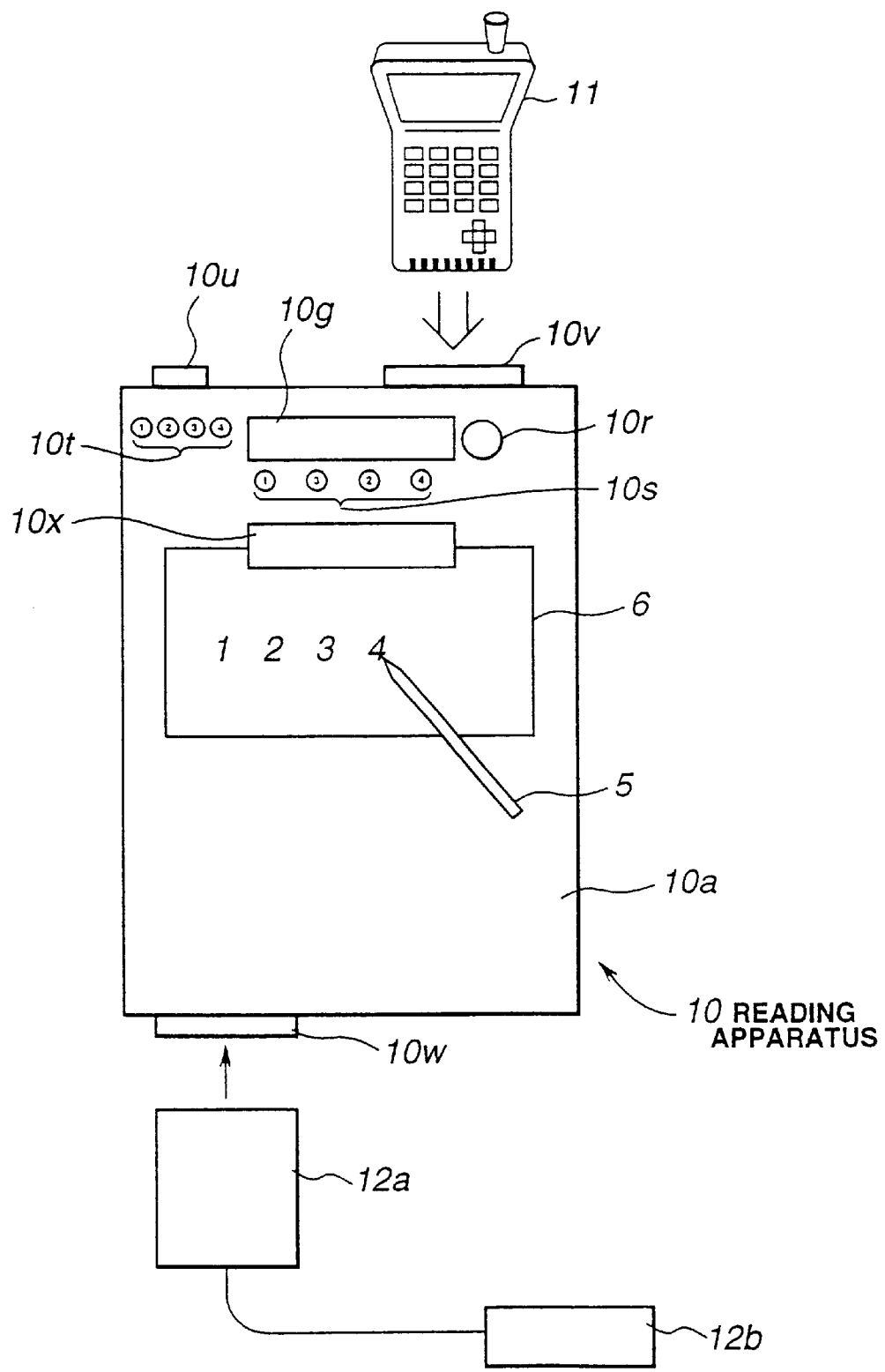
FIG. 4 is an external view of a reading apparatus in the first embodiment of the present invention.

The sales counter reading apparatuses 10 are configured so that they can send information written on vouchers by salespersons to the character recognition apparatus 2 in the sales office. This will be described subsequently with reference to FIGS. 4 and 5.

The sales office is provided with a computer 20. This computer 20 is configured so that it can function as the character recognition apparatus 2 of the present invention by executing a prescribed program. In other words, it is configured so that it can perform character recognition on the handwriting data sent to it from the reading apparatuses 10 of the sales counters 1 to m. The details of the configuration of the character recognition apparatus 2 will be described subsequently with reference to FIG. 6. The communications modes between the reading apparatuses 10 and the computer 20 will be described with reference to FIGS. 2 and 3.

In the information center is located a host computer 40. The host computer 40 is a so-called general-purpose mainframe computer, comprising CPU, ROM, RAM, memory devices, modem, etc. (not shown in the drawings), and configured so that it can function as the business processing apparatus 4 of the present invention, by executing a prescribed program. In particular, it can communicate with the character recognition apparatuses 2 in the sales divisions 1 to n via the communications infrastructure 3. From the sales office, sales counter order placement data are sent to the information center, and from the information center, order placement and product delivery data are sent to the sales office.

A memory device in the host computer 40 is configured with a database pertaining to voucher management. This database contains data specifying vouchers having voucher number keys, in units of records. The information items, or fields, configuring a record contain data corresponding to the entry columns on the voucher. These fields might include a sales counter code, salesperson code, date and time of delivery, place of delivery, delivery category, voucher number, campaign name, customer code, customer name, procurement conditions, procurement category, procurement classification, product number, quantity, unit cost price, cost price amount, unit selling price, selling price amount, price tag designation, etc.

The customer is provided with a host computer 42a and printer 42b. This host computer 42a is connected so that it can communicate via the communications infrastructure 3 with the information center host computer 40 and a distribution center computer 41a. The customer host computer 42a is configured so that it can both receive order placement data from the information center, and send delivery data indicating delivery times to the information center. The customer's printer 42b is used for printing out product delivery vouchers. Products to which a delivery voucher is attached are delivered to the distribution center 41.

The distribution center is provided with a computer 41a and a printer 41b. The computer 41a is connected via communications lines to the information center host computer 40 and the customer host computer 42a. Information pertaining to product delivery destinations and delivery dates and times, etc., is input to the computer 41a. The distribution center delivers prescribed products to the sales divisions 1 to n as directed by the computer 41a.

The configuration of the reading apparatus is now described. The external structure of the reading apparatus 10 is described next, making reference to FIG. 4, which is a plan of the reading apparatus 10. The reading apparatus 10 forms a rectangular panel, provided with a digitizer 10a on its writing surface which detects handwriting made with a pen 5. In addition, at the top of the writing surface of the reading apparatus 10 (i.e. toward the top of the figure), are provided a display LCD 10g, function selection switch 10r, operation selection switch group 10s, voucher selection switch group 10t, and clip 10x for holding a voucher 6. In the upper end panel of the reading apparatus 10 are provided a serial port 10u and a bus slot 10v, while in the lower end panel thereof is provided a parallel port 10w. The serial port 10u is a general-purpose communications port for mutual connection between the computer 20 using a general-purpose communications cable. The bus slot 10v configures an I/O slot compatible with a PC bus standard, for example, configured to permit the insertion of a portable information communications device such as a PHS 11 that is equipped with a terminal arrangement compatible with a PC card.

The PHS 11 should preferably be equipped with a connection terminal provided with a terminal arrangement compatible with a PC card. Such PHS devices include, for example, the DataScope made by Kyocera Corporation, the PM 100D made by Nippon City Media Co., Ltd., and the PC&TEL product made by Oki Electric Industry Co., Ltd. The PHS 11 is configured so that, by calling any desired number, it supports data communications by radio with the nearest relay station 30 under the control of the communications infrastructure 3. In particular, in the present invention, the PHS 11 is configured so that it calls a subscriber number in the sales office where the computer 20 is installed.

The parallel port 10w is configured so that it is compatible with a PC bus standard, for example, permitting the insertion of an IC card, and also enabling the connection of an auxiliary input device 12. The auxiliary input device 12 is configured with an adapter board 12a and a main unit 12b. This auxiliary input device 12 might be a scanner for reading in images such as the seal prints or thumb prints made on the voucher 6, or a bar code reader for reading a bar code on the voucher 6.

Figure 5:
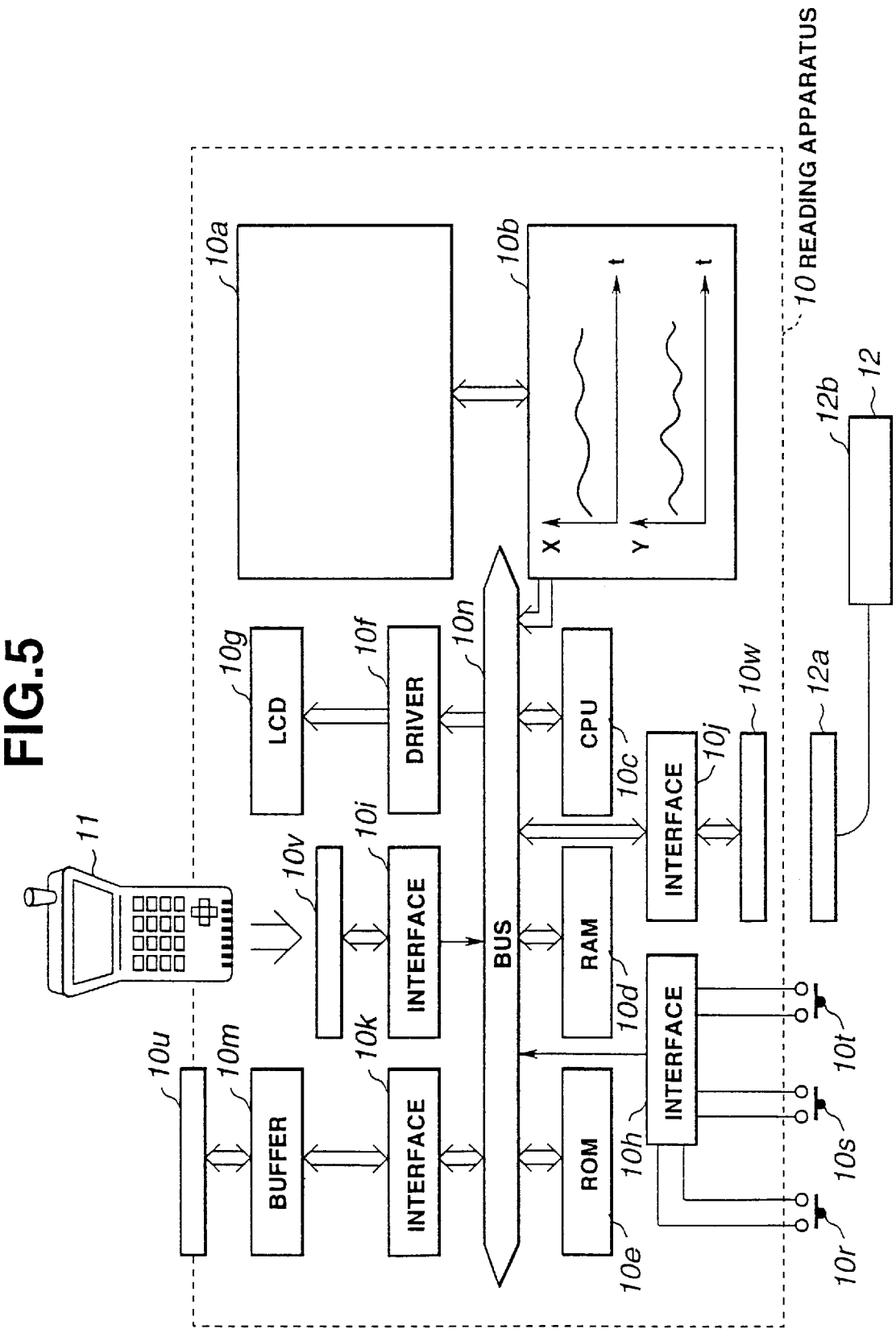
FIG. 5 is a block diagram for the reading apparatus in the first embodiment of the present invention.

FIG. 5 is a block diagram of the reading apparatus 10. This reading apparatus 10 comprises a digitizer 1a, handwriting data memory 10b, CPU 10c, RAM 10d, ROM 10e, liquid crystal driver 10f, LCD log, switch interface circuit 10h, bus slot interface circuit 10i, parallel port interface circuit 10j, serial port interface circuit 10k, buffer 10m, and bus 10n, etc.

The digitizer 10a comprises functions for measuring the coordinates (X and Y coordinates) at the point of the pen 5. The configuration is such that, when a prescribed electromagnetic wave is generated in the pen 5, for example, the coordinates can be measured according to the field strength, etc., when the electromagnetic wave is received by the digitizer 10a. The configuration is also such that, when a metal ball is fitted onto the end of the pen 5, the position of the metal ball can be detected magnetically. The configuration is further such that, when the pen tip of the pen 5 comes in contact with the top of the voucher, an electromagnetic wave can be output which differs from when the pen tip is not in contact. Configured in this way, when a user writes characters, etc., with the pen 5 on the voucher 6 on the digitizer 10a, handwriting data indicating changes over time in the X and Y coordinates of the tip of the pen 5 are output from the digitizer 10a. In order to detect rapid movements of the pen 5, it is to be desired that the handwriting data sampling circuit have a sampling rate of 100 times per second or faster. It is also permissible to configure the digitizer 10a so that, using a pressure sensor, the coordinates (X and Y coordinates) of the pen 5 point and the pen pressure (Z coordinate) can be detected. When a digitizer 10a capable of detecting pen pressures is used, it becomes possible to perform character recognition processing, described subsequently, very accurately. The handwriting data sampled as described above differ from so-called image data which scan an ordinary line drawing and assimilate two-dimensional images. Nevertheless, by recomposing the handwriting data on an X-Y plane, image data can be reproduced which form a true copy of the handwriting.

The handwriting data memory 10b is configured so that it can store handwriting data output from the digitizer 10a. Handwriting data are stored in files, one file for each voucher. Multiple files can be stored for multiple vouchers.

The RAM 10d, in addition to being used as workspace memory, also stores style definition data that define the format of the voucher which should be used, associated with switch numbers for switches in the voucher selection switch group 10t. In addition, this RAM 10d stores definition data and character display data for functions provided when a function selection switch button 10r is pressed, and definition data and character display data for operating particulars provided when an operation selection switch group 10s button is pressed. It is to be desired that either a RAM equipped with battery backup or a nonvolatile RAM be used for this RAM 10d in order to prevent the loss of data when the power is off. To the ROM 10e are written program data, etc., so that the device can function as a handwriting reading apparatus of the present invention. The program data are configured so that they can be sent over the bus 10n to the CPU 10c.

The liquid crystal driver 10f is configured so that it can drive the LCD 10g. the LCD 10g is configured so that it can display characters for conveying information such as list formats and functions to the operator, based on character data transferred by the CPU 10c. It is also configured so that it can display character data based on data input from the PHS 11 via the I/O slot 10v or data input via either the serial port 10u or the parallel port 10w.

The switch interface circuit 10h is configured so that it can read in the switch statuses of the function selection switch 10r, operation selection switch group 10s, and voucher selection switch group 10t.

The bus slot interface circuit 10i is configured so that it can carry data reception and transmission between the internal bus 10n and the bus slot 10v. The configuration is such that, for example, data read in from the PHS 11 via the bus slot 10v, output to the bus 10n, and sent over the bus 10n can be output to the PHS 11 via the bus slot 10v. The parallel port interface circuit 10j performs data I/O with an IC card when the IC card is loaded in the parallel port 10w. The configuration is also such that, when an input device 12 such as a scanner or bar code reader is connected to the parallel port 12w, data can be read in from the input device 12. The serial port interface 10k is configured so that it can convert parallel signals from the bus 10n to serial signals and output them, using the RS-232C standard, etc. The buffer 10m is a current driver.

The CPU 10c is configured so that, by executing program data written to the ROM 10e, it can make the apparatus function as the reading apparatus 10 of the present invention. More specifically, the CPU 10c controls the sampling timing for the digitizer 10a and generates handwriting data. Also, referencing an internal clock (not shown), it generates time stamp data to indicate the time the handwriting data were generated, at prescribed timing (every few seconds, for example), and inserts the time stamp data into the handwriting data. Additionally, when data are input, whether via the PHS 11, via the serial port 10u, or via the parallel port 10w, after storing these data temporarily in the RAM 10d, the CPU 10c causes characters based on those data to be displayed on the LCD 10g. Also, when a function selection switch button 10r, operation selection switch group 10s button, or voucher selection switch 10t is depressed, the CPU 10c assimilates the status of that switch, and executes a processing routine corresponding thereto. More specifically, when a function selection switch 10r is depressed, a write mode, bar code read mode, scanner read mode, or battery-memory status display mode is selected, corresponding to the switch depression state thereof. The write mode is a mode for writing vouchers. The bar code read mode is a mode selected to read bar codes when a bar code reader has been connected as the input device 12. The scanner read mode is a mode selected to read in scanned images when a scanner has been connected as the input device 12. The battery-memory status display mode is a mode selected to verify remaining battery power or memory space.

In the reading apparatus 10 configured as described in the foregoing, handwriting data representing a user's handwriting are sent to the computer 20 located in the sales office. In cases where handwriting data written to a plurality of writing media are stored in memory, such handwriting data are transmitted in batches. The times for such transmissions are determined at certain times of the day, for example. Transmissions may be made once a day or multiple times a day. The reading apparatus 10, moreover, is capable of handling a plurality of communications means. Thus a user can make connections with the computer 20 by selecting any of several communications means, such as via the PHS 11 and bus slot 10v, via an IC card and the parallel port 10w, or via the serial port 10u.

The configuration of the character recognition apparatus is now described.

Figure 6:
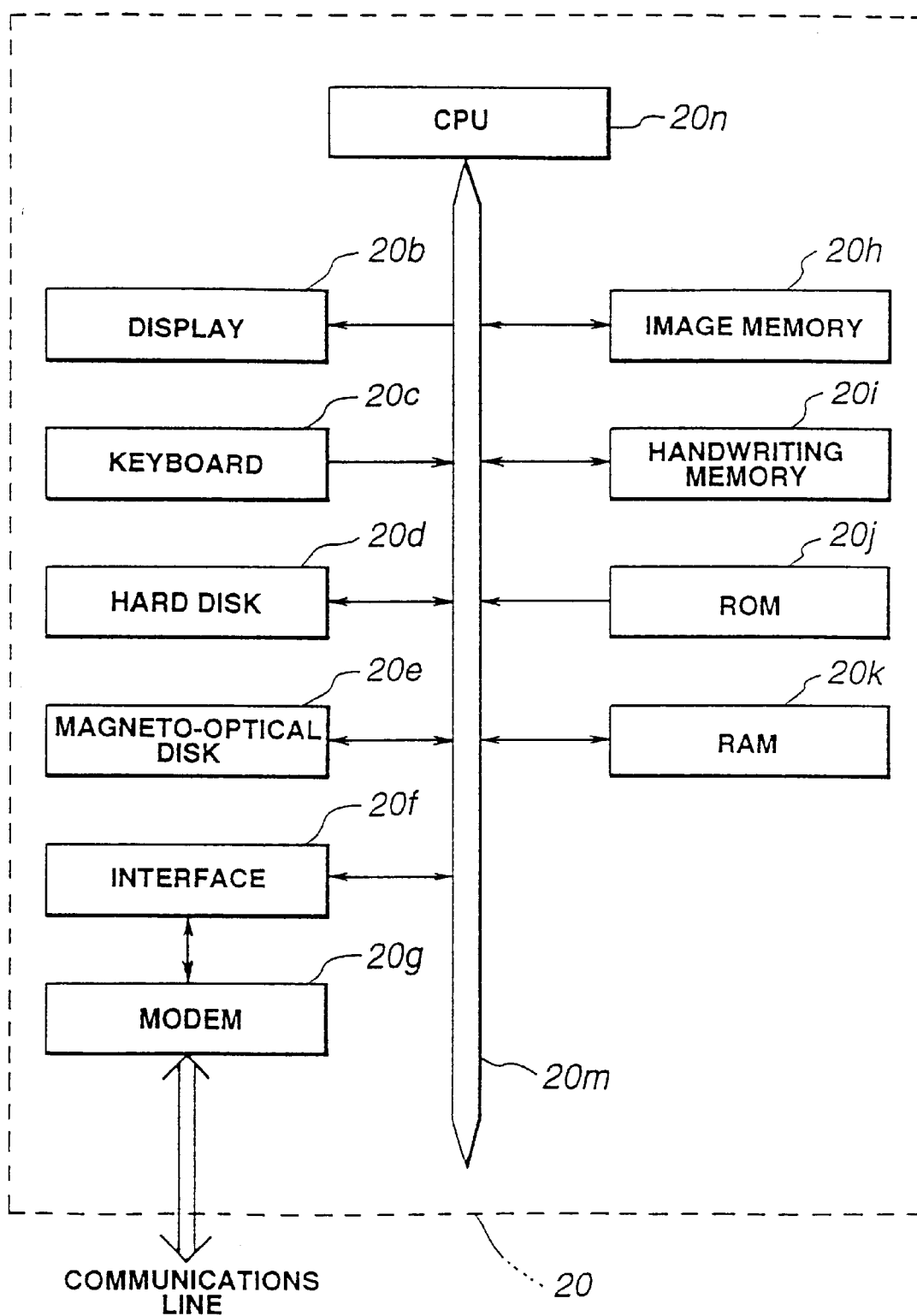
FIG. 6 is a block diagram for a computer (character recognition apparatus) in the first embodiment of the present invention.

In FIG. 6 is given a block diagram of a computer 20 functioning as a character recognition apparatus 2. As diagrammed therein, the computer 20 comprises a display 20b, keyboard 20c, hard disk 20d, magneto-optical disk 20e, interface circuit 20f, modem 20g, image memory 20h, handwriting memory 20i, ROM 20j, RAM 20k, bus 20m, and CPU 20n.

The keyboard 20c is used to enter various kinds of data other than handwriting data. Stored in the hard disk drive 20d and magneto-optical disk drive 20e are programs for making the computer 20 operate as the character recognition apparatus of the present invention. Handwriting data are also maintained in files. The interface circuit 20f is a circuit for conducting the transmission and reception of data between the reading apparatuses 10 or the business processing apparatus 4, via the modem 20g. The modem 20g is a circuit for conducting the transmission and reception of data between the reading apparatuses 10 or the business processing apparatus 4, over the communications infrastructure 3. The modem 20g may be an internal or an external modem. The image memory 20h is a memory for temporarily storing image data which do not contain time functions based on the handwriting data. For example, from handwriting data representing the handwriting for "1234" are generated image data for representing "1234" graphically, and these image data are stored. The handwriting memory 20i is a memory for storing handwriting data being processed, without modification.

Handwriting data transmitted from a reading apparatus 10 is stored in the hard disk 20d, etc., in files. And, when character recognition processing or business processing is to be performed, the handwriting data to be processed are read out from the hard disk 20d, etc., and stored in the handwriting memory 20i. When image data are needed, image data are generated from the handwriting data stored in the handwriting memory 20i, and stored in the image memory 20h. When character recognition has been performed, character data representing the recognized character strings as consecutive character codes are stored in the hard disk 20d, etc. When it is necessary to display the results of character reading, a voucher is displayed on the display 20b according to the image data in the image memory 20h and the recognized character strings, etc., in the hard disk 20d. When seal print image data have been added to handwriting data, those data too are displayed on the display 20b.

The ROM 20j is a memory used for holding program data such as the initial program loader. The RAM 20k is a memory used as a work area. The CPU 20n generates image data based on received handwriting data, recognizes characters based on the handwriting data, and performs character recognition based on the image data.

Based on the configuration of the character recognition apparatus 2, as described above, character recognition is performed on handwriting corresponding to entry columns in an order voucher, based on data inclusive of handwriting data transmitted from a reading apparatus 10, and character data are generated.

The computer 20 can also be used as a terminal for designing writing media. When an operator enters prescribed commands by the keyboard 20c, the CPU 20n reads out a writing medium design program from the hard disk 20d and executes it. Writing medium design processing is conducted in an interactive format, making it possible for the operator to design the desired writing medium while viewing the display 20b. The procedures for using an existing writing medium, etc., to produce a new writing medium are described in conjunction with FIG. 8.

Figure 2:
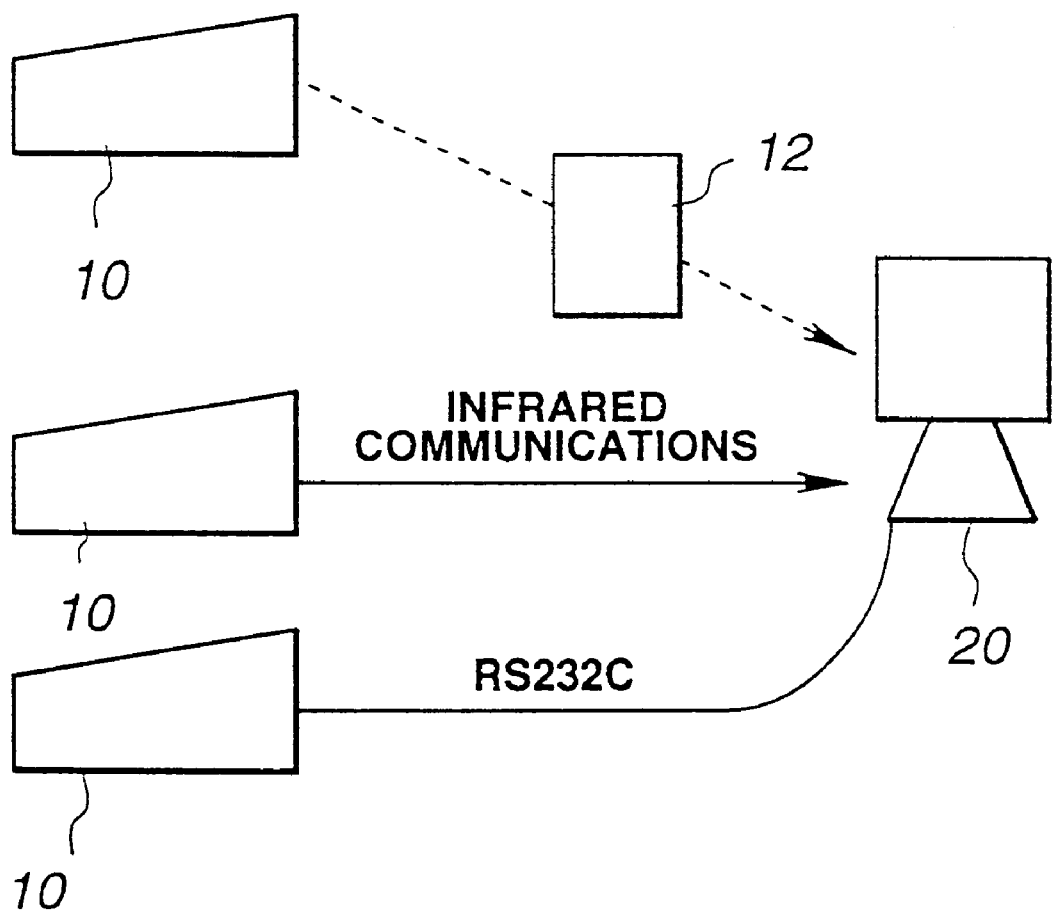
FIG. 2 is a diagram for describing a short-distance communications aspect in the business management system in the first embodiment.

Communications modes are now described. The communications modes used for the reading apparatuses 10 and computer 20 are described with reference to FIGS. 2 and 3. FIG. 2 represents communications modes for short distances.

When the distances between the reading apparatuses 10 and the computer 20 are comparatively short, the following approach may be implemented. First, if an IC card or other recording medium 12 is used, data can be exchanged via the parallel port 10w. If an infrared communications adapter is connected to the serial port 10u, data can be transferred by infrared communications. If a cable is used to connect to the computer 20 from the serial port 10u, data can be transferred using serial communications (i.e. communications conforming to the RS-232C standard, for example). When the recording medium 12 and infrared communications are employed, the reading apparatuses 10 become cordless and can be carried about freely.

Figure 3:
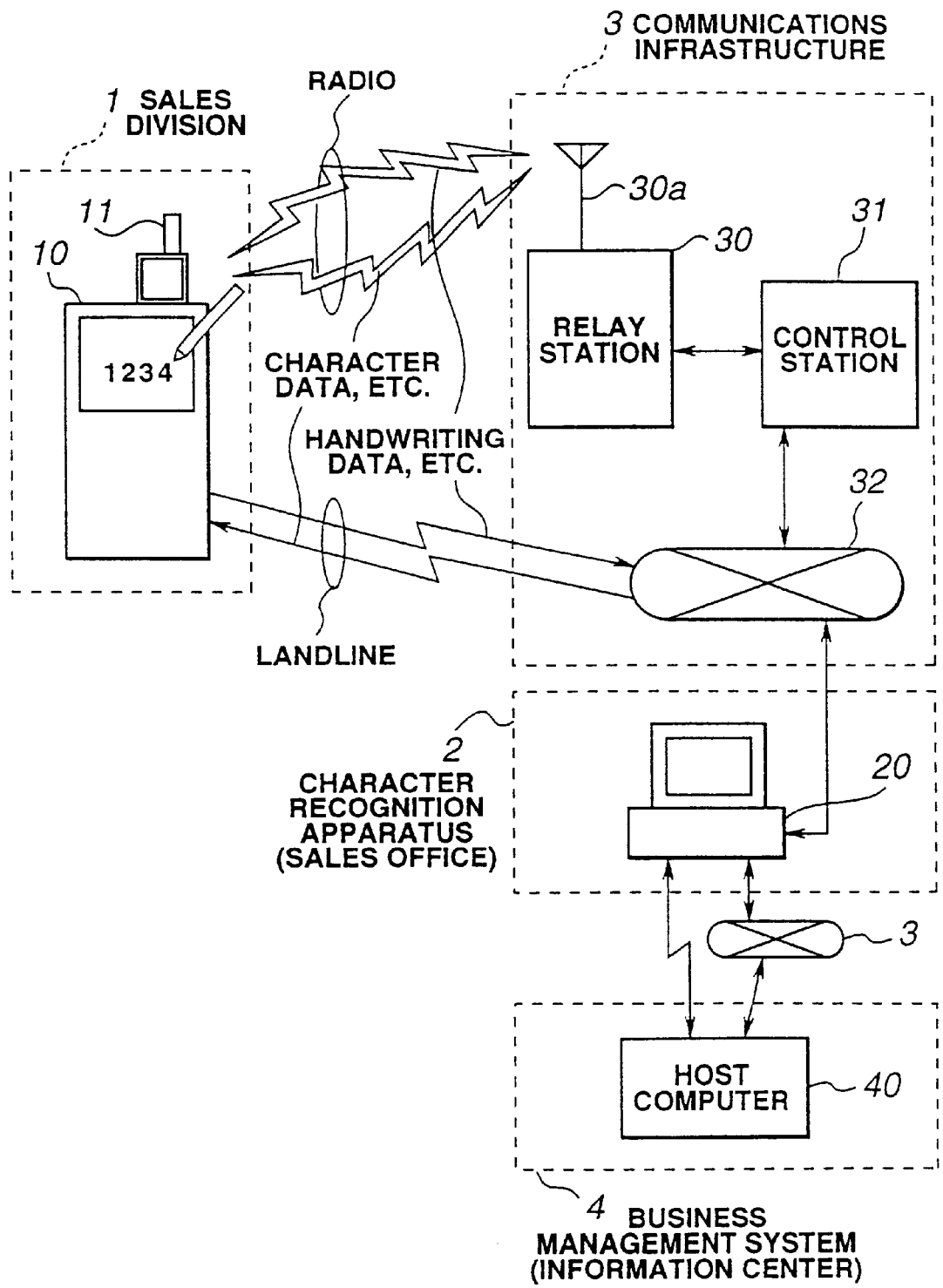
FIG. 3 is a diagram for describing a long-distance communications aspect in the business management system in the first embodiment.

FIG. 3 represents communications modes for long distances. As diagrammed in this figure, the reading apparatuses 10 and computer 20 are mutually connected over the communications infrastructure 3 using either landline communications or radio communications. The communications infrastructure consists of public communications facilities, and comprises a relay station 30, control station 31, and lines or channels 32. The relay station 30 is equipped with an antenna 30a and is configured so that, in addition to transmitting and receiving data with the PHS 11, it can monitor radio signal quality, and receive signals from the control station 31. The control station 31 is configured so that it controls a plurality of relay stations 30, and so that it can maintain radio communications even when radio signal quality deteriorates by switching over to other relay stations, etc. The control station 31 is also configured so that it supports exchange connections between communications lines and subscriber information management. The lines 32 are a fixed network, configured so that connections to the computer 2 are possible via multiple exchange facilities. These lines 32 may be subscriber lines or dedicated lines. They may also be high-speed lines such as used with ISDN or ordinary telephone lines.

In the case of landline communications, the reading apparatuses 10 are connected to the computer 20 via the lines 32 using modems (not shown).

In the case of radio communications, the reading apparatuses 10 are connected to the computer 20 by conducting data communications between a relay station 30 and a PHS 11 plugged into the bus slot 10v.

Based on the configuration described in the foregoing, data inclusive of handwriting data are transmitted from the reading apparatuses 10, either by landline or radio, to the computer 2, and data inclusive of character data are transmitted from the computer 2 by radio or landline. Communications via the communications infrastructure 3, moreover, can be used not only between sales counters and sales offices, but also for reciprocally communicating between sales offices, the information center, suppliers, and the distribution center.

If the processing power of the CPU 10c in the reading apparatus 10 is high, the reading apparatus may be configured so as to comprise functions used in conjunction with the character recognition apparatus 2. More specifically, the CPU 10c may be made to execute programs that exhibit the functions of both simultaneously. In that case, the configuration is made so that communications are effected between the reading apparatuses 10 and the business processing apparatus 4, either by landline or radio, via the communications infrastructure 3.

The working of the overall system is described next.

Figure 7:
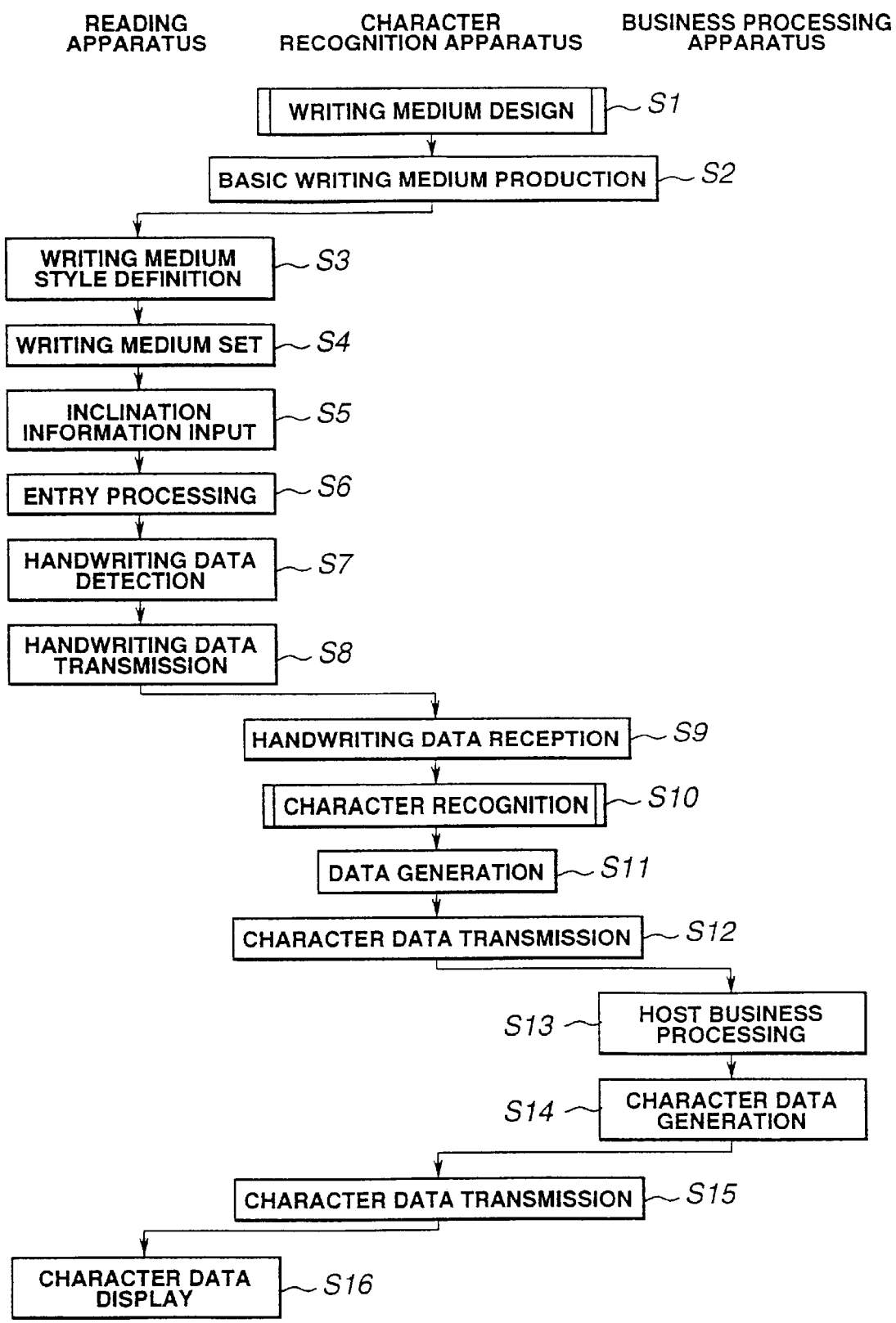
FIG. 7 is a flowchart summarizing processing routines in the business management system in the first embodiment of the present invention.

The working of the business management system in this embodiment is described now. FIG. 7 is a flowchart which outlines the processing routines for the business management system in this embodiment.

Step 1 (writing medium design): First, an operator in the sales office uses the computer 20 to design and produce writing medium. The details of writing medium design are described subsequently (in conjunction with FIG. 8).

Before using the reading apparatus 10, the operator connects the reading apparatus 10 used in that sales division to the computer 20, by landline or radio, using a communications mode as described earlier, and preliminarily sends style definition data defining the format of the voucher to be used to the reading apparatus 10. The reading apparatus 10 stores the style definition data so sent in the RAM 10*d*.

The entry columns (items) in which entries are made on an order voucher might include a sales counter code, salesperson code, date and time of delivery, place of delivery, delivery category, voucher number, campaign name, supplier code, supplier name, procurement conditions, procurement category, procurement classification, product number, quantity, unit cost price, cost price amount, unit selling price, selling price amount, price tag designation, etc. Of these, the campaign name, supplier name, and product name are extracted by the computer 20 as image data. In other words, image data are generated based on the handwriting data for the campaign name, supplier name, and product name. Some codes, such as the department store code, shop code, and order placement date and time (time stamp data), etc., are automatically generated, either by the reading apparatus 10 or the computer 20, without entries being made therefor on the writing medium.

Step S2 (basic writing medium production): Meanwhile, in order to produce vouchers for use by the sales counters, the operator prints a block copy from the style definition data stored in the computer 20 itself. Based on the block copy output from the printer, a printing company prints the voucher in quantity. The printed vouchers are distributed to the sales counters in the department store. Salespersons who use the reading apparatuses then use the vouchers to perform voucher entries, using the reading apparatuses at the sales counters.

Step S3 (writing medium style definition designation): Now, when a necessity arises at a sales counter to place an order for a product, a salesperson designates a style definition ID to specify the type of writing medium (voucher) that is to be used, by activating a voucher selection switch 10*t* on the reading apparatus 10. The reading apparatus 10 detects the status of the switch 10*t*, thereby recognizing which style definition data among the style definition data stored in the RAM 10*d* have been selected. The type of writing medium selected is then stored in the handwriting data memory along with the input handwriting data. The salesperson next loads the desired voucher into the reading apparatus 10 (S3), and inputs inclination information to correct the position and inclination of the voucher (S4). This will be subsequently described in greater detail.

Step S6 (entry processing): The salesperson then enters, on the voucher, the sales counter code, salesperson code or name, date and time of delivery, place of delivery, delivery category, voucher number, campaign name, supplier code, supplier name, procurement conditions, procurement category, procurement classification, product number, quantity, unit cost price, cost price amount, unit selling price, selling price amount, price tag designation, etc.

Step S6 (handwriting data detection): The reading apparatus 10 reads the pen 1*d* point coordinates on the digitizer 10*a*, and generates the handwriting data that represent pen-point coordinate changes over time. The handwriting data so generated are stored in the RAM 10*d* inside the reading apparatus 10. The reading apparatus 10 automatically generates the department store code, shop code, and order placement date, etc., and appends these data to the handwriting data. The reading apparatus 10 references the internal clock at prescribed timing intervals (every few seconds, for example), generates time stamp data indicating the date and time the handwriting was written, and sequentially inserts these into the handwriting data.

Step S8 (handwriting data transmission): When all the entries to one voucher have been completed, the reading apparatus 10 sends data inclusive of the handwriting data stored in the RAM 10*d* via a communications line to the computer 20 in the sales office. The timing of these transmissions is at certain times during the day, for example. Handwriting data for a number of vouchers may be transmitted in batches, or separate transmissions may be made for each voucher filled out.

Step S9 (handwriting data reception): The computer 20 in the sales office receives data inclusive of handwriting data from the reading apparatus 10, by serial communications when the distance is short, and by communications over the communications infrastructure 3 when the distance is long. These data are stored in the RAM 20*k*.

Step S10 (character recognition): the character recognition apparatus 2 performs character recognition based on the data inclusive of handwriting data received. Character data are then generated based on the handwriting data (S11). This will be described subsequently in greater detail in conjunction with FIG. 9.

The results of the character recognition are displayed on the display 20*b* of the computer 20. It is to be desired that the configuration allow the display, at that time, of the voucher's image data read by scanner, together with the voucher's style definition data, along with the recognized characters. More specifically, the computer 20 specifies the arrangement of the entry columns by the style definition data, and recognizes the characters entered in the entry columns by means of the data inclusive of the handwriting data. When recognized characters are displayed, after coordinating the magnification of the voucher's image data and the size of the recognized character strings, the recognized character strings and images are displayed, superimposed on the voucher's image data. By being configured in this way, the images displayed on the display 20*b* look like a real voucher.

Step S12 (character data transmission): The character recognition apparatus 2, based on the character data generated, generates sales counter order data comprising order information for each sales division. These sales counter order data are data necessary for ordering products, put together for each sales division from the information entered on the vouchers. These sales counter order data are sent to the host computer 40 in the information center.

Step S13 (host business processing): The host computer in the information center registers new records in the database, based on the sales counter order data. It also generates order data indicating the product name, product quantity, delivery time, and delivery destination, etc., and transmits these data to the supplier's host computer 42*a*. The suppliers' host computer 42*a* receives the order data from the information center, and sends delivery time data indicating delivery times to the information center. At the supplier's end, a product delivery voucher is printed out from the printer 42b. This product delivery voucher is attached to the product, and the product is sent to the distribution center 41. The computer 41a in the distribution center issues instructions on the product delivery destination, and product sorting is performed according to these instructions. The products so sorted are delivered according to the dates and places of delivery designated in the instructions.

Step S14 (character data generation): The host computer 40 in the information center is configured such that it is connected to a database. This host computer 40, when sales counter order data have been sent in, reads the inventory quantities therefor from the database, based on the product number, etc., designated in the data. Thereupon it generates character data indicating the inventory quantities or character data indicating whether or not the order can be filled, and sends these character data to the computer 20.

Step S15 (character data transmission); The computer 20, when it is still connected to a reading apparatus 10, transmits data inclusive of character data sent directly from the information center to the reading apparatus 10. If the connection with the reading apparatus 10 has been cut, but it is possible to reestablish communications with that reading apparatus 10, the data inclusive of the character data are transmitted. Alternatively, the configuration may be made such that these data inclusive of character data are transmitted directly to the reading apparatus 10 from the host computer 40 in the information center, without going through the computer 20.

Step S16 (character data display): The reading apparatus 10, when data inclusive of character data are transmitted to it, stores the data in the RAM 10d and performs character display. The character display mode will be described subsequently.

Writing medium design procedures are now described.

Figure 8:
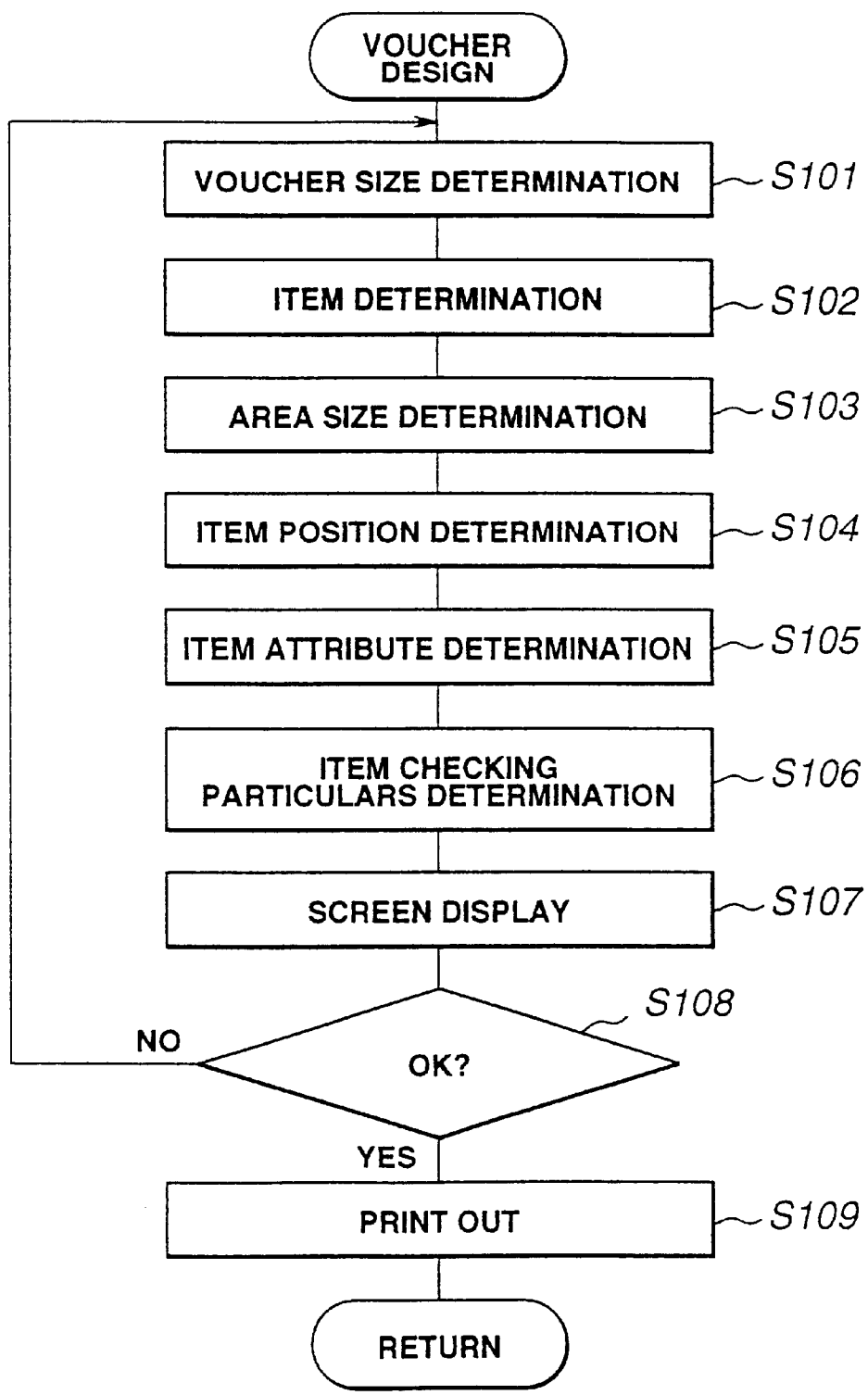
FIG. 8 is a flowchart representing writing medium design procedures in the business management system in the first embodiment of the present invention.

FIG. 8 gives a flowchart which provides details of the writing medium design processing (S1 in FIG. 7).

With the business management system in this embodiment, it is possible to design various types of vouchers.

There are two ways to specify a voucher format. In the first of these methods, style definition data for defining stereotypical voucher formats provided beforehand from outside the system are designated in the reading apparatuses 10 and in the computer 20. In the other, the operator himself or herself uses the computer 20 in the sales office to design the voucher format, and then stores that format in the reading apparatuses 10 and computer 20.

When a new voucher format is being designed, it is necessary to conduct bidirectional communications between the reading apparatus 10 and computer 20. Therefore, the reading apparatus 10 and computer 20 are connected using one of the communications modes diagrammed in FIGS. 2 and 3, for example. In the state wherein a reading apparatus 10 is connected to the computer 20, the operator secures a template of an existing voucher which he or she wishes to design in the clip 10X in the reading apparatus 10. If no template of an existing voucher is available, one may use as the template a draft form on which are written, by hand, the position and size of the entry columns, and the attributes thereof. The operator switches to the writing medium design mode on the computer 20. When the writing medium design mode is entered, the computer 20 initializes for bidirectional communications with the reading apparatus 10, and displays instructions for the operator on the display 20.

Figure 16:
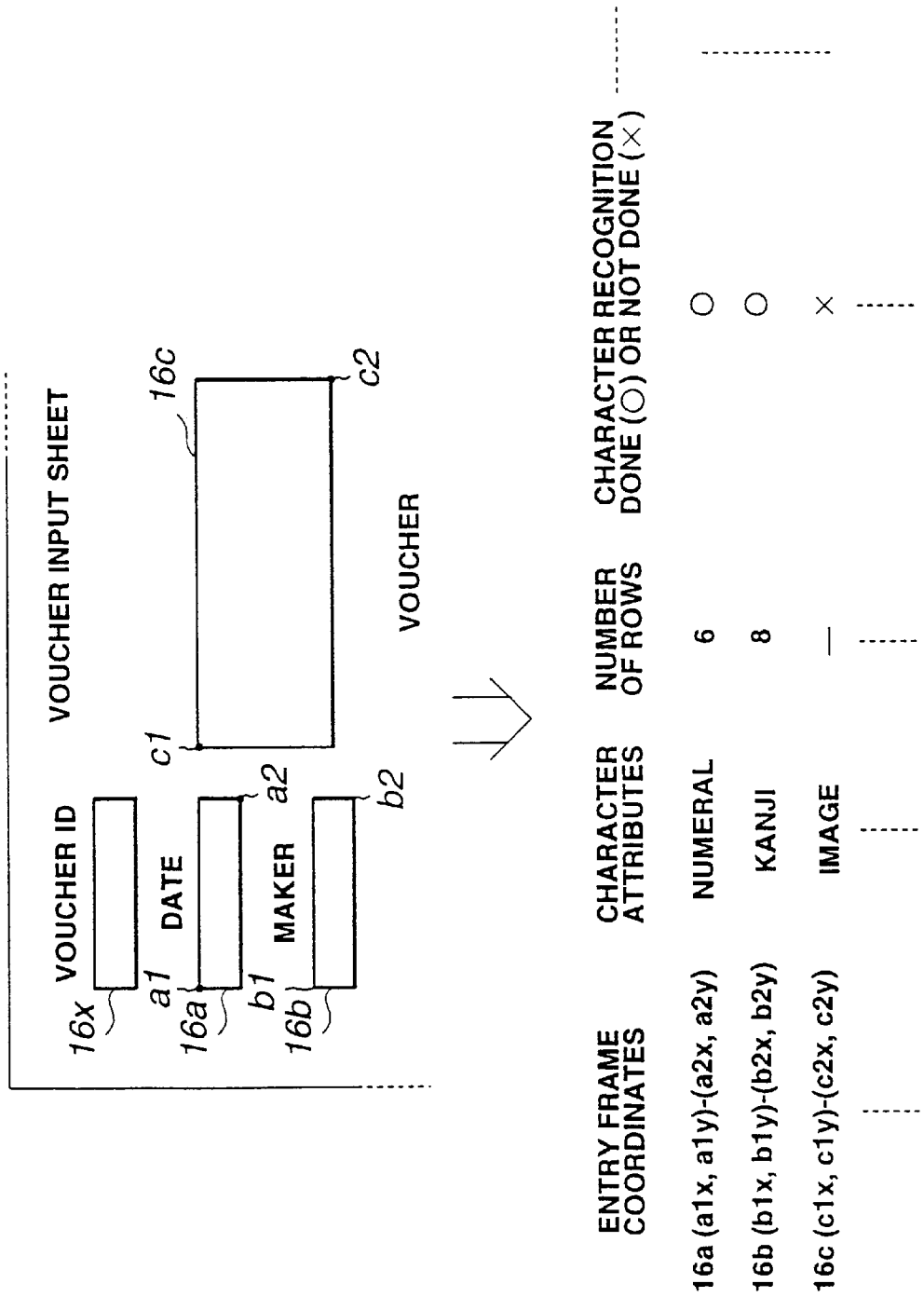
FIG. 16 is a diagram for describing input processing for writing medium design input.

FIG. 16 is a partial diagram of a voucher template which is to be recognized as style definition data by the business management system. Reference characters 16a to 16x indicate entry columns. In this figure are depicted entry columns 16a for the date, 16b for the maker, 16c for an image, and 16x for an ID number.

In order to design a new voucher format having the same entry columns as this template, these entry columns must be sequentially recognized by the computer 20. More specifically, for each entry column, the position, character attributes (by type of numeral, Kanji, image, etc.), and number of lines, therefor, together with whether or not to perform character recognition, etc., must be designated.

For this purpose, the operator first inputs the size of the voucher to be produced into the computer 20, using the keyboard (S101). Then the operator designates the voucher entry columns, such as for the data, name of maker, sales counter code, salesperson code, and product delivery time, etc., one by one, for the computer 20 (S102), and also designates the size of the entry columns (S103). In order to designate these sizes, the computer 20 requests that the operator designate the positions of the entry columns to be input on the reading apparatus 10 (Sl04). In order to designate an entry column position, two diagonally opposite corners of the four corners of the entry box to be designated on the voucher are pressed by the pen 5, and those coordinates are sent to the computer 20. For example, the pen 1d is used to designate points a1 and a2 if the column is the entry column 16a for the date, points b1 and b2 if it is the entry column for the maker, and points c1 and c2 if it is the entry column for an image. By image entry column here is meant a column wherein the image data are to be displayed as is, without being subjected to character recognition. This might be a signature column, for example. When a comparison is made using a signature column, the person using the reading apparatus 10 registers his or her own signature as image data in the computer 20 when the style definition data are created. These image data are appended to the style definition data as comparison image data.

When the operator designates the coordinates of an entry column, the computer 20 asks the operator to designate, from the keyboard 20c, the character attributes, number of lines, and whether or not to perform character recognition (S105). The operator, in response thereto, enters the attributes by striking number keys, etc., from the keyboard 20c.

The outline of the voucher of the size designated will be displayed on the display screen of the computer 20, whereupon the operator adjusts the position of each item, while viewing the screen, and performs a check so as to determine the final positions (S106).

When the voucher style definition data have been designed by the procedures described above, the post-design writing medium is displayed on the display screen (S107). Because an actual voucher image is displayed on the screen, the operator can easily inspect the results of the voucher design. The operator thus views the screen and decides whether or not the desired voucher has been designed (S108). If the voucher displayed is not according to plan, the routines from S101 to S107 are repeated until the desired voucher is designed (Yes in S108), whereupon, as represented in the lower part of FIG. 16, style definition data wherein attribute data for each entry column have been associated are established.

Based on these style definition data, the operator prints out, from the printer 21d, an image representing the block copy for the designed voucher, together with the parameters representing that block copy (S109). Then a printing company is contracted to print the voucher in volume, using the block copy image and block copy parameters. Also, the style definition data for the voucher created by the foregoing procedures are sent to the reading apparatuses 10.

If the voucher template image data are captured, it is possible to perform voucher design as described above without using a reading apparatus 10. Specifically, the operator first captures the voucher template using a scanner or the like (not shown), and inputs these to the computer 20. Based on the captured image data, the voucher template is displayed on the display 20b. The operator specifies entry columns on the displayed voucher template, as above, using a mouse, and sets the attributes. In other words, the corners forming diagonals across the entry columns displayed are clicked on with the mouse, and the coordinates thereof are sequentially input. Once the diagonal corners of one entry column have been designated, the attributes of that entry column are entered next from the keyboard, etc.

Figure 9:
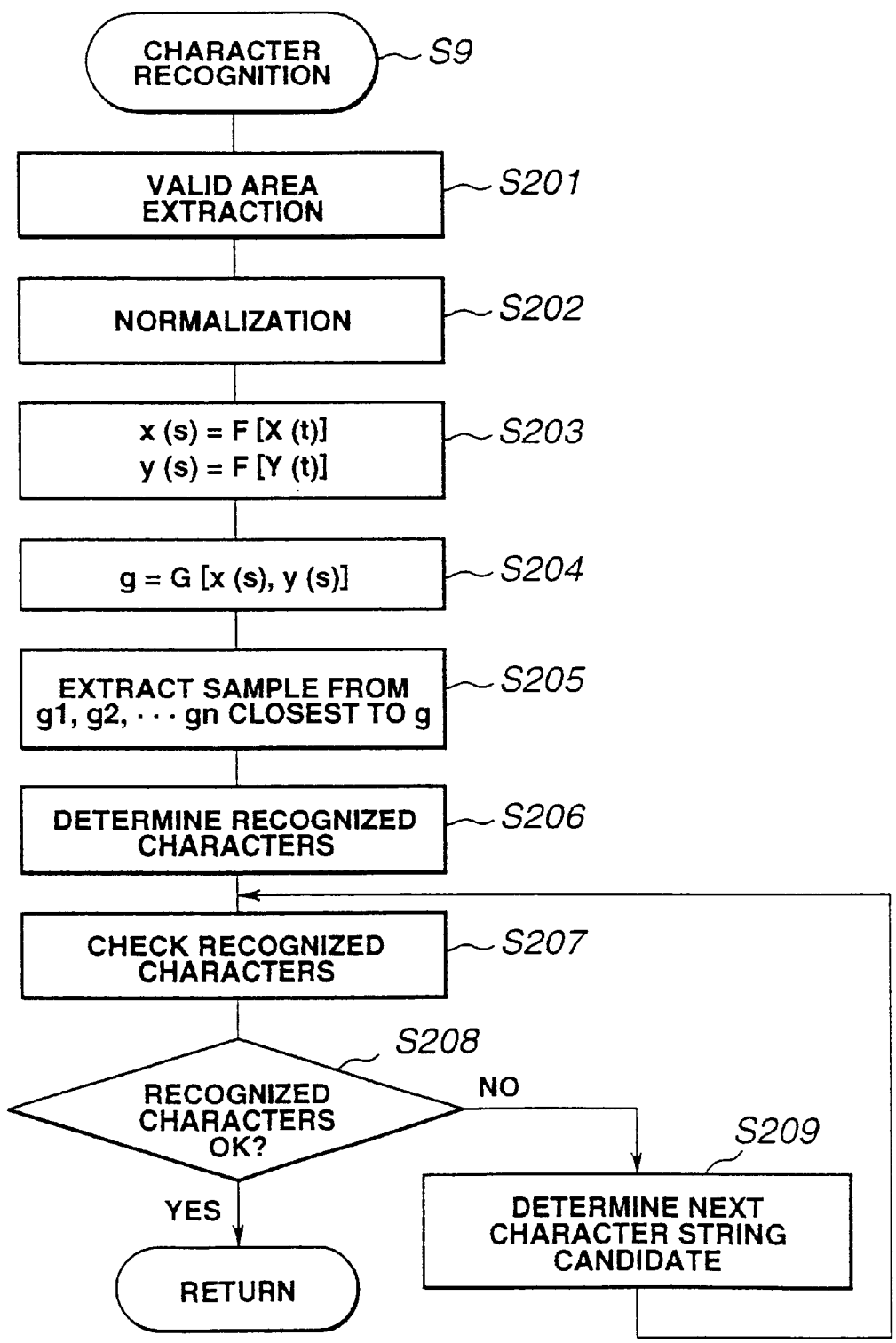
FIG. 9 is a flowchart representing recognition procedures in the business management system in the first embodiment of the present invention.

In FIG. 9 is given a detailed flowchart for the character recognition routine (S10 in FIG. 7). First, the computer 20 at the sales office extracts an effective handwriting data area while the point of the pen 5 is in contact with the top of the digitizer 10a (S201). The computer 20 next normalizes the effective handwriting data area, and incorporates the handwriting data within certain definite bounds (S202) The effective handwriting data area is then subjected to orthogonal transformations such as Hadamard transformations, Karhunen-Loeve transformations, and cosine transformations (S203), and the handwriting data represented with the time axis (t) are represented with the orthogonal axis (s). By expressing the handwriting data with such an orthogonal axis, it becomes possible to extract characteristic portions from the handwriting.

The character recognition here is performed by identifying and classifying the characters or character groups forming a character string indicated in the handwriting data, and converting the handwriting data in the classified areas into character codes. This process is called character segregation.

In the interest of optimum segregation, it is preferable that frames be established so that characters are entered into voucher entry columns at a predetermined pitch. The computer 20 can then perform processing, recognizing that the handwriting entered within the bounds of each character pitch frame is a single character.

Now, the handwriting data represented with orthogonal axes (s), as pertaining to each of the segregated characters, are converted to a value g representing characteristics, by means of a function $G\{X(S), Y(S)\}$ (S204). Meanwhile, a specimen file is prepared beforehand containing specimen values $g1, g2, g3, g4$, etc., corresponding to character data for displaying the characters that are to be recognized, such as numerals and alphabet characters. The specimen value closest to the value g is retrieved (S205), whereupon character data corresponding to this specimen value are obtained as the recognition product (S206).

When a single character is unmistakable, character recognition is performed by the process described above. In cases where characters have been written on the voucher in a run-on fashion, however, character morphology is disturbed, wherefore it is not possible to convert one character to a character code. To handle these cases, it is desirable that character recognition based on directional elements also be used.

By directional element is meant here an element (i.e. vector) indicating the direction from one sampling point to the next sampling point, where handwriting data have been sampled to yield sampling points. In the writing of characters, the position from which the writing begins, the position at which the writing terminates, and the direction in which the writing implement advances are to some degree regular. That being so, even in cases where it cannot be determined which character is indicated, by the image data alone, the character type can often be determined by detecting how the directional elements change directions.

Characters are as a general rule recognized in units of single characters. In the case of run-on writing, however, multiple characters are written in connected form, making it sometimes impossible to segregate each character. In order to handle such cases, multiple characters or multiple character groups may be used as units for character recognition. To cite one example, numerical 0's (zeros) used to express money amounts are often written as one continuous character. In such cases, there are no breaks between successive 0's, so they cannot be segregated into individual characters. If, however, it is possible to recognize the character combinations "00" and "000" as single units, then character recognition can be accomplished even if the characters are written continuously. This approach is not limited to the number 0, however, and may be directly applied to other characters and symbols that are apt to be written in continuous form, without breaks between sequential characters.

It is also to be desired that the number of intersections occurring in the handwriting data be counted. The reason for this is that, if specimen files or character data files are prepared in association with intersection counts, it is possible to extract correct character data from the intersection counts even when the characters are to some extent simplified.

It is further to be desired that the stoke counts indicated in handwriting data be counted. The reason for this is that, if specimen files or character data files are prepared in association with stroke counts, it is possible to extract correct character data from the intersection counts even when the characters are to some extent simplified.

The computer 20, meanwhile, performs various data checks against the recognized characters (S207). These checks may include a master presence check, range check, and check-digit check, etc. A master presence check is done to determine whether a recognition-product character string in a subject item (field) is present or not in a pre-designated code master file. In other words, if an unforeseen character is found in a recognition-product character string for an information item, an error is output. When an error is output during the recognition process stage, it is possible to correct the recognized character.

A range check is done to determine whether numerical values in a recognition-product character string fall within the bounds of a maximum value and a minimum value. When such a value falls outside of those bounds, an error is output. It is presupposed, therefore, that range checks are done only on characters that are numerical values. In a check-digit check, a numerical value within a recognition-product character string is divided by some value to find a remainder. Based on that remainder, an error in the numerical value can be determined. Such a check-digit check can be applied to sales counter codes and the like.

By means of the checks noted in the foregoing, if, for example, a character other than a number is found in a money amount column (data field), the result of the data check will be that an error has occurred. By performing such data checks, erroneous character recognitions can be discovered.

When an erroneous recognition has been discovered (No in S208), as a result of a data check on recognized characters, the computer 20 determines the next candidate character string (S209), and performs data checks on that character string (S207). If, on the other hand, no erroneous recognition is detected (Yes in S208), the recognized character is established. Sales order data, etc., can be generated on the basis of recognized characters obtained in this manner.

Writing error correction procedures are now described.

Figure 10:
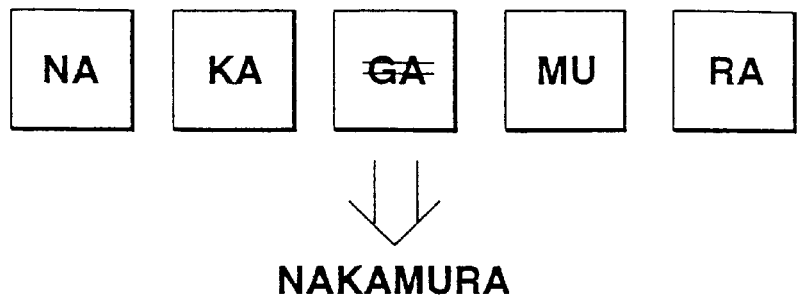
FIG. 10 is a diagram for describing error correction processing in the business management system in the first embodiment of the present invention.
Figure 11:
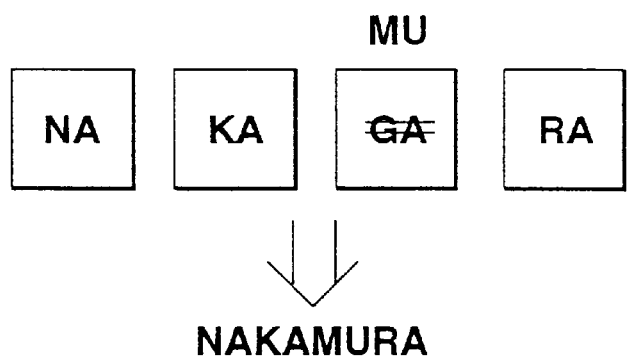
FIG. 11 is a diagram for describing error correction processing in the business management system in the first embodiment of the present invention.
Figure 12:
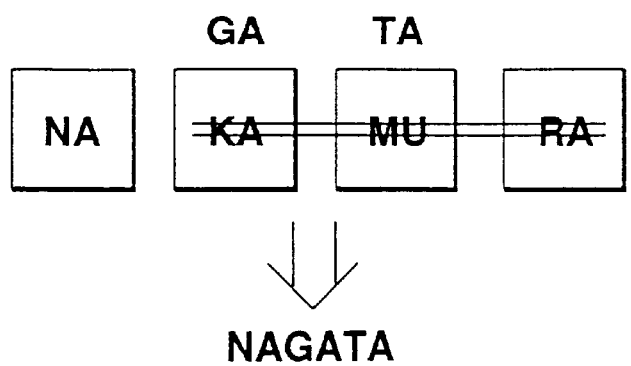
FIG. 12 is a diagram for describing other error correction processing in the business management system in the first embodiment of the present invention.

FIGS. 10 to 12 are diagrams for describing writing error correction methods. FIG. 10 is a diagram for describing character deletion in a case where a salesperson has incorrectly written one character in a character string in a voucher. In this case, by drawing a double line, etc., over the erroneous character, that character can be excluded from character recognition in subsequent recognition processing. Suppose, for example, that a salesperson wishing to write Nakamura mistakenly writes "ga(ガ)" instead of "mu (ム)" after "Naka (ナカ)" A double line would be drawn through the "ga(ガ)" and "mura (ムラ)" would be written after that. When the handwriting data read by the reading apparatus 10 are subjected to character recognition, the computer 20 recognizes the double line device, and identifies the character written beneath the double line as a character to be deleted. In this case, the character "ga (ガ)" will be excluded from the recognized character string, thus yielding "Nakamura (ナカムラ)" as the recognition product.

FIG. 11 is a diagram for describing another writing error correction method. In the example shown in this figure, a correct character is written above and in place of the character to be corrected. If, for example, intending to write "Nakamura (ナカムラ)" a user writes "Nakagara (ナカガラ)" in error on a voucher, he or she may draw a double line through the erroneous character "ga (ガ)" and write the correct character "mu (ム)" above it. When performing character recognition, the computer 20 recognizes both the double line and the added character in the character string, and is able therefore to insert the added character in place of the double-lined character in the recognized character string.

FIG. 12 is a diagram of still another writing error correction method. Indicated here is a case wherein, unlike that of FIG. 11, a plurality of characters are to be deleted together, and a plurality of characters are to be inserted together. If, for example, intending to write the name "Nagata (ナガタ)," the name "Nakamura (ナカムラ)" is written in error, a double line is drawn through the erroneously written character string "kamura(カムラ)" and the correct character string "gata(ガタ)" is written above. During character recognition, the computer 20 recognizes the character string with the double line through it, and inserts the character string written above, in place thereof, in the recognized character string.

Voucher position and inclination correction procedures are now described.

When a writer sets a voucher medium in a reading apparatus 10, the voucher is not always placed in the correct position in the reading apparatus 10. Sometimes it may be shifted to one side, sometimes it may be placed at an inclination, and sometimes it may be set upside down. Even when the voucher is placed in such conditions as these, however, character recognition is still possible after the voucher position and inclination have been corrected, as noted below. As indicated in step S5 in FIG. 7, inclination information can be entered by the writer placing the pen 5 at the four corners of a writing medium. The reading apparatus 10 reads the coordinates of these four corners, and calculates therefrom the position of the voucher relative to the reading apparatus 10.

In addition to the method noted above wherein the writer inputs the coordinates of the four corners of the voucher, there is another method wherein the position is compensated for by detecting the overall position of the handwriting. There will always be mandatory entry columns (such as for the voucher number and name of entering person, etc.) in a voucher which must have characters written therein. Therefore, when handwriting data generated from a voucher which is not set in the proper position are subjected to character recognition based on voucher style definition data designed under the presumption that the voucher will be positioned properly, character recognition cannot be performed correctly. Accordingly, when characters in any of the mandatory entry columns cannot be detected, it is judged that the voucher has not been properly set in-position. Thereupon, the relative positions of the voucher obtained on the basis of the style definition data and of the handwriting as based on the handwriting data are moved until, in each of the plurality of mandatory entry columns, coordinates are detected for characters obtained from the handwriting data. This movement may be parallel, in the horizontal or vertical direction, or it may be a rotational motion centered on some point in the voucher. When characters are detected in the mandatory entry columns, the amounts of these movement are taken as offset amounts, and these offset amounts are added to the relative positions of the entry columns when in their proper positions as defined by the style definition data. Character recognition is then correctly performed based on these corrected style definition data and handwriting data.

Figure 13:
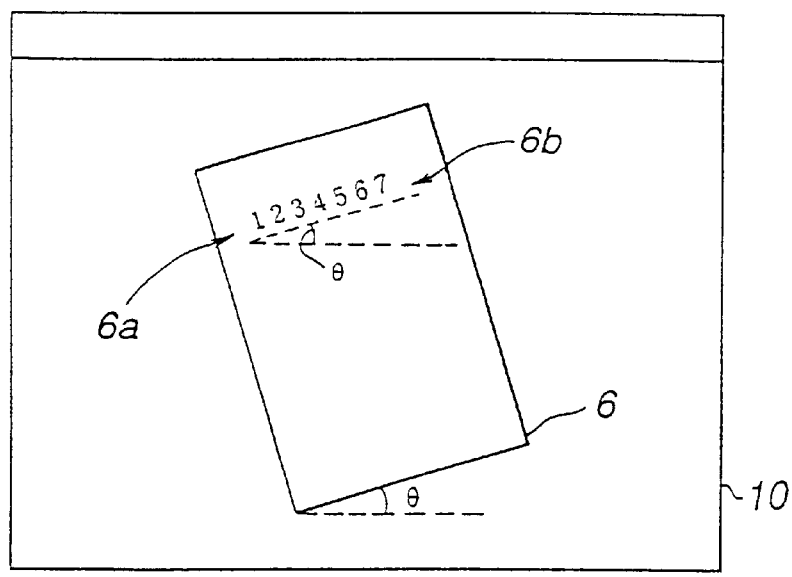
FIG. 13 is a diagram for describing writing medium angle correction in the business management system in the first embodiment of the present invention.

FIG. 13 is a diagram for describing the procedures for correcting the coordinate values in handwriting data when a voucher has been set at an inclination relative to the reading apparatus 10. By means of the positioning and correction processes described above, when a voucher has been placed at an inclination relative to the reading apparatus 10, as depicted in the figure, the inclination of the voucher can be corrected. Specifically, when performing character recognition, the computer 20 determines the coordinates for the lead character 12*a* in the character string in the voucher 6, and for the trailing character string 12*b*, respectively, and calculates a vector specifying a straight line passing through the two sets of coordinates. By determining the angle θ subtended between this vector and a reference line, the inclination of the voucher 6 relative to the reading apparatus 10 is found. It is also possible to calculate the position of the voucher 6 from the coordinates of the lead character 12*a* and the trailing character 12*b*. Accordingly, it is possible to accurately extract the desired data (handwriting data indicating a product name, for example) from the handwriting data, thus freeing the salesperson from the necessity of paying careful attention to the position and angle of the voucher on the reading apparatus 10.

Thus, as described above, character recognition is possible, no matter how the voucher is set, so that the writer can set the voucher in whichever orientation is easiest for him or her to make entries, according to whether right-handed or left, or according to the voucher format or the environment in which it is used, etc.

Voucher cancellation procedures are now described.

Figure 14:
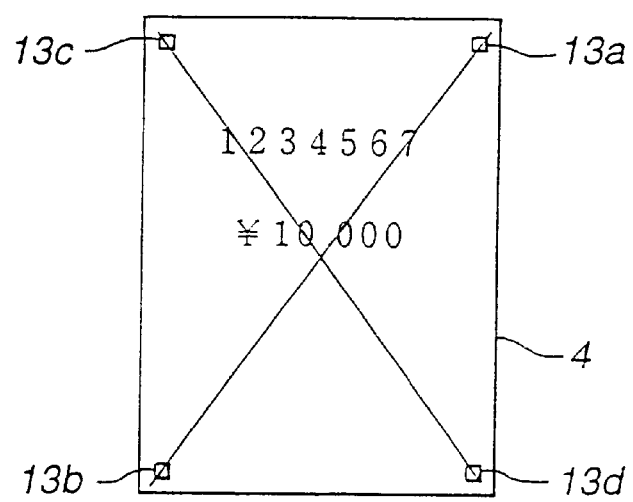
FIG. 14 is a diagram for describing cancellation processing in the business management system in the first embodiment of the present invention.

FIG. 14 is a diagram for describing the procedures for canceling a voucher. A voucher can be cancelled by drawing a large X on the voucher 6 as diagrammed in this figure. In the voucher 6 depicted in the figure, rectangular areas 13*a* to 13*d* (which need not necessarily be printed on the form) are defined in the four corners. When the reading apparatus 10 detects that diagonal lines connecting the rectangular areas 13*a* and 13*b*, and 13*c* and 13*d*, have been drawn with the pen, it executes a routine to cancel that voucher. In this embodiment, an X mark is made on a canceled voucher, making it possible to readily distinguish a voucher for which cancellation processing has been done. The advantage of being able to effect cancellation without having to initiate a complicated switching operation is also realized.

FIG. 15 is a diagram for describing another cancellation procedure for a voucher. In this figure are represented, in part, the column details on a sales voucher. Cancellation designation boxes 14a to 14c are associated with field data for each product. Cancellation designation box 14a, for example, is associated with the product name, quantity, unit cost, and amount for product A. Now, when a user wishes to cancel a record for product B, for instance, he or she makes an X mark in the cancellation designation box 14b. When this sales voucher is subjected to character recognition, the computer 20 identifies which cancellation designation boxes have an X mark in them. Here, an X mark is found in the cancellation designation box 14b, so the computer 20 removes the record made up of the fields (product name, quantity, unit price, and amount, etc., for product B) associated with 14b.

Security checking is now described.

When data checks are made in step S207, as described earlier, it is to be desired that a signature comparison be made. When making a signature comparison, the computer 20 registers the signature of a salesperson who is to use a reading apparatus in the form of handwriting data, either together with the style definition data or separately. The signature handwriting data so pre-registered is registered on the basis of multiply written signatures on a registration form provided with graduations.

When making entries on a voucher, the salesperson signs his or her name in the signature column on the voucher. When character recognition is performed, the computer 20 inputs the handwriting data of the entering party written in the signature column on the voucher being read which are transferred from the reading apparatus 10, and makes a comparison to see whether or not these data agree with the pre-defined signature handwriting data.

Handwriting data represent coordinate changes over time for the point of a pen. That being so, two things can be discerned from the handwriting data, namely (a) writing order, and (b) writing time. Handwriting exhibits individual idiosyncrasies. As far as the person is the same, even if he or she writes the same character as someone else writes, the writing order will be constant. And, if the same characters are written, roughly the same time will be required in writing each part of the signature. That being so, based on what the writing order is, and on how the time required to write each part of the signature changes, the two sets of handwriting data are compared from the beginning of the signature. Now, when the handwriting data input from a reading apparatus 10 are roughly the same as the pre-registered handwriting data in terms of stroke order and time changes, it can be judged that the signatures were made by the same person. using this method, even if in terms of image another person's signature has been copied in the same form, the stroke order and/or writing times will be different, so a definite determination can be made as to whether or not it is that person's signature. If the input device is configured so that pen pressure can also be detected, then it is possible to judge whether a signature is the same or not using pen pressure changes over time as a parameter. This will enable signature validity to be judged with even higher probability.

In cases where it is judged that two sets of handwriting data more or less coincide, the data on the voucher are accepted. If they do not coincide, the voucher data are not subjected to character recognition. It is possible also to perform the same kind of comparisons on seal images. In that case, a scanner is used as the input device 12 for reading the seal image into the reading apparatus 10, and the resulting image data are sent to the computer 20. The computer 20, meanwhile, has seal images scanned in beforehand, so that the seal images are pre-registered as image data.

When making entries in a voucher, the salesperson affixes a registered seal to the voucher, which is then read by a spot scanner connected as an input device 12. When character recognition is performed, the computer 20 compares the seal image data sent from the reading apparatus 10 with seal image data pre-registered in the computer 20. Such image data comparisons can be made using pattern matching or some other known image processing technology.

Examination and authorization processing may also be performed in the sales office when conducting the data checks in step S207, as described earlier. Usually, vouchers prepared by a salesperson are sent to the main office after being examined and approved by a manager. Similar examination and authorization processing may be enforced in this embodiment also.

More specifically, the manager, at character recognition time, displays an image of a voucher he or she wishes to examine and approve on the display 20b, reading out style definition data. In the sales division, a salesperson fills out a voucher using a reading apparatus 10. Data inclusive of handwriting data for this voucher are sent to the computer 20 in the sales office. At the sales office, the manager performs character recognition on the handwriting data using the computer 20, and checks the content of the entries therein. In conjunction therewith, a comparison is also made to check the signature or seal image, as noted earlier. When, as a result of these checks, the manager judges that the entry content is correct, he or she performs the examination and authorization procedures.

When performing the examination and authorization procedures, the manager selects an icon displayed on the display screen of the computer 20 for confirming examination and authorization. When examination and authorization procedures are designated, the computer 20 displays a pre-recorded seal image or signature image, either in a voucher image examination box or authorization box displayed on the display 20b. For the seal image or signature image, the image data used for comparing the seal image or signature may be used. By means of these procedures, the same display is made as the seal or signature affixed in the examination or authorization box on the actual voucher. A code indicating examination and authorization is added to the handwriting data for a voucher on which examination and authorization procedures have been carried out.

Now, when the computer 20 submits an order for a product to the information center based on this voucher file, it is permissible to have the computer 20 determine whether or not the verification and authorization code has been appended to the file. When a product order is submitted based on a file to which no such code has been appended, the order is rendered invalid, and the data cannot be transmitted to the information center. When examination and authorization are done at various levels by a plurality of persons, the system may be set up so that, unless an examination and authorization stamp has been made at one level, the next level cannot be advanced to. By performing these examination and authorization procedures, product order mistakes can be prevented before they have a chance to occur.

It is further to be desired that irregular detection procedures based on time stamp data be enforced in conjunction with the security checks described above. In other words, if the computer 20 is configured so that it can detect time stamp data contained in the handwriting data, it will be possible to prevent data alteration and the like.

When entries are made on a voucher, as described earlier, prescribed time stamp data are inserted into the handwriting data by the reading apparatus 10. If the voucher has been properly filled out, then the time stamp data contained in the handwriting data of that voucher should indicate roughly the same time. If the time indicated by the time stamp data in a certain entry column—say the amount column, for example—should be greatly at variance with the time indicated by the time stamp data inserted in another entry column, it can thereupon be judged that an improper entry was made in that entry column.

Accordingly, the computer 20 extracts the time stamp data contained in the handwriting data during character recognition, and determines whether all of the handwriting data in the voucher were written within a certain timeframe. When data are present that were entered outside of that timeframe, it is judged that an examination needs to be conducted as to why those data were entered at a different time, and a message to that effect is displayed. When such a message is displayed, the sales office manager may request to see the original voucher made by the salesperson so that it can be reexamined visually, or, when necessary, he or she may call that salesperson in for questioning. When irregularities are detected based on time stamp data, it becomes impossible to make irregular voucher operations merely by imitating someone's handwriting, and security is greatly enhanced.

Each reading apparatus 10 is given its own identification number which is transmitted together with handwriting data. Usually a number identifying a user (such as an employee code or salesperson code) is noted on each voucher. Thereupon, in the business processing apparatus 4, the identification numbers of those reading apparatuses for which that business processing apparatus can perform processing are registered. In addition, for each reading apparatus specified by an identification number, users qualified to use that reading apparatus are associated with an employee code or salesperson code.

If the configuration is so made, when handwriting is read from a reading apparatus 10, and both the identification number of the reading apparatus 10 and the number identifying the user are sent to the business processing apparatus, checks are made to see whether those transmitted identification numbers have been pre-registered in that business processing apparatus, and whether that reading apparatus has been used by a user qualified to use it. If checks are made in this manner based on reading apparatus identification numbers and numbers specifying the user, it is possible to prevent irregular transactions, such as someone from another section using a reading apparatus for which he or she is not registered to issue an unauthorized voucher, or someone who is not a salesperson wrongfully issuing a voucher.

File management procedures are now described.

In conjunction with character recognition processing, the computer 20 is capable of performing file management pertaining to vouchers. The handwriting data for each voucher are stored as one file on the hard disk 20d. In each file, in addition to the handwriting data, there may be seal image data when such are required. Also contained therein are codes indicating the type of style definition data forming the basis for generating those handwriting data. There will also be codes indicating that a voucher has been examined and authorized. Appended to these files, moreover, are retrieval index data. Index data are information for input frames that expedite retrieval. Possible index data would include the name of the writer, input date, and voucher number, etc. The computer 20, when recording the handwriting data sent as files from the reading apparatuses 10 on the hard disk 20d, adds index data to the handwriting data. Subsequently, the computer 20 can reference the index data when searching for a file on the hard disk 20d. In the case of computing a sales listing for a certain period of time, the voucher files input during that time are extracted by referencing the index data pertaining to the entry dates, whereupon total sales amounts and so forth can be calculated by totaling the invoice amounts during the period, for example. Or, when it is discovered subsequently that a voucher is in error and a user wishes to delete the data pertaining to that voucher, he or she can designate the voucher by its voucher number. Voucher number designation may be effected by entering numbers from the keyboard 20c or by using a bar code reader apparatus, etc. The computer 20 retrieves the voucher data corresponding to the designated voucher number from the hard disk 20d and deletes them.

When voucher numbers are used as index data, a bar code can be imprinted on a sales voucher, for example, as indicated by the reference character 15 in FIG. 15. This bar code is a unique number that is different for each of a plurality of vouchers. A bar code reader is then connected to the parallel port 10w of the reading apparatus 10, and the bar codes are read using this bar code reader. The reading apparatus 10 sends the bar code to the computer 20 along with the handwriting data. When performing character recognition on the voucher, the computer 20 prepares a file, appending the voucher number corresponding to the bar code 15 to the handwriting data.

The computer 20 is also capable of performing various file management tasks on the voucher data which accumulate as character recognition is performed, using the utility functions normally provided in a computer system. It can, for instance, store, read, delete, and copy voucher files. In order to prevent voucher content alteration, however, making revisions in voucher data is as a rule prohibited. Unless a password known only to certain managerial personnel is entered, the configuration prevents revision of voucher data.

Character display is now described.

Character displays necessary to the operation of a reading apparatus 10 are displayed on the LCD 10g of the reading apparatus 10. This display changes in response to manipulations of the switches 10r, 10s, and 10t. When a function selection switch 10r is manipulated, every time the switch button 10r is depressed, character data indicating a new function are read out from the RAM 10d and displayed on the LCD 10g. These displays scroll down, listing "normal mode," "bar code read mode," and "scanner read mode," for example. The bar codes read by the bar code reader are appended as character data to the handwriting data and used for reading the voucher ID, etc. Image data such as seal images read by a scanner are appended as bit-map-formatted data to the handwriting data.

When any of the switch buttons in the function selection switch group 10s is depressed, messages corresponding thereto, such as "discontinue," "remaining," "page end," or "transmit," are displayed. When "discontinue" is selected, the handwriting data read to that point are cleared. When "remaining" is selected, the power remaining in the batteries and the handwriting data memory space remaining are displayed. "Page end" is depressed when an operator has finished writing one voucher, whereupon the handwriting data and the voucher ID are made into a file and subsequent additions are disallowed. When "transmit" is displayed, the data inclusive of handwriting data stored in the handwriting data memory are transmitted to the character recognition apparatus 2.

When character data are transmitted from the character recognition apparatus 2 or business processing apparatus 4, character displays are made on the LCD 10g based on those data.

When the reading apparatus 10 also comprises the functions of the character recognition apparatus 2, its functions are increased, and it is therefore preferable that a touch panel type LCD be provided. An example of a display on the LCD 10g in such a case is depicted in FIG. 17.

Figure 17:
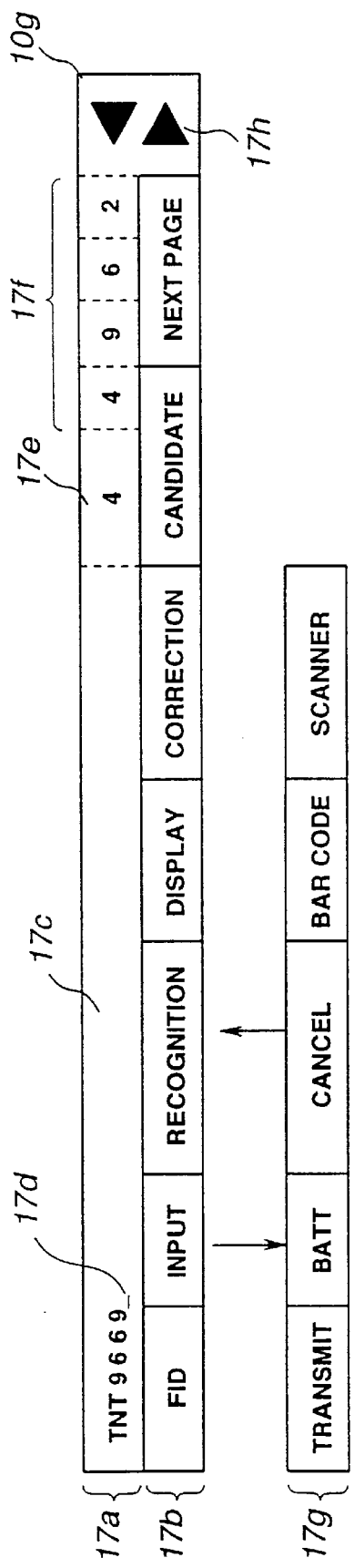
FIG. 17 is an example of an LCD display in a reading apparatus.

In FIG. 17, in the recognized character string display line 17a, the recognized character string display column 17c, character entry column 17e, and candidate character column 17f are displayed, wherein are displayed recognized character strings. In the operation icon display line 17b, the operation icons "FID," "enter," "recognition," "display," "correction," "candidate," and "next page" are displayed. When the icon "next page" is depressed by the pen 5 (an action hereinafter called "selection"), another operation icon display line 17g is displayed. In this display line are displayed the operation icons "transmit," "BATT," "cancel," "bar code," and "scanner." The direction designator icon 17h is also displayed.

The LCD surface is provided with a touch sensor (not shown in FIG. 5), and configured so that it can recognize icons pressed with the pen, etc., and positions on the LCD. In particular, the configuration is such that the resolution becomes higher in the character entry column 17e.

The "FID" icon is selected to select style definition data. When this icon is selected, the number of the style definition data stored in memory is displayed in column 17a. The operator selects the desired style definition data by selecting the direction designator icon 17h.

The "enter" icon is selected when the operator wishes to make entries on a voucher and generate handwriting data. When this icon is selected, handwriting data are generated corresponding to the characters entered on the voucher.

The "recognition" icon is selected when one wishes to implement character recognition. This icon is valid when the reading apparatus 10 also comprises the character recognition functions of the computer 20. When this icon is selected, character recognition is performed on all handwriting data produced since the "enter" icon was selected.

The "display" icon is selected when one wishes to read and display a character string already recognized. When this icon is selected, a character string recognized in the past is displayed in the recognized character string display column 17c. Earlier or later recognized character strings can be displayed by selecting the appropriate direction designator icon 17h.

The "correction" icon is selected when there is an error in a recognized character string. When a user wishes to make a correction in a recognized character string, he or she selects the "display" icon, displays the character string to be corrected, and selects the appropriate direction designator icon 17h to move a cursor 17d to the character to be corrected. Then the "correction" icon is selected, whereupon recognized character candidates corresponding to the handwriting data are displayed in the candidate character column 17f. If at this time the desired character appears in the candidate character column, that character is selected with the direction designator icon 17h. The selected character will be added to the recognized character string in place of the character on which the cursor 17d is placed. When the desired character does not appear in the candidate character column 17f, the user selects the "candidate" icon to display other candidates, and continues the procedure in like manner. When the desired character cannot be displayed by pressing the "candidate" icon, the user should very carefully write the character again in the character entry column 17e. Then, when the "recognition" icon is selected, the character written in the character entry column 17e is again subjected to character recognition, and candidate characters therefor will again be displayed in the candidate character column 17f. The user then searches for the desired character among these candidate characters.

The "next page" icon is selected to switch to other operation icons. When this icon is selected, the operation icon display lines 17b and 17g are alternately displayed.

The "transmit" icon is selected when one wishes to transmit data inclusive of handwriting data stored in memory in the reading apparatus 10. When this icon is selected, data inclusive of handwriting data stored in the handwriting data memory 10b are sent via the desired communications mode.

The "BATT" icon is selected to check on remaining battery capacity and memory capacity. When this icon is selected, remaining battery and memory capacity are displayed in column 17a.

The "cancel" icon is selected to cancel handwriting data. When this icon is selected, handwriting data read in since the last time the "entry" icon was selected are removed from the handwriting data memory 10b.

The "bar code" icon is selected to read a voucher bar code. When a user wishes to read in a bar code, he or she connects the bar code reader to the parallel port 10w, selects this icon, and reads the bar code imprinted on the voucher.

The "scanner" icon is selected when the user wishes to read a seal image or signature from a voucher. When that is the intent, the user connects a scanner to the parallel port 10w, selects this icon, and reads the seal image or signature from the voucher.

When data are transferred from the character recognition apparatus 2 or business processing apparatus 4, character display is also performed based on those data. This character display might, for example, be displayed in the recognized character string display column 17c. The characters displayed are data that a salesperson needs to know when taking an order. Such data include the invoice quantity, availability of product, warning notices, etc., extracted from the database in the business processing apparatus 4.

The advantages of this embodiment are now listed.

(1) Based on this embodiment, the onerous operation of keyboard entry associated with inputting vouchers to a computer can be avoided. More specifically, it ceases to be necessary for an operator to enter from a keyboard items written on a voucher, so that operator workload can be reduced. Also, since the filled-out voucher prepared on a reading apparatus remains at hand, the present invention offers the benefit of reducing the work duplication of writing by hand and making entries from a keyboard, while satisfying the requirements for voucher retention.

(2) Based on this embodiment, the erroneous data entries associated with keyboard entry can be avoided. By implementing error checks and other data checking, unauthorized vouchers and miswriting can be eliminated. Another benefit is gained, therefore, in that error checks can be implemented even when there are irregularities in what is written by hand on the vouchers.

(3) Based on this embodiment, a configuration is provided wherein time stamp data are combined with the handwriting data, thereby making it possible to prevent data alteration or other unauthorized procedures.

(4) Based on this embodiment, data communications can be effected using portable information communications equipment such as PHS units, in addition to wire telephones. Therefore, handwriting can be read irrespective of whether indoors or out, or whether or not line facilities exist, making it possible to enhance the efficiency of all kinds of business.

(5) Based on this embodiment, a configuration is provided wherewith replies to written particulars, indoors or out, can be displayed as characters, so that reply information needed by a sales division, etc., can be provided very quickly.

(6) Based on this embodiment, a configuration is provided wherewith the positions of vouchers are detected, and corrections thereto can be made when the voucher is not placed correctly. Vouchers can therefore be filled out without worrying about the position they are placed in.

(7) Based on this embodiment, a configuration is provided wherewith character information can be read out from handwriting entered on a voucher, wherefore characters on writing media can be recognized correctly and efficiently. In particular, if specimen files or character data files are prepared using such parameters as character pitch, number of intersections, and stroke count, the character recognition rate can be raised. If character recognition based on directional elements is done and character segregation is performed, the character recognition rate can be raised even higher.

(8) Based on this embodiment, a configuration is provided wherewith deletions from and corrections to the handwriting content in a voucher can be read. Therefore information can be correctly recognized even when there are deletions and corrections made in the handwriting content.

(9) Based on this embodiment, a configuration is provided wherewith vouchers can be designed, so that vouchers can be designed in any desired format.

(10) Based on this embodiment, a configuration is provided wherewith such verification information as seal image data and signature handwriting data can be read, so that irregular or unauthorized vouchers can be recognized and removed.

(11) Based on this embodiment, the configuration is such that voucher formats are specified by style definition data, making it possible to select and use the desired voucher format from a plurality of vouchers.

(12) Based on this embodiment, the configuration is such that data inclusive of a plurality of handwriting data can be transmitted in one batch, wherefore it is not necessary to have the character recognition apparatus and reading apparatus connected all the time. This is an economical feature when communications are effected using public communications lines.

(13) Based on this embodiment, voucher position is detected on the bases of handwriting entered in mandatory entry columns which must have entries made in them. Thus there is no need to make entries merely for position detection, so that character entry is made less onerous.

(14) Based on this embodiment, a database is provided wherein are stored data, inclusive of handwriting data, associated with index data, thus permitting fast retrieval operations.

(Second Embodiment)

Figure 18:
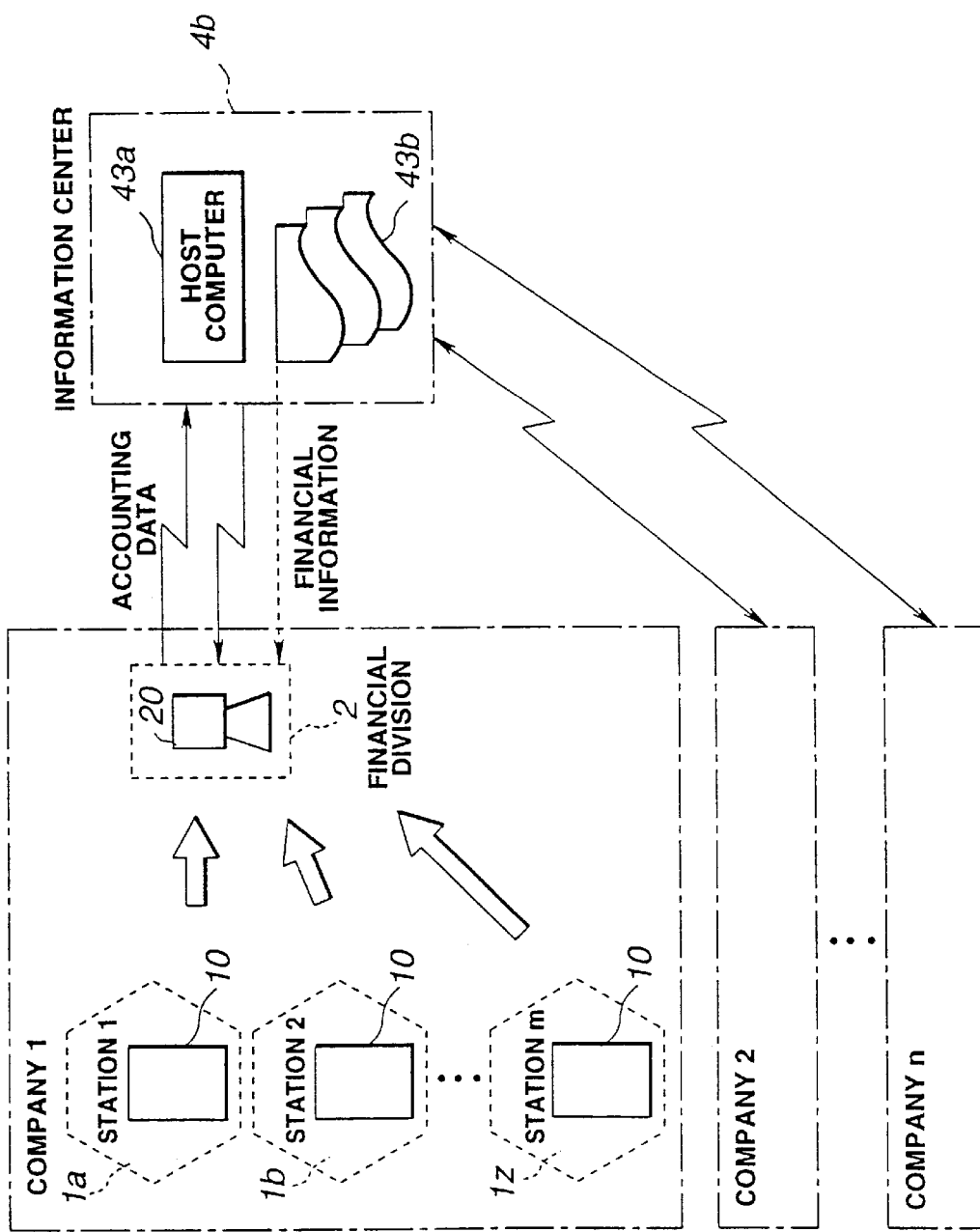
FIG. 18 is a block diagram of a business management system in a second embodiment of the present invention.

In FIG. 18 is given a general diagram of a business management system in a second embodiment of the present invention. The business management system diagrammed in this figure is for managing financial processing in stores or affiliate companies.

Companies 1 to n (where n is a natural number) represent affiliated companies or stores, respectively. In each company 1 to n are located a plurality of duty stations 1 to m (where m is any natural number). These duty stations are provided, respectively, with reading apparatuses 10. These reading apparatuses 10 are configured as are the reading apparatuses associated with the first embodiment, described earlier, so no further description thereof is given here.

A computer 20 is installed in the financial division of each company 1 to n, respectively. This computer 20 is a character recognition apparatus 2 configured as in the first embodiment, so no further description thereof is given here. This computer 20 collects, and performs character recognition on, handwriting data transmitted to it from the reading apparatuses 10 at the duty stations 1 to m. More specifically, the computer 20 is configured so that handwriting data based character recognition, erroneous entry revision processing, correction processing, and security checks are made for each information item (field) in the accounting voucher, and so that accounting data made up of such character data can be generated. The computer 20 may also be made so that it can be used as an accounting voucher design terminal.

A host computer 43*a* in an information center 4*b* is connected to the computers 20 of the financial divisions via the communications infrastructure. The host computer 43*a* performs the same business processing as the host computer 40 in the first embodiment, described earlier, but is configured so that by executing prescribed program data the system can be made to function as an accounting management system. The host computer 43*a* in the information center comprises a database for accounting data, and is capable of preparing accounting documents.

Financial information that constitutes data pertaining to the accounting documents is sent from the information center to the companies 1 to n via the communications infrastructure. The communications infrastructure is assumed to be the same as in the first embodiment, described earlier.

In the business management system configured as described above, when a user places an accounting voucher in a reading apparatus 10 and enters the necessary items, the handwriting data are detected in the same manner as in the first embodiment and sent to the computer 20. The computer 20 performs character recognition based on these handwriting data, while also performing erroneous entry correction procedures, position correction processing, and security checks, etc., whereupon the accounting data are transmitted to the host computer 43*b*. In the host computer 43*b*, records based on the accounting data are stored in the accounting database, and corresponding financial information is read and transmitted to the reading apparatuses 10.

Accordingly, based on this second embodiment, in addition to the benefits provided by the first embodiment, accounting data can be processed in real time, and daily settlements can be made. Also, since no keyboard entry operations are necessary, work efficiency is enhanced, and keyboard entry errors can be avoided. The business management system in this embodiment is particularly useful in relatively small stores and companies which enter accounting vouchers from keyboards. The business management system in this embodiment can also be applied to personnel information registration operations in a company. More particularly, simultaneously with the entry of personnel information on a registration form placed on a reading apparatus 10, handwriting data are detected, and character strings representing personnel information based on the handwriting data are automatically generated.

(Third Embodiment)

The third embodiment of the present invention concerns a business management system for receiving complaints by telephone. The system also has applications in processing mail order sales and questionnaire surveys.

The configuration is described first.

Figure 19:
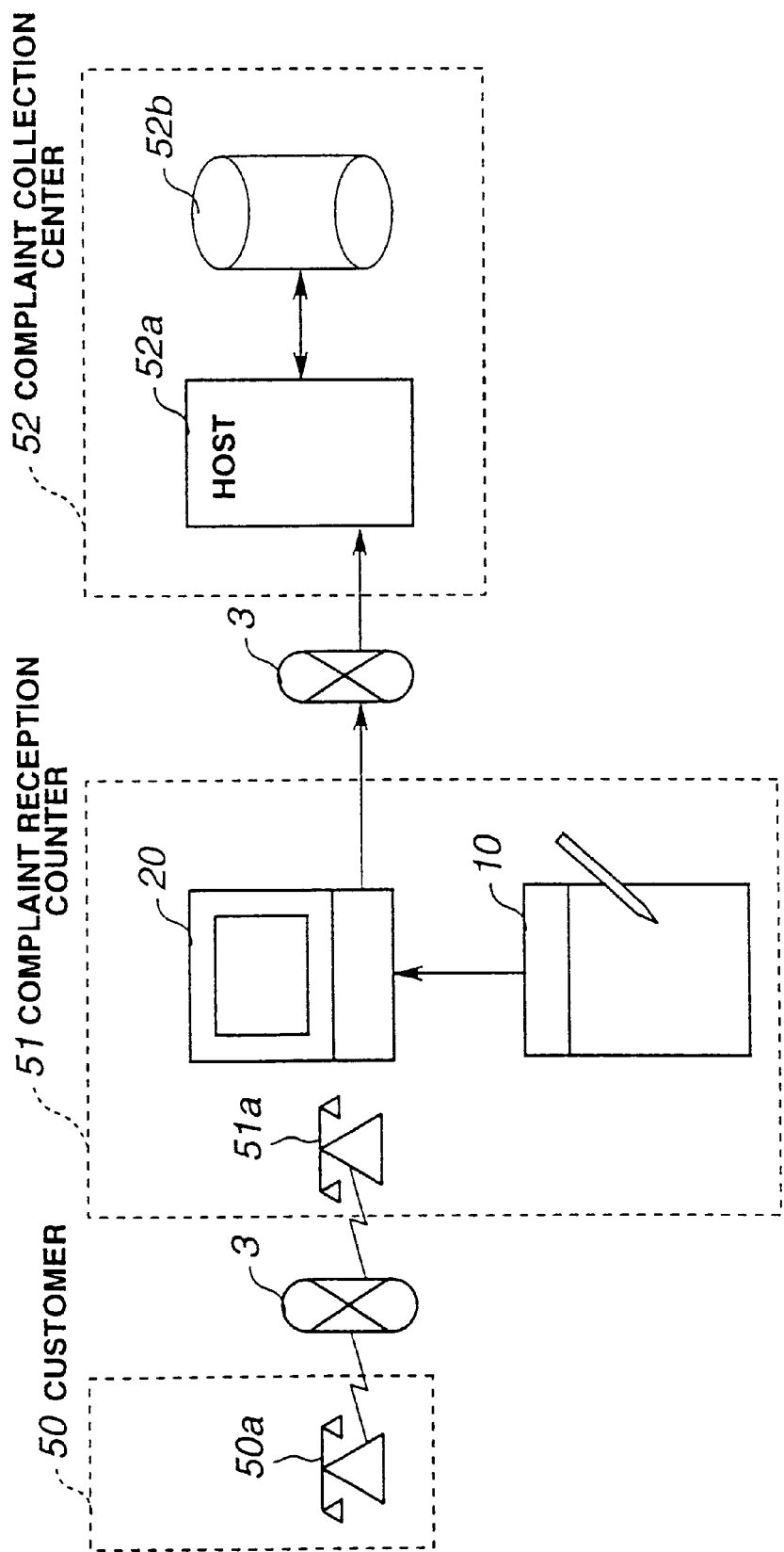
FIG. 19 is a block diagram of a complaint receiving and processing system in a third embodiment of the present invention.

FIG. 19 is a configurational diagram of the business management system in this embodiment. The system comprises a complaint receiving counter 51 and a complaint aggregating center 52. The complaint receiving counter 51 comprises a telephone 51a, a reading apparatus 10 and a computer 20. The complaint aggregating center 52 is the business processing apparatus of the present invention and comprises a host computer 52a and a database 52b.

A telephone 50a for customers 50 is a telephone for communicating complaints, etc., concerning products purchased by customers from manufacturers, to the complaint receiving counter 51. The telephone 51a is a telephone used by an operator in charge of receiving complaints for the purpose of receiving complaints from customers 50. The telephone 50a used by customers and the telephone 51a at the complaint receiving counter 51 are connected via the communications infrastructure 3 indicated in the first embodiment. The writing medium placed in the reading apparatus 10 is a complaint receipt form that is formatted to permit the entry of complaint particulars such as the customer's member number, telephone number, name, and nature of the complaint. The database 52b in the complaint processing center 52 comprises accumulated databases which comprise records containing customer related fields such as member number, telephone number, name, and previous complaint submission history.

The configuration and operation details of the reading apparatus 10 and computer 20 are more or less the same as were noted in conjunction with the first embodiment, so no further description is given here. The operation of the system in this embodiment is described next. When a customer 50 calls in a complaint to the complaint receiving counter 51, the operator at the complaint receiving counter 51 first asks for the customer's member number or telephone number and enters this information in the prescribed column in the form on the reading apparatus 10. The operator's handwriting is sent as handwriting data to the computer 20 and there subjected to character recognition, which converts the data into character code. This character code is then sent via a public communications line to the host computer 52a.

The host computer 52a references this character code and searches the database 52b, extracting that customer's records, which it sends as record data back to the complaint receiving counter 51. The computer 20 at the complaint receiving counter 51 displays these customer records.

The operator views the customer records displayed by the computer 20, verifying the name and other information. In addition to such basic records as customer name and so forth, the computer 20 also displays the customer's complaint history. If the customer has submitted similar complaints in the past, the dates, particulars, and number thereof are displayed. Among customers are those of a perverse nature who are not really making complaints about a product, but are instead trying to intimidate the manufacturer into giving them some kind of payoff. The operator references the complaint history of the customer submitting the complaint and thereby determines whether or not that customer is of the perverse variety. When it is determined that the customer is of the perverse type, the particulars of past complaints are explained. Either the customer retracts the complaint or some special measure is taken such as connecting the customer to a superior. When it is determined that the customer is not of the perverse variety, the complaint particulars are written down on the form. These particulars are sent as image data generated from handwriting data to the complaint processing center 52, and written into the customer's records. Meanwhile, the form on which the complaint was written is separately retained in safekeeping. At the complaint processing center, the complaint is processed according either to the complaint particulars in the customer record sent from the complaint receiving counter 51 or to the complaint written on the form.

When this system is applied to the processing of mail order sales orders, instead of complaints, the product codes and names of products ordered by customers are subjected to character recognition and the resulting data sent to a center, from which the products are shipped and where invoices are processed, etc.

When this system is applied to the processing of telephone questionnaire surveys, the operator orally asks questions written down on a form of respondents, and enters the answers to these questions from the respondents in check boxes. These are subjected to character recognition and the resulting data sent to a center which totals the results of the questionnaire.

The present invention also has applications in managing emergency telephone calls such as the 119 that is dialed to call the fire department in the case of fire or the 110 that is dialed to call the police in the case of a an emergency requiring police attention.

Figure 20:
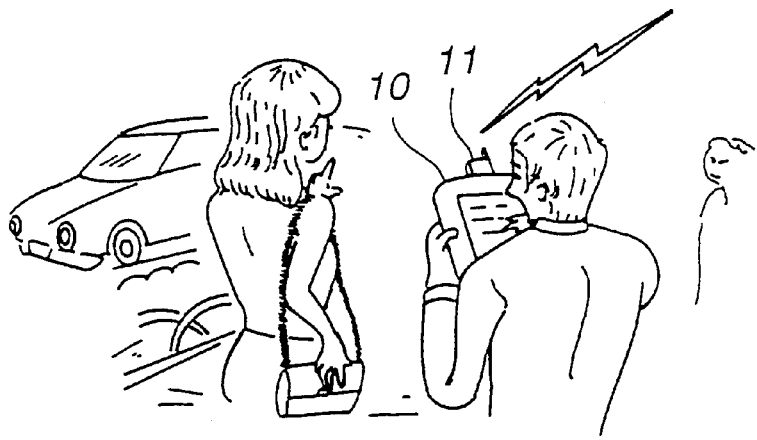
FIG. 20 is an example of using a reading apparatus in processing questionnaires.

By having the reading apparatus 10 used by a questionnaire surveyor, as illustrated in FIG. 20, on-the-street questionnaire surveys can be conducted. In this application, it is preferable that the reading apparatus 10 be equipped with a PHS 11 and otherwise configured to permit the radio communications of data between the survey site and the computer 20.

The questionnaire surveyor carries the reading apparatus 10 on the street and surveys passersby. When this is being done, handwriting data corresponding to the particulars entered into a questionnaire form are sent directly by the PHS 11 to the computer 20 and there subjected to character recognition. The character strings thereby recognized are transmitted immediately to the business processing apparatus. The business processing apparatus, based on these character strings, reads answer information relating to the questionnaire from a database and sends the information to the reading apparatus 10. As a result, information on answers to that questionnaire can be displayed on the LCD 10g of the reading apparatus 10 right on the site. If personality judgments or divinations are processed by the business processing apparatus, based on the results of the questionnaire character recognition, and those results are transmitted back as character strings, they can be displayed on the handwriting reading apparatus 10 of the surveyor. In other words, answer information can be fed back to the passersby who respond to the questionnaire.

Figure 21:
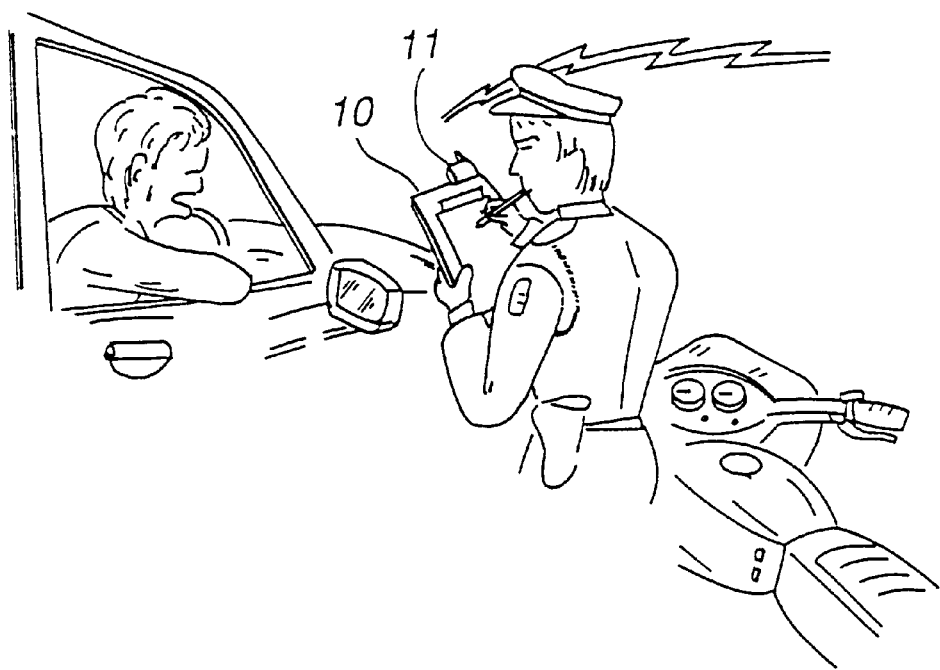
FIG. 21 is an example of using a reading apparatus in traffic management.

Similarly, this system can be used for traffic law enforcement as illustrated in FIG. 21. In this case also, it is preferable that the reading apparatus 10 be equipped with a PHS 11 and that it be otherwise configured to permit the radio communication of data between the field site and the computer 20.

When a traffic patrolman fills out a citation form for a speeding driver, for example, the citation form is set in the reading apparatus 10. The driver is then questioned, and the driver's name and license number, etc., are entered on the citation form. These handwriting data are transmitted via the PHS 11 to the computer 20 and there subjected to character recognition. Recognized character strings are then sent to a business processing apparatus which comprises a database for driver licenses. The business processing apparatus searches the database on the bases of information such as the driver license number contained in the sent character strings. As a result, the driving history of that driver is retrieved. The business processing apparatus generates character strings corresponding to that driver's history and transmits these to the reading apparatus 10 being used by the patrolman. The result is that the driver's driving history is displayed on the LCD 10g of the reading apparatus 10. Therefore, while filling out the citation form, the patrolman has immediate access to information on that driver. Conventionally, driver license numbers are verified by police radio separately from the action of preparing the citation form. With this system, however, such results will be fed back merely by preparing the citation.

Based on this third embodiment, as described in the foregoing, in addition to the same benefits provided by the first embodiment, information received by telephone can be entered by hand onto a form, thereby accessing a database, so that even persons unable to immediately use a computer can serve as reception operators.

Also, based on the handwritten particulars, a center database can be searched, and the search results verified by the operator, thus facilitating prompt and appropriate telephone responses based on previous records.

Also, particulars learned by telephone and taken down in shorthand can be recorded as image data so that on-screen verification can be made. Also, since there is no waiting time as there would be were a keyboard used, telephone conversations can be conducted without having the other party wait.

Furthermore, when portable information communications equipment such as a PHS unit is employed, a configuration is provided wherewith it is possible to display responses to handwritten particulars, indoors or out. It is therefore possible to quickly provide a questionnaire surveyor, traffic patrolman, or inspector, etc., with response information needed in the field. This permits questionnaire surveys to be conducted which conventionally would not be possible, renders unnecessary the communications actions that must be made separately from form entry operations in conventional law enforcement situations, and permits both the diversification of services provided and the shortening of work times.

(Fourth Embodiment)

In the first embodiment, entry voucher forms were made by printing them. In this fourth embodiment, however, inventory information pre-registered in the computer are incorporated also, writing media for use in taking inventory are printed out from a computer-peripheral printer, and efficient inventory control is thus made possible.

The configuration is now described.

Figures 22, 23:
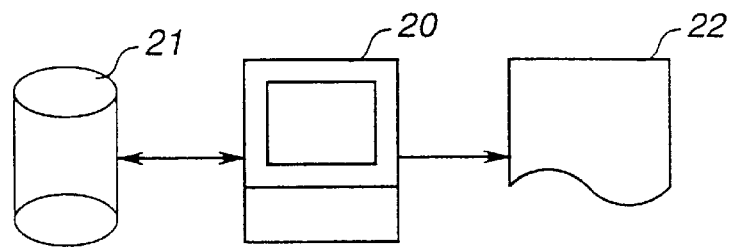
FIG. 22 is a block diagram of the printing of writing media in an inventory management system in a fourth embodiment of the present invention.
FIG. 23 is an example of an inventory writing medium used in the fourth embodiment.

The configuration wherein inventory-taking writing media are printed in this embodiment is diagrammed in FIG. 22. An inventory-taking list printing system comprises a computer 20 inventory database 21, and computer-peripheral printer 22.

The computer 20 is configured as in the first embodiment, but additionally configured so that it is possible to design inventory-taking lists. The inventory database 21 comprises a number of records that coincides with the number of products stored, each record comprising fields such as product name, product number, unit price, and inventory quantity.

In this configuration, the computer 20 references the inventory database 21 and designs an inventory-taking list. The basic design of the inventory-taking list is first determined by manipulations made by a designer, whereupon the style definition data for that inventory-taking list are generated. The details are the same as described in conjunction with the first embodiment. Each inventory-taking list is assigned a unique number. In the columns for product name, product number, unit price, quantity, etc., respectively, numerical values obtained by referencing the inventory database 21 are inserted, and this is printed out in the required number by the compute-peripheral printer 22.

In the inventory-taking writing medium 60 printed in this fashion, a list number column 60a, inventory table 60b, and check boxes 60c, etc., are arranged, as shown in FIG. 23. A revised quantity entry column 60d is provided in the inventory table 60b. Numerical values obtained by the computer 20 referencing the inventory database 21 are printed in the several columns therein for product name, product number, unit price, and inventory quantity, etc. The revised quantity column 60d and the check boxes 60c are printed as blank columns. The list number is pre-printed on the top of the list number column 60a. Alternatively, if the reading apparatus is equipped with a bar code reader as an input device 12, then the bar code encoded number is printed. It is permissible, of course, to leave this column blank and have the user enter the number.

At the bottom of the inventory-taking list, several column lines should be left blank so that products not recorded in the database can be entered.

Figure 24:
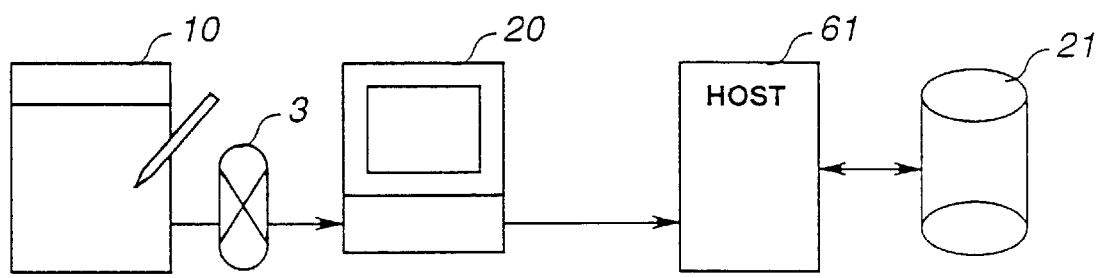
FIG. 24 is a block processing diagram for an inventory management system in the fourth embodiment.

In FIG. 24 is given a configurational diagram for an inventory processing system comprising a reading apparatus 10, computer 20, host computer 61 functioning as a business processing apparatus, and inventory database 21.

The configurational details of these are the same as in the first embodiment. However, style definition data created at the time of inventory-taking list design in FIG. 22 are transferred to the reading apparatus 10. The reading apparatus 10 and computer 20 are connected via the communications infrastructure 3. Preferably a PHS 11 will be attached to the reading apparatus 10 and the configuration made to enable radio-based data communications. The host computer 61 is configured so that it receives character data from the computer 20 and updates the inventory database 21.

The operation is now described.

Figure 25:
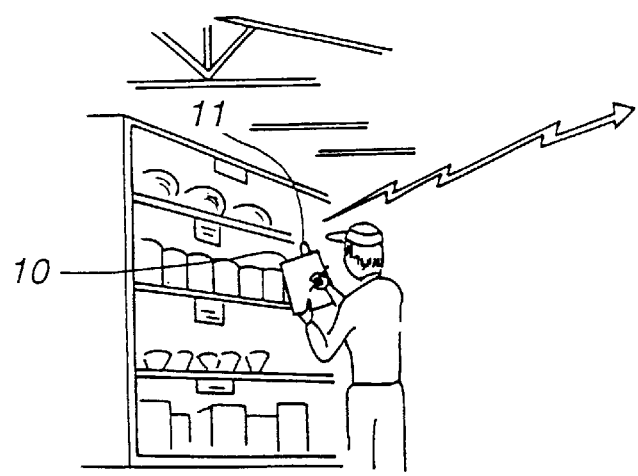
FIG. 25 is an example of reading apparatus use in inventory processing.

With the configuration described above, as depicted in FIG. 25, a worker first places an inventory-taking list 60 in the reading apparatus 10 which he or she carries about in performing the stocktaking. In the list number column 60a is entered the same list number that is printed at the top of the column. If the reading apparatus 10 is equipped with a bar code reader as an input device 12, the bar code printed on the inventory-taking list is read with the bar code reader. In performing the inventory inspection, when each product quantity coincides with the numerical value in the inventory quantity column on the inventory-taking list 60, no entry is made in the revised quantity column 60d. When it does not coincide, the correct quantity is entered in the revised quantity column 60d. Once a product has been inspected, a mark is made in the check box 60c. The correct quantity entries and check box marks are produced by the handwriting data.

In cases where a new product exists, the product name, product number, unit price, and inventory quantity thereof are entered in an empty column provided therefor.

Handwriting data are transmitted to the computer 20 from the PHS 11. The computer 20 performs character recognition on these handwriting data. Then, based on recognized character data, data indicating inventory quantities corresponding to the product columns are produced. The overall position of the handwriting is specified by inclination correction, etc., so product columns can be specified corresponding to the position wherein the handwriting is detected. The computer 20 transmits these data in a certain format to the host computer 61. The host computer 61, based on the data sent to it, searches the corresponding inventory database 21, and reads the corresponding inventory data from the database. Next, the PHS 11 being operated by the worker is read via the communications infrastructure 3. Then the character data indicating the product names and product codes read from the database, the inventory quantities before revision, and the character data indicating the new inventory quantities generated by this latest character recognition are transmitted, following a set format. The reading apparatus 10 displays, on the LCD 10g, the character strings based on the data received via the PHS 11. When the worker has activated the function selection switch 10r, the CPU 10c displays the product name, etc., for other products.

The worker views the display and verifies whether or not the entered inventory quantities and check marks have been recognized as correct product columns. Should there be a large discrepancy between an inventory quantity stored in the computer theretofore and the entered inventory quantity, a counting error is a possibility, so the same product may be inventoried again. In the unlikely event that an entered inventory quantity has been erroneously character-recognized, character recognition is executed again. And, if it appears that a product was recognized out of place, the respective entries and character recognition are done again from the beginning. These operations can be made by manipulating the function selection switch 10r.

If it appears that product recognition was done correctly, the worker sends an instruction via the reading apparatus 10 to update the data. The host computer 61, upon receiving this instruction, updates the database 21. That is, the records for which marks are made in the check boxes 60c are processed with no change made to the inventory quantity. For those records for which marks are made in the check boxes that also have numerical values entered in the revised quantity columns, based on character data recognized from the handwriting entered in those revised quantity columns, the values in the inventory quantity fields are updated to the numerical values indicated by the character code. The results of these processes are sent together with the date of update to the inventory database 21 and the inventory particulars are updated. In FIG. 23, for example, products A, B, and C are inventoried, and the number "303" is entered in the revised quantity column for product C. Accordingly, the product inventory quantity for product C is changed from 305 to 303.

In addition to the inventory application described in the foregoing, the system in this embodiment can be applied to systems for checking product in-shipment and out-shipment quantities, maintenance inspection checking systems, construction process completion checking systems, and work progress verification systems, etc.

Based on this fourth embodiment, as described in the foregoing, in addition to realizing the same benefits as with the first embodiment, necessary inventory quantities are preprinted by referencing a database, so that the number of entries made by the persons actually inspecting the inventory can be held to a bare minimum. Accordingly, the danger of generating entry errors and character recognition errors is greatly reduced.

Also, since the number of entries is few, both work time and character recognition time can be saved.

Furthermore, with the system configured so that data written by hand, indoors or out, are subjected to instantaneous character recognition so that they may be used immediately in business processing, it becomes possible to greatly simplify the business process of taking inventory, indoors or out. Accordingly, intermediate costs can be reduced, and even reductions in product and service costs are possible.

(Fifth Embodiment)

A fifth embodiment concerns a work processing and directing system wherewith even a novice can expertly use complex automated office equipment to perform certain tasks.

The configuration thereof is described first.

Figures 26, 27:
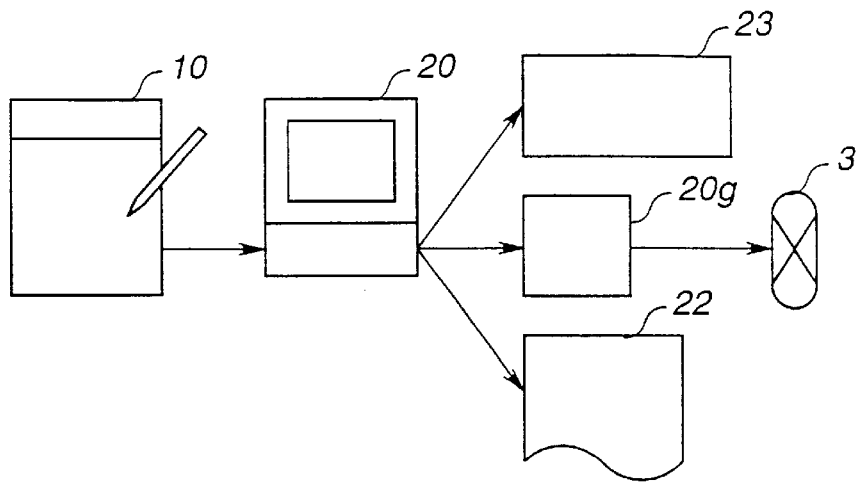
FIG. 26 is a block diagram of a work processing and directing system in a fifth embodiment of the present invention.
FIG. 27 is an example writing medium used in work processing and direction.

FIG. 26 is a block diagram of the work processing and directing system in this embodiment. As shown therein, the system is configured with a reading apparatus 10 connected to a computer 20 so that handwriting data can be transferred therebetween, and with a fax machine 23, modem 20g, and printer 22 connected so as to be controllable. The reading apparatus 10 and computer 20 are configured as in the first embodiment, so no further description thereof is given here. In this embodiment, however, the computer 20 is also configured so that, in addition to functioning as a character recognition apparatus, it can operate as a business processing apparatus. This business processing apparatus is configured so that, when check boxes on a check sheet are checked, it can execute processing associated therewith.

The fax modem 23 is configured so that it can convert data sent to it from the computer 20 into G3 format facsimile image data and transmit those data. The modem 20g is configured so that it can be connected to the communications infrastructure 3 and transmit electronic mail. The printer 22 is configured so that it can print characters.

The operation of this system is now described.

In the configuration described above, business processing check sheets are classified by work type and printed out in advance using a writing medium design terminal. Taking as an example a work processing check sheet for the process of setting up meetings with outside clients, a check sheet 70 is printed having the look depicted in FIG. 27.

First, when an operator is performing processing to set up a meeting, he or she places this check sheet 70 in the reading apparatus 10, and enters his or her name or employee code in the person-in-charge column. Next, processing is performed following the processing procedures noted on the check sheet. When a name is entered in the person-in-charge column, the resulting handwriting data are sent to the computer 20 and there subjected to character recognition. The computer 20 compares the character code resulting from the character recognition to a pre-registered employee database, and, when it is determined that this is a proper employee, a document creation environment is set up constituting process 1. That is, a document creation application is loaded, and a meeting set-up template is displayed. When the operator is not a proper employee, processing is discontinued.

When the operator has created a meeting set-up document using the document creation application in the computer 20, he or she makes a mark in the check box for process 1 on the check sheet 70. When a mark is made in this check box, the computer 20 subjects this to character recognition, and stores the created document under an appropriate file name.

Next, in order to print out the created document, the operator enters the number of sheets to be printed in the number-of-sheets column for process 2 on the check sheet 70. When the number of sheets to be printed has been entered and a mark made in that check box, the computer 20 subjects this to character recognition and prints out the meeting set-up document on the printer 22 via the document creation application. Next, in order to fax the created document to the persons attending the meeting, the operator places a mark in the boxes of the customer groups, for process 3 on the check sheet 70, to which he or she wishes to fax the sheet. Instead of establishing fax destinations by group, as here, they may be established by a list of individuals. When a mark is made for a customer group and a mark is made in the check box, the computer 20 subjects this to character recognition and sends document data to the fax modem 23. Alternatively, the telephone number of a customer marked may be accessed by referencing a pre-registered database and this sent to the fax modem 23. The fax modem 23 sends the same document data to each customer, changing only the destination and the contents of the transmittal sheet.

Furthermore, the operator may send electronic mail to persons having an email address by marking the customer group to which email is to be sent, for process 4 in the check sheet 70. The computer 20 sends electronic mail to those customers via the modem 20g, in the same manner as fax transmissions are made.

Based on this fifth embodiment, as described in the foregoing, in addition to realizing the same benefits as with the first embodiment, check-sheet formatted writing media are prepared for each process category, so that, if checks are made following the instructions given therein, the computer will automatically activate the necessary automated office equipment, wherefore even a novice can carry on work, expertly using complex equipment without error.

Also, after a document has been created, if the process one wants performed is entered on the writing medium, the computer 20 will automatically carry out that process, wherefore savings can be realized in time spent handling automated office equipment.

Also, since the writing medium itself is retained, checks can be made by superiors and histories for controlling job content can be created as the work is being done.

In addition to automated office work support systems, this embodiment can be applied to process controls involving NC machine tools. For example, a list may be printed containing check boxes for each process number, wherein fabrication component quantities can be entered. When such a list is placed in the reading apparatus 10, and the process number checked after entering the required number of components, these are subjected to character recognition, and the required number of components are fabricated, in the correct order. The relationship between process number and process content is predetermined by the business processing apparatus.

(Sixth Embodiment)

A sixth embodiment concerns a bid management system used in auctions. The configuration thereof is described first.

Figure 28:
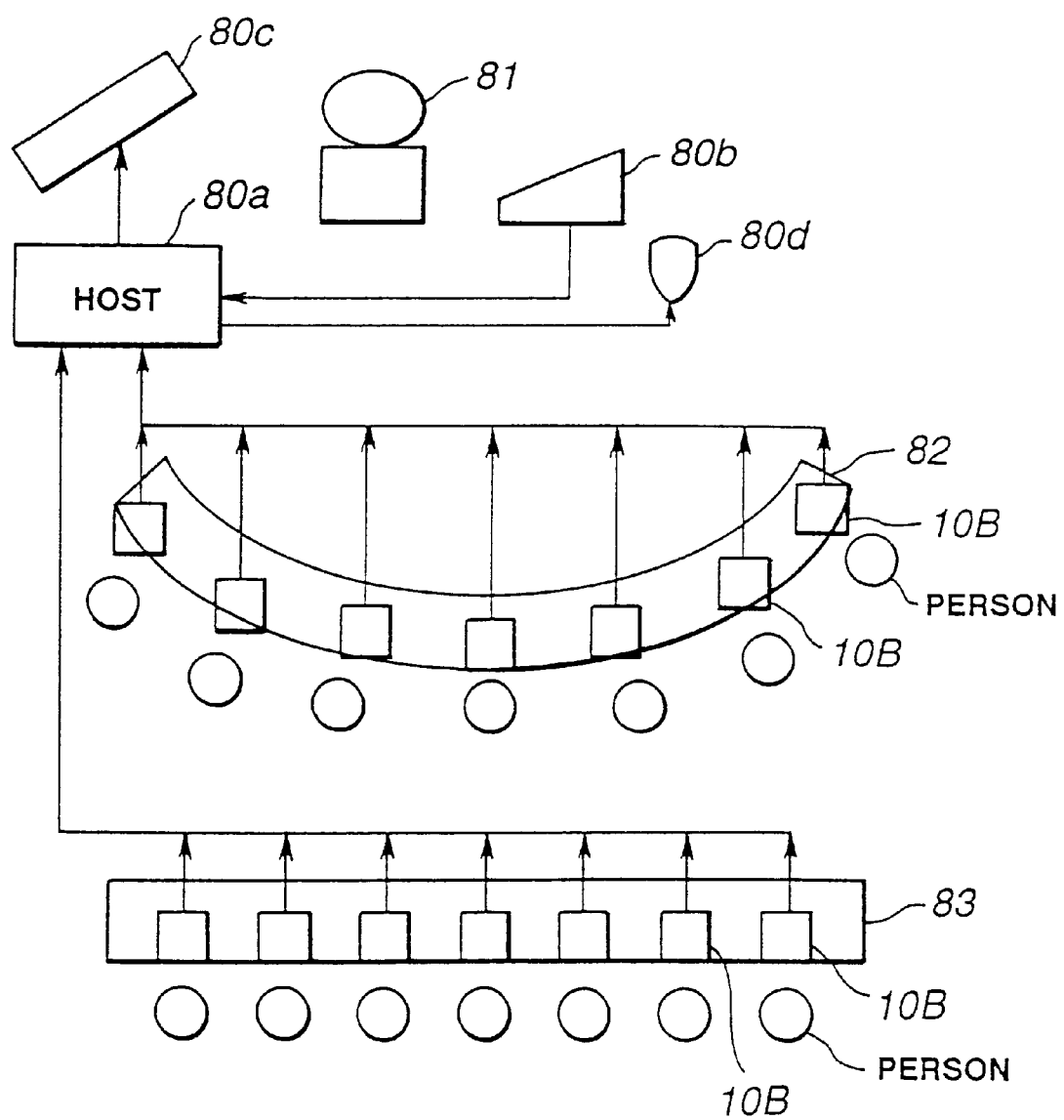
FIG. 28 is a block diagram of a bidding management system in a sixth embodiment of the present invention.

The bid management system in this embodiment, as diagrammed in FIG. 28, comprises a plurality of reading apparatuses 10B, a host computer is 80a, an input device 80b, a general audience monitor 80c, and a dealer monitor 80d. The reading apparatuses 10B are installed on tables 82 and 83 placed in front of bidders, wired so that recognized character strings can be sent to the host computer 80a.

The reading apparatuses 10B comprise the functions both of the reading apparatuses 10 and the character recognition apparatus 2 in the first embodiment. That is, when a reading apparatus 10B is used to enter characters, character recognition is performed, based on the handwriting data, and recognized character data are transmitted to the host computer 80a. This configuration and these operations combine the reading apparatus 10 and character recognition apparatus 2 of the first embodiment, so no further description thereof is given here. The host computer 80a is configured so that it aggregates the character data sent from the reading apparatuses 10B, and displays the results thereof separately on the monitors 80c and 80d. The input device 80b is configured so that it controls the host computer 80a and so that it can issue instructions on what particulars are displayed on the monitors 80c and 80d.

The operation of this embodiment is now described.

In the configuration described above, a dealer exhibits an article 81 for bidding and informs the bidders that the bidding is opened. The bidders all enter the amounts they wish to bid, concurrently, on forms placed in their respective reading apparatuses 10B.

The character data read and recognized at the reading apparatuses 10B are transmitted to the host computer 80a. The host computer 80a compares the amounts indicated by the character data transmitted, and displays the highest amount indicated by the character code on the monitor 80c. The name of the corresponding bidder may also be displayed together with the amount.

The other bidders, viewing the amount displayed on the monitor 80c, can then enter a higher amount in the next column on the form. When a higher amount is entered, that amount is displayed on the monitor. When it is judged that the amount has been fixed, the dealer announces that the bidding is closed, and voids further data transmissions from the reading apparatuses 10B. Thus is one round of bidding concluded. When a new bidding round is to be opened, the bidders replace the forms on their reading apparatuses, and await further directions from the dealer.

It is preferable that a column be provided on the form placed in the reading apparatus for the entry of a member number, and the system configured so that data are not accepted from nonmembers.

This system can also be applied to other bidding, auction, and securities transactions, as well as to parliamentary or congressional voting.

Based on this sixth embodiment, as described in the foregoing, in addition to realizing the same benefits as with the first embodiment, quiet bidding can be conducted by the entry of amounts, facilitating the participation in bidding even by persons unaccustomed to bidding. Also, the form on which the bid amounts are entered is retained by the bidder, which is another advantage.

Also, in markets where more than one person can successfully bid on the same article, there is no need to total the amounts instantaneously, wherefore bidders can make bids while carrying a reading apparatus about with them.

(Seventh Embodiment)

A seventh embodiment concerns a scoring processing system used by schools and preparatory schools.

The configuration thereof is described first.

Figure 29:
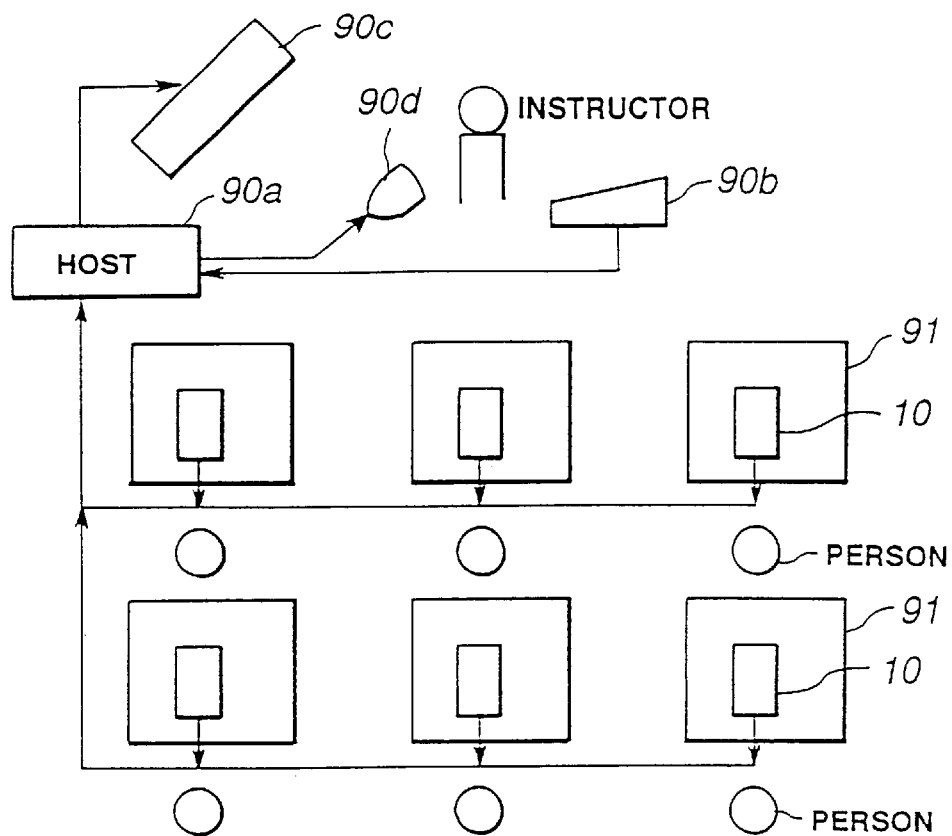
FIG. 29 is a block diagram of a scoring management system in a seventh embodiment of the present invention.

The scoring processing system in this embodiment, as diagrammed in FIG. 29, comprises a plurality of reading apparatuses 10B, a host computer 90a, an input device 90b, a general-audience monitor 90c, and an instructor monitor 90d. The reading apparatuses 10 are installed on desks 91 placed in front of students, connected so as to enable the transmission of handwriting data from the reading apparatuses to the host computer.

Figure 30:
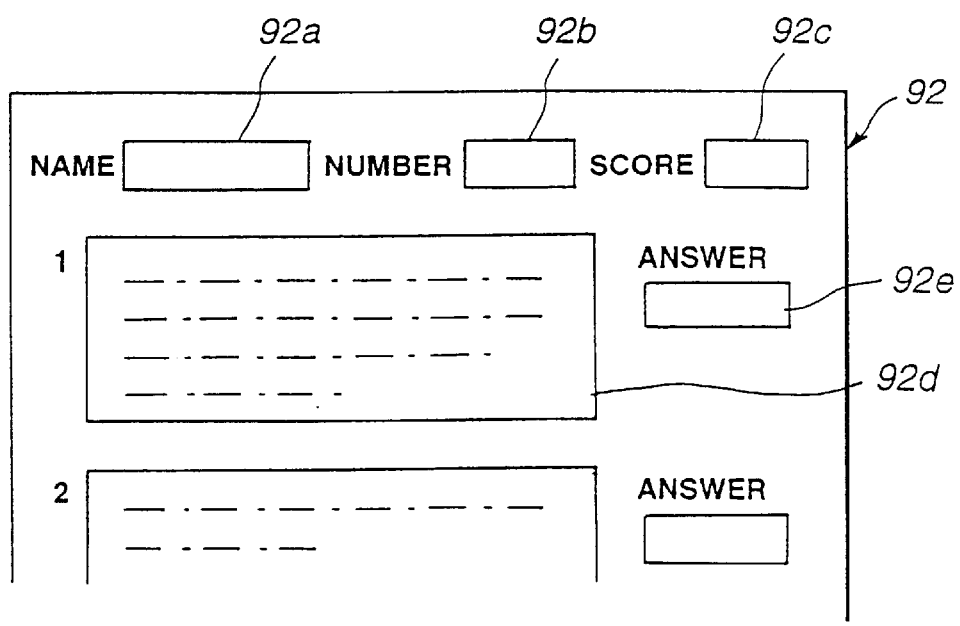
FIG. 30 is an example of an answer sheet.

The reading apparatuses 10B are configured as in the sixth embodiment, that is, having a configuration and functions that combine the reading apparatus 10 and character recognition apparatus 2 of the first embodiment. The host computer 90a is configured so that it totals the character data sent from the reading apparatuses 10B, and displays the results thereof separately on the monitors 90c and 90d. The input device 90b is configured so that it controls the host computer 90a and so that it can issue instructions on what particulars are displayed on the monitors 90c and 90d. Each of the reading apparatuses 10B is provided with an answer sheet 92 as illustrated in FIG. 30.

The answer sheet 92 is designed beforehand using a writing medium design terminal, and the resulting block copy is printed in volume. The name column 92a is a column for entering a name, the number column 92b is a column for entering a student number, and the score column 92c is a column for entry of the final score by the scoring instructor. The solution column 92d is a column in which solution steps are entered leading up to a final answer. The answer column 92e is a column for entering only the answer finally arrived at. Of these columns, the number column 92b and answer column 92e are subjected to character recognition, while the solution column 92c is processed as image data. The style definition data for this answer sheet are sent to each of the reading apparatuses 10B.

The operation of this system is now described.

In the configuration described above, the instructor uses the input device 90b to display problems on the monitor 90c. The students are then instructed to solve these problems within a specified time.

Each student enters his or her name and number in the appropriate columns on the answer sheet 92 on his or her reading apparatus 10B. Handwriting data for the numbers are subjected to character recognition and transmitted to the host computer 90a. In the host computer 90a, a pre-registered student database is referenced, and the results, such as which students are in attendance, etc., are displayed on the monitor 90d viewed by the instructor.

The handwriting data generated when a student makes entries in the solution column 92d are not subjected to character recognition, but are sent as they are to the host computer 90a. The instructor can display the solution status of any student in attendance as image data on the monitor 90d by manipulating the input device 90b, and thus be aware of that solution status. When a student derives a final answer, he or she enters that in the answer column 92e. The handwriting content entered in this answer column 92e is subjected to character recognition by the reading apparatus 10B, and then sent as recognized character data to the host computer 90a. The host computer 90a compares the character data so transmitted against pre-registered correct answer data, and displays the errors made by each student on the monitor 90d. The time elapsed from the first entry made in the solution column 92d until the final answer is entered in the answer column 92, for each problem, is measured, and statistics are generated for each problem. When the time allowed for the solutions has elapsed, the instructor announces the termination of solutions, and instructs the host computer 90a, via the input device 90b, to total the results. Any subsequent solutions are not accepted. The host computer 90a scores each student based on the character data sent to it from the reading apparatuses 10B, for each of the answer columns 92e. Deviation values are also calculated. Overall averages, averages for each problem, and deviation values for each problem are also calculated. These data can be displayed on the instructor's monitor 90d at any time. The instructor may also manipulate the input device 90b to display any information thought necessary on the monitor 90c so that it can be viewed by the students.

After the solution time has ended, the instructor transitions to explaining the problems just completed. The instructor manipulates the input device 90b to display the correct solution method and answer on the monitor 90c. The instructor may also sequentially display, on his own monitor 90d, the image data from each student's solution column 92d, and display the images for either good examples or bad examples of solutions on the monitor 90c. That example can then be critiqued immediately.

Students may be allowed to retain their answer sheets 92 for review, or these answer sheets 92 may be collected, scored by the instructor to see if the correct solution methods have been used, and returned to the students after entering final scores in the score column 92c. If the test is being administered for the purpose of practice in the interest of learning, and not as a test of ability, then the answer sheets 92 may be scored by the students without correcting them. Based on this seventh embodiment, as described in the foregoing, in addition to realizing the same benefits as with the first embodiment, scores can be tallied immediately after students have provided solutions and answers, without collecting the answer sheets, wherefore the labor of collecting test results immediately by an institution needing to do so can be reduced, and the time required for scoring shortened.

Also, since it is possible to display and critique solution steps in image form immediately, review can be accomplished while the students awareness of the problems is still high, resulting in enormous educational benefit. When this is done, scoring and totaling can be done instantaneously, wherefore students can immediately determine what their abilities are, which is an added convenience.

Furthermore, the labor of collecting, scoring, and returning answer sheets is unnecessary, wherefore effective teaching can be done in classrooms having only one instructor.

Also, records are made of the time required for each student to solve each problem, as well as what order of steps was followed in solving the problem. This permits detailed examination guidance, such as concerning correct solution methods or time management, that is not possible conventionally.

(Eighth Embodiment)

An eighth embodiment of the present invention concerns the application of the business management system of the present invention to a ticket sales system.

The configuration thereof is described first.

Figure 31:
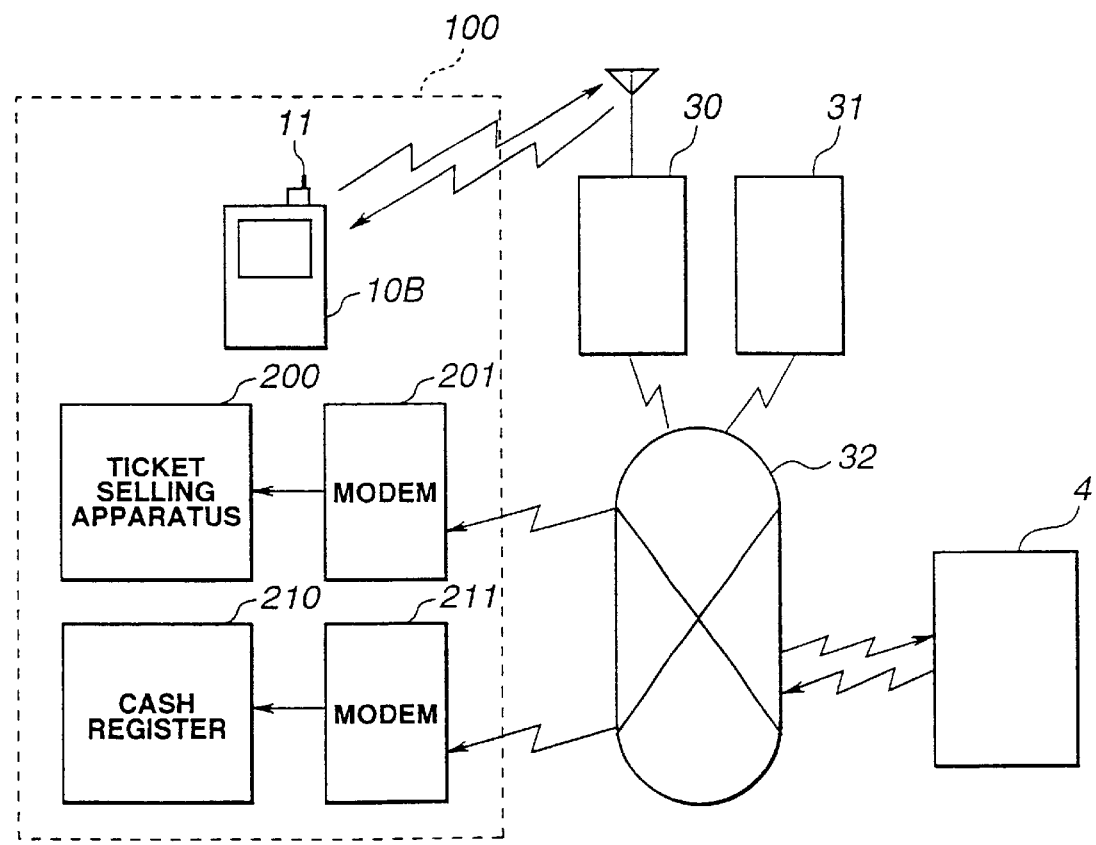
FIG. 31 is a block diagram of a ticket sales system in an eighth embodiment of the present invention.

FIG. 31 is a block diagram of the ticket sales system of the present invention. This system is for installation in convenience stores, at least one of which now exists in virtually every town. The place of installation is not limited to convenience stores, of course, and the system may be installed in other stores or public facilities.

In FIG. 31, a convenience store 100 is equipped with a reading apparatus 10B, to which a PHS 11 is attached, a ticket sales apparatus 200, a modem 201, a cash register 210, and a modem 211. The reading apparatus 10B and PHS 11 are configured as in embodiment 6, so no further description thereof is given here.

Figure 32:
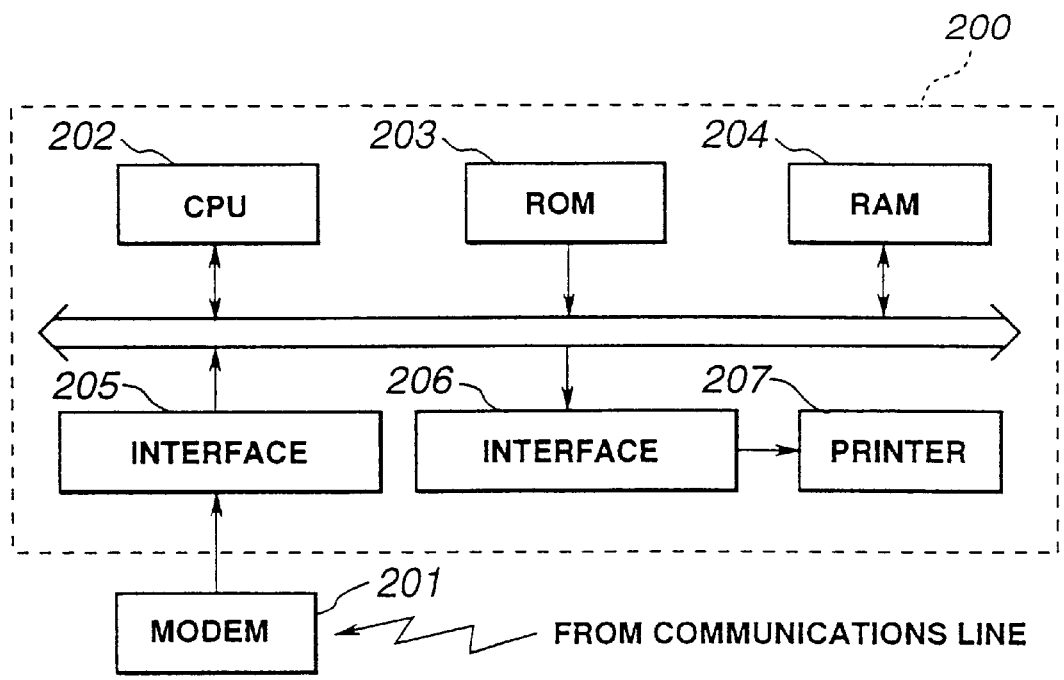
FIG. 32 is a block diagram of a ticket issuing apparatus in the present invention.

FIG. 32 is a block diagram of the ticket sales apparatus 200. As shown in this figure, the ticket sales apparatus 200 comprises a CPU 202, ROM 203, RAM 204, communications interface circuit 205, printer interface 206, and printer 207.

The CPU 202 is configured so that it can operate as the ticket sales apparatus of the present invention by executing a program stored in the ROM 203. The RAM 204, in addition to being used as a work area for the CPU 202, is configured so that it can store ticket issuing information input from a communications line 32 via the modem 201 and interface circuit 206. The communications interface circuit 205 is configured so that it can receive ticket issuing information input from the modem 201 via the communications line 32. The printer interface circuit 206 is configured so that it supplies print data sent by command of the CPU 202 to the printer 207. The printer 207 is configured so that, in response to the print data sent, it can print characters, etc., on ticket forms.

Based on this configuration, the ticket sales apparatus 200 is configured so that, when ticket issuing information is transmitted from the business processing apparatus 4 for the purpose of having tickets issued, it can issue tickets based on that information.

Figure 33:
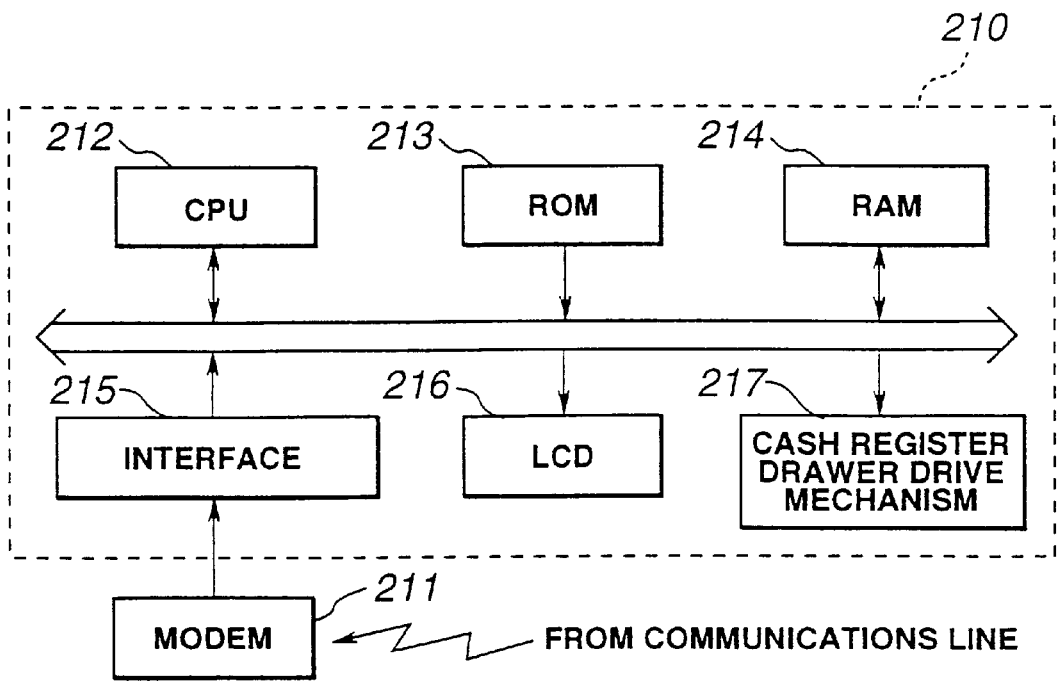
FIG. 33 is a block diagram of a register (cash register) in the present invention.

FIG. 33 is a block diagram of the ticket sales apparatus 210. As shown in this figure, the ticket sales apparatus 210 comprises a CPU 212, ROM 213, RAM 214, communications interface circuit 215, LCD 216, and register drive mechanism 217.

The CPU 212 is configured so that it can operate as a register (cash register) in the present invention by executing a program stored in the ROM 213. The RAM 214 is configured so that, in addition to being used as a work area for the CPU 212, it can store ticket fee information input from the communications line 32 via the modem 211 and interface circuit 215. The communications interface circuit 215 is configured so that it can receive ticket fee information input from the modem 215 via the communications line 32. The LCD 216 is configured so that it can display character information written by the CPU 212. The register drive mechanism 217 comprises a motor and a locking mechanism (not shown), and is configured so that, when a payment command is output from the CPU 212, the locking mechanism is unlocked, so that the cash drawer can be pulled out by the motor. When the cashier pushes the cash drawer back in far enough, the locking mechanism again locks.

Based on this configuration, when register permission information and amount information, comprising ticket fee information permitting tickets to be issued, are transmitted from the business processing apparatus 4, the ticket sales apparatus 210 displays the price of the ticket or tickets on the LCD 216, based on the amount information. When register permission information is transmitted, the locking mechanism is unlocked.

A relay station 30, control station 31, communications lines 32, and business processing apparatus 4 are the same as in the first embodiment, and are indicated by the same reference characters, so no further description thereof is given here.

Figure 34:
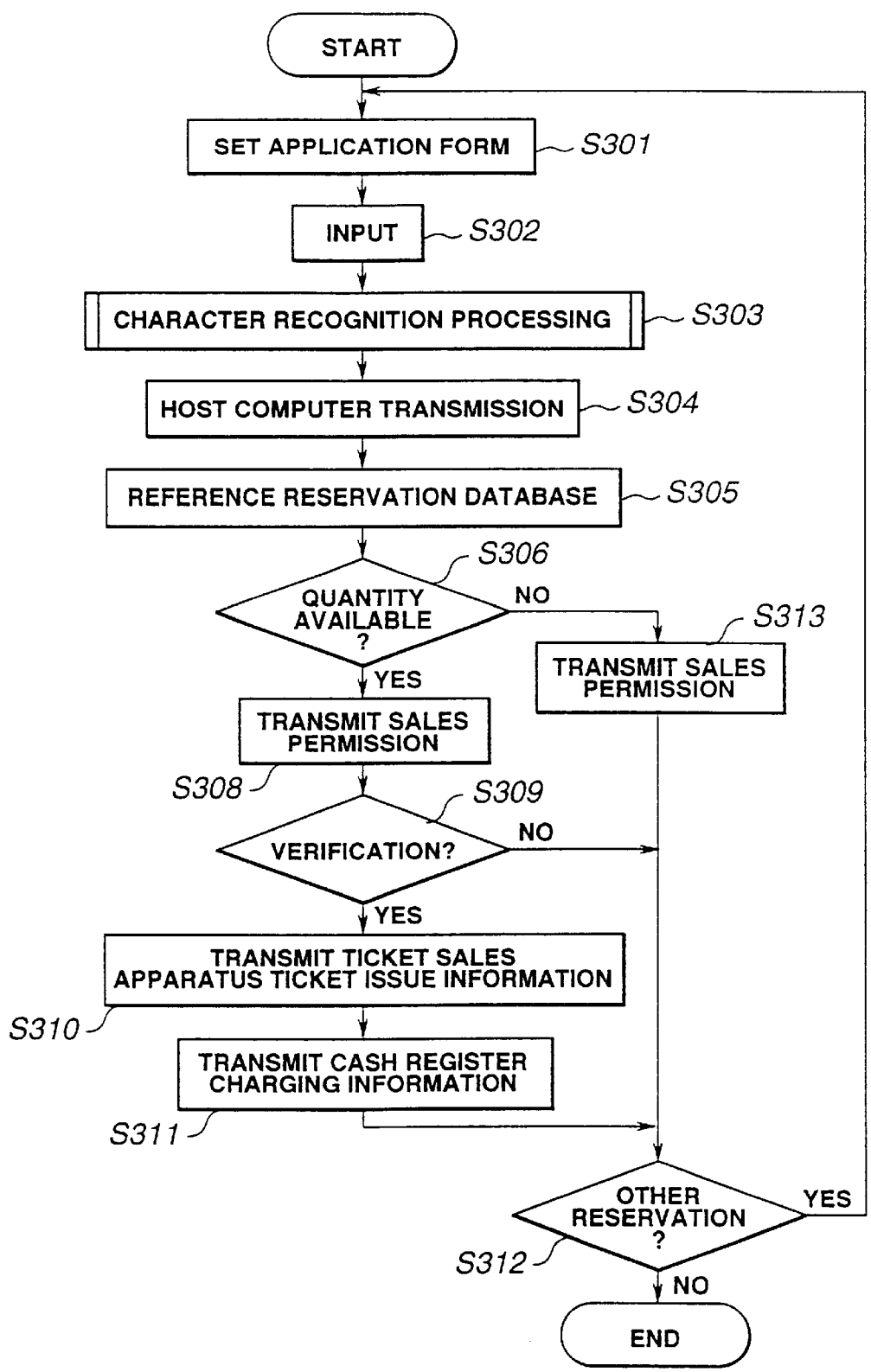
FIG. 34 is a flowchart for describing processing in the ticket sales system in the eighth embodiment of the present invention.

The operation of this eighth embodiment is now described, making reference to the flowchart in FIG. 34. For this processing it is presumed that a number of style definition data sets for ticket application forms have been prepared, and that the application forms have been distributed to the convenience store 100. It is further assumed that style definition data for the ticket application forms have already been transmitted to the reading apparatus 10B installed in the convenience store 100, and stored in the handwriting data memory 10b. It is possible, for example, to employ any of a plurality of style definition data sets according to the type of ticket, whether movie ticket, concert ticket, or event ticket, etc. It is also permissible, of course, to use only one type of style definition data for a standardized form.

The application form is provided with necessary entry columns, including a ticket number to indicate the ticket type, date and time of performance, seat classification, and number of tickets.

Now, in this configuration, a person wishing to purchase tickets first appears at the nearest convenience store 100. The store clerk learns from the purchaser what kind of ticket is to be bought, sets the style definition data in the reading apparatus 10B, and sets the application form therein also (S301). Next the store clerk enters the information for specifying the tickets desired by the purchaser on the ticket application form. The characters entered are subjected to character recognition by the reading apparatus 10B (S303).

The recognized character strings are transmitted to the business processing apparatus 4 via the communications interface 3 (S304). The host computer 40, while referencing the character data, searches the reservation database (S305).

More specifically, the host computer 40 reads out records concerning the ticket corresponding to the ticket number, and reads out the remaining number of tickets (i.e. available seats) for the designated seat classification at the designated performance date and time. As a result of the data search, if the number of remaining tickets is equal to or greater than the number of seats to be reserved (Yes in S306), data indicating that the tickets can be sold are sent via the communications line 32 to the reading apparatus 10B being operated by the store clerk (S308). Based on these data, characters are displayed on the LCD 10g of the reading apparatus 10B informing that the tickets can be sold. This character display includes the seat numbers that can still be reserved. If the seats indicated on the LCD 10g are not to the purchaser's liking, a mark is made in a column for entering reservation confirmation or non-confirmation, indicating that the reservation is being cancelled (No in S309). There will probably be many cases where it will be requested to cancel the reservation, such, for example, as where the purchaser wishes to purchase multiple tickets but the available seats are separated from one another.

When the purchaser views the character display and wishes to make the purchase, the store clerk makes a mark in the reservation confirmation column indicating that the reservation is confirmed (Yes in S309). When the reservation has been confirmed, the reading apparatuses 10B subjects the mark to character recognition, and transmits character data indicating reservation confirmation to the host computer 40. The host computer 40 receives these data, records data to the reservation database, indicating that the seats selected have been reserved, decreases the number of remaining tickets by the number of seats reserved, and updates the database data. The host computer 40 also transmits ticket issuing information to the ticket issuing apparatus 200 instructing it to issue the ticket in the designated number (S310). The ticket issuing apparatus 200 receives the ticket issuing information, and, based on that information, prints out the ticket title, date and time, seat classification, and total amount as character strings on the printer 207, and issues the tickets.

The host computer also transmits, to the cash register 210, ticket price information containing registration permission information and cash information. The cash register 210 receives this ticket price information and displays the sale price on the LCD 216 based on the cash information. Based on the registration permission information, the register drive mechanism 217 is activated, and the cash drawer lock is opened.

On the other hand, when, as a result of the data search performed by the host computer 40, it is found that the designated number of tickets cannot be reserved (No in S306), character data indicating that ticket sales are disallowed are sent via the communications line 32 to the reading apparatus 10B operated by the store clerk (S313).

When this processing has been done, one ticket purchase operation will have been completed. If the purchaser desires to reserve other tickets (Yes in S312), the store clerk resets the reading apparatus 10B, again sets the application form in the reading apparatus 10B, and repeats the procedures described above (S301 to S313). If the purchaser does not wish to purchase other tickets (No in S312), processing is terminated.

Based on this eighth embodiment, as described in the foregoing, in addition to realizing the same benefits as with the first embodiment, a configuration is provided wherewith ticket sales can be conducted in the convenience stores which exist in virtually every town, wherefore persons wishing to purchase tickets can do so without traveling to a reservation center.

Based on this embodiment, moreover, the results of the database search are immediately displayed on the reading apparatus, so that the purchaser can know right away whether the desired reservations can be made. Thus the purchaser, when the desired reservations cannot be made, has the options of changing to other tickets or moving to another date and time, etc.

(Ninth Embodiment)

A ninth embodiment of the present invention concerns an application of the present invention to a transaction management system beginning with the objects of the embodiment.

A first object of this embodiment is to provide transaction management wherewith keyboard entry operations are unnecessary. A second object of this embodiment is to provide transaction management wherewith unwanted changes in characters can be prevented. A third object of this embodiment is to provide transaction management wherewith highly reliable certification can be effected.

The configuration is now described.

Figure 35:
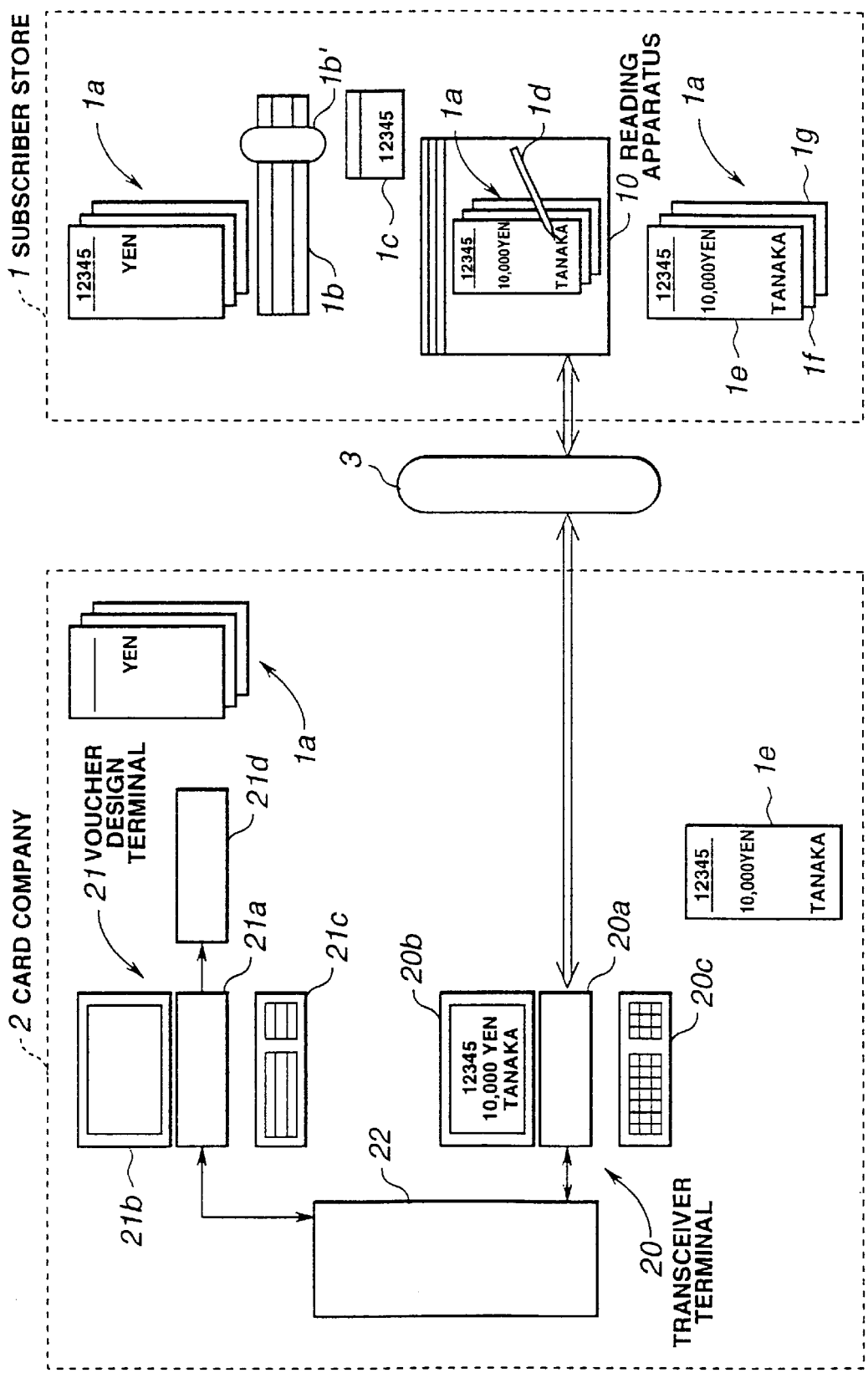
FIG. 35 is a block diagram of a transaction management system in a ninth embodiment of the present invention.

FIG. 35 is a simplified diagram of a transaction processing system in the ninth embodiment of the present invention. This transaction processing system makes it possible for shopping and other commercial transactions to be conducted without cash. A card voucher 1a, imprinter 1b, reading apparatus 10, and pen 1d are provided at each subscriber store 1. The card voucher 1a is a three-part form permitting carbon copies to be made. Accordingly, by writing characters on the uppermost form, the same characters are recorded on the other two forms. The credit card 1c is configured conventionally, with the member number, etc., embossed on the surface thereof, and a magnetic stripe in which are recorded the member number and confirmation code, etc., provided on the back thereof.

The imprinter 1b is no different than those conventionally used in subscriber stores, and is used as follows. That is, the credit card 1c and card voucher 1a are stacked together and placed in the imprinter 1b, then a handle 1b' is moved so that it slides and the embossed information on the credit card 1c is thereby transferred to the card voucher 1a. Thus the characters indicating the member number and expiration date, etc., are printed on the card voucher 1a.

The reading apparatus 10 comprises a digitizer, card reader, and display, etc. The card voucher 1a is placed on the reading apparatus 10 and characters are written directly to the card voucher 1a using the pen 1d, whereby handwriting data are detected. This reading apparatus 10 is provided with a modem or other communications facility, so that it can transmit the detected handwriting data via the communications line to the card company 2. The card voucher on which characters have been written on the reading apparatus 10 is separated into its several pages. One page 1e is for retention by the subscriber store, another 1f is for retention by the card company, and the third 1g is for retention by the user.

The card company 2, meanwhile, is equipped with a voucher design terminal 21 for creating block copy for the card vouchers 1a, and printing them, a character recognition apparatus 20 that transmits and receives data to and from the reading apparatuses 10, and a host computer 22 that is a business processing apparatus and that controls the character recognition apparatus 20 and the voucher design terminal 21. The voucher design terminal 21 comprises a main unit 21a, display 21b, keyboard 21, and printer 21d, etc. The operator is able therewith to design card vouchers in an interactive format while viewing menu screens and vouchers, etc., displayed on the display 21b. From the printer 21d is printed block copy for the card vouchers. The block copy is used to print the card vouchers in volume.

The character recognition apparatus 20 is configured as in the first embodiment, so no further description is given here.

The host computer 22 is for storing the member numbers and transaction history of all credit card user members.

Figure 36:
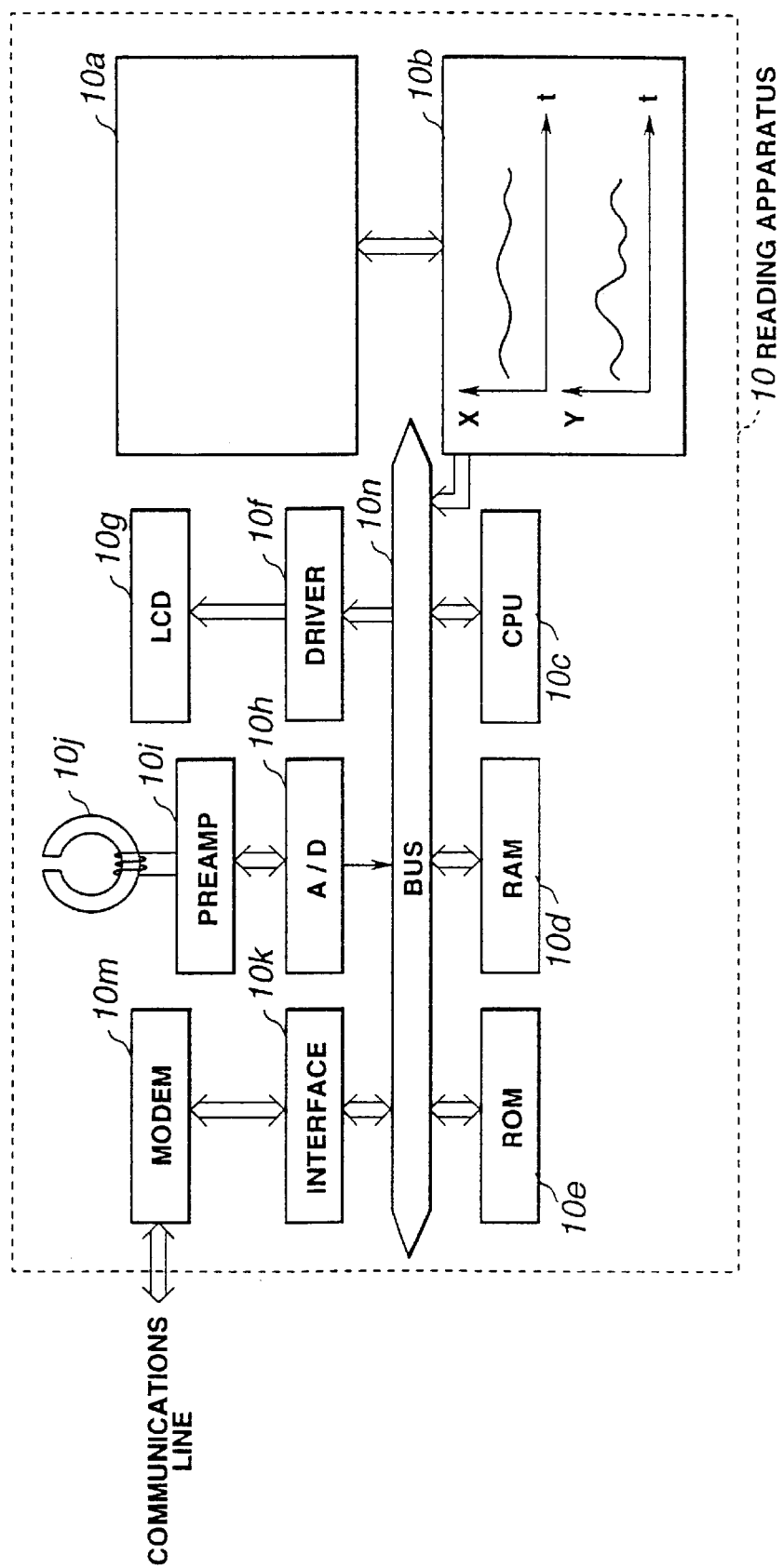
FIG. 36 is a block diagram of a reading apparatus in the ninth embodiment.

FIG. 36 is a block diagram of the reading apparatus 10. This reading apparatus 10, as configured here, comprises a digitizer 10, handwriting data memory 10b, CPU 10c, RAM 10d, ROM 10e, driver 10f, LCD 10g, A/D converter 10h, pre-amplifier 10i, magnetic head 10j, interface 10k, modem 10m, and bus 10n, etc. Except for the magnetic head 10j, pre-amplifier 10i, and A/D converter 10h, the configuration is the same as in the first embodiment, so the description here is abridged accordingly.

The magnetic head 10j is for reading magnetic changes recorded on the magnetic stripe on the back of the credit card and outputting corresponding electrical signals. The weak electric signals output from the magnetic head 10j are amplified by the pre-amplifier 10i, then converted to digital signals by the A/D (A/D converter circuit) 10h. These digital signals are input via the bus 10n to the CPU 10c. The communications infrastructure 3 is configured as described in conjunction with the first embodiment.

The reading apparatus 10 may also comprise the character recognition functions of the character recognition apparatus 20, as was noted for the first embodiment. In that case, character recognition processing can be removed from the computer 20.

Figure 37:
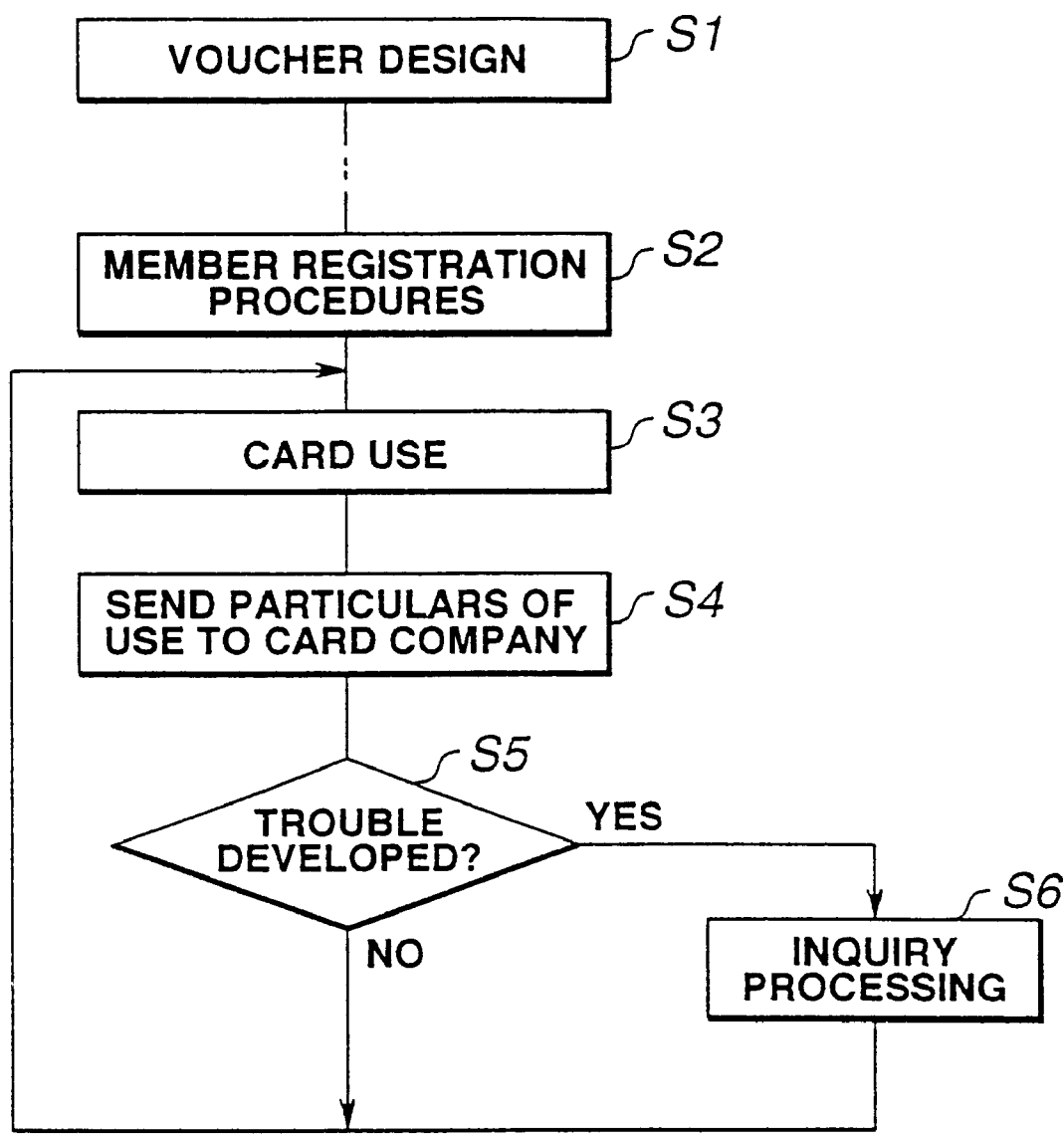
FIG. 37 is a flowchart for describing voucher design processing in th ninth embodiment.
Figure 38:
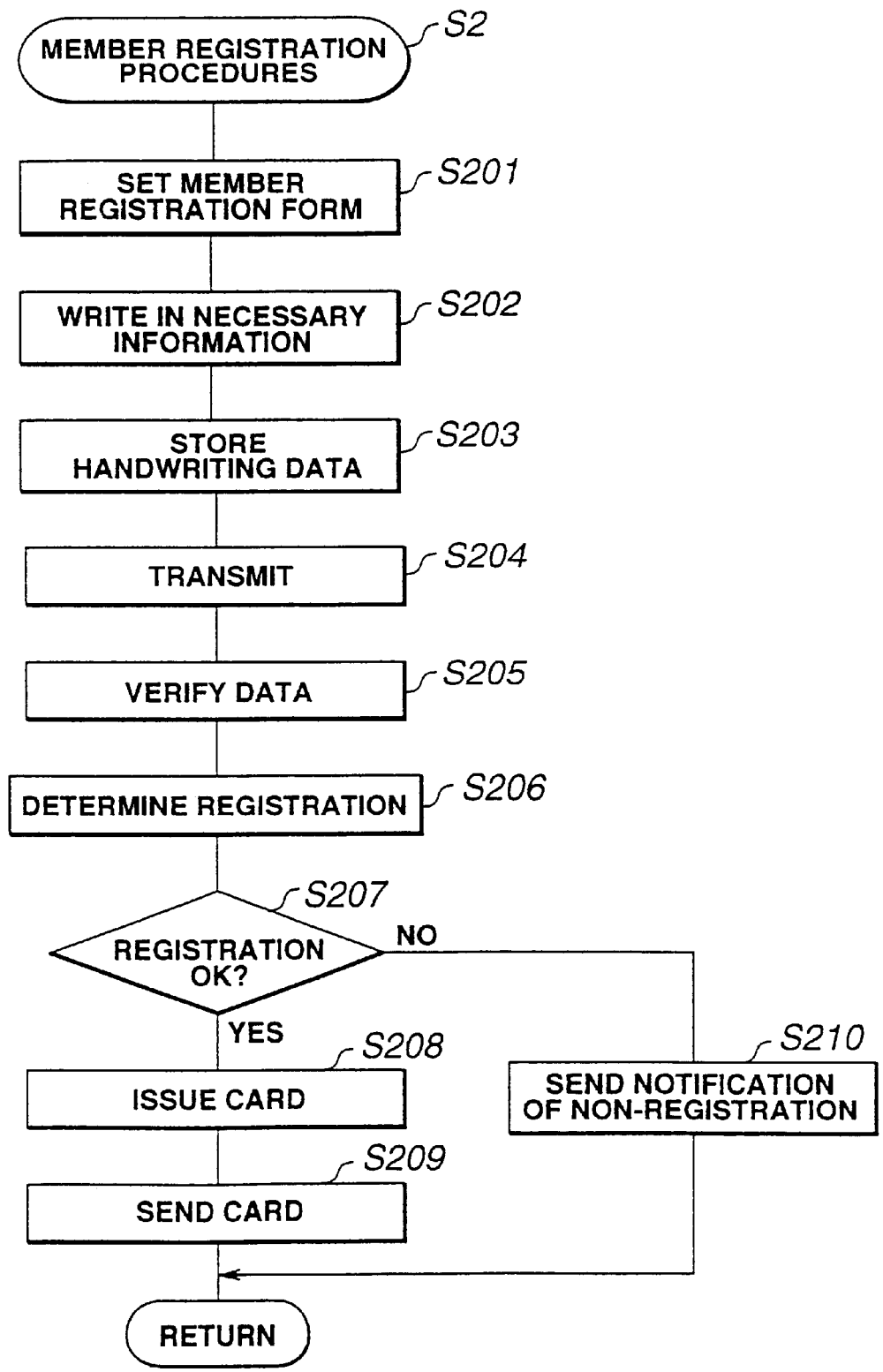
FIG. 38 is a flowchart for describing member registration procedures in the ninth embodiment.

The overall operation of the transaction processing system in this embodiment is described next. FIG. 37 is a flowchart summarizing the processes of the transaction processing system in this embodiment. At the card company 2, an operator designs and produces a card voucher using the voucher design terminal 21 (S1). The block copy output from the printer 21d is sent to a printing company where the three-part card voucher is printed in volume. The details of voucher design are as set forth for the first embodiment.

Meanwhile, a user wishing to use the credit card carries out member registration procedures (S2). These member registration procedures can be carried out using a reading apparatus 10. More specifically, at a subscriber store 1, the user enters the required items on a member registration form placed on the reading apparatus 10, whereupon the entered information is immediately transmitted to the card company 2 via the communications infrastructure 3. The card company decides whether or not to approve the member registration of that user, based on data relating to the entered information received, and sends a notice of that decision back to the user.

A credit card is sent to users whose member registration has been approved, whereupon those users can make shopping purchases, etc., using their credit cards (S3). The processes of reading the credit card, making entries on a card voucher, and giving a copy of the voucher to the user are performed at the subscriber store 1. The card company copy that is sent to the card company 2 is retained by the card company 2 (S4).

In the event that, on a subsequent day, trouble develops with a credit card transaction (Yes in S5), inquiry processing (S6) is initiated. In the case where a user who forgot that he or she made a purchase with his or her credit card queries the card company 2 about a transaction, the card company 2 searches the database in the host computer 22 for the card transaction at issue, and informs the user, etc., of information pertaining to his or her query, such as the amount used and the subscriber store where the transaction was made, etc. If, on the other hand, no trouble develops (No in S5), normal purchase transactions using that credit card may continue to be conducted (S3 to S6).

When a user wishes to request a credit card, he or she goes to any subscriber store 1 and informs a store clerk of that wish. The store clerk places a member registration form on the reading apparatus 10 (S201), and positions the reading apparatus 10 so that the user can use it. The user, using the pen 1d, enters his or her name and other necessary information on the member registration form (S202). The digitizer in the reading apparatus 10 samples the coordinates of the pen 1d every 10 milliseconds, for example, and stores these handwriting data as handwriting data coordinates X(t) and Y(t) in the memory 10b (S203).

The CPU 10c extracts the handwriting X(t) and Y(t) data for each information item (field) on the member registration form and adds required header data for each field. To the handwriting X(t) and Y(t) data for the name field, for example, a header indicating "name" is added. These data are transmitted via the communications infrastructure 3 to the character recognition apparatus 20 at the card company 2 (S204). By adding header data to the handwriting X(t) and Y(t) data for each field and transmitting the data in this fashion, the content of the handwriting X(t) and Y(t) data can be identified in the card company 2 irrespective of the order of transmission. At the card company 2, the character recognition apparatus 20 receives the handwriting X(t) and Y(t) data via the communications infrastructure 3 and stores these in the handwriting memory 20i. The CPU 20n generates image data based on the handwriting X(t) and Y(t) data, and writes the image data to the image memory 20h. The CPU 20n also performs character recognition based on the handwriting X(t) and Y(t) image data (S205).

The procedures involved in the character recognition are the same as in the first embodiment, so no further description thereof is given here.

Next, the CPU 20n decides whether or not to approve the credit card member registration based on the recognized characters (S206). When it decides that member registration is possible (Yes in S207), a credit card is issued (S208) and sent to the user (S209). When a credit card is issued, handwriting X(t) and Y(t) data for the signature of the user are registered with the card company. The signatures so registered are used for certification purposes. When, on the other hand, it is decided that member registration is not possible (No in S207), a notice to that effect is sent to the user (S210).

Thus, based on this embodiment, the information written on the member registration form using the reading apparatus 10 is sent directly to the card company 2, wherefore the time required for member registration processing can be shortened as compared to when the member registration form is sent by mail.

Figure 39:
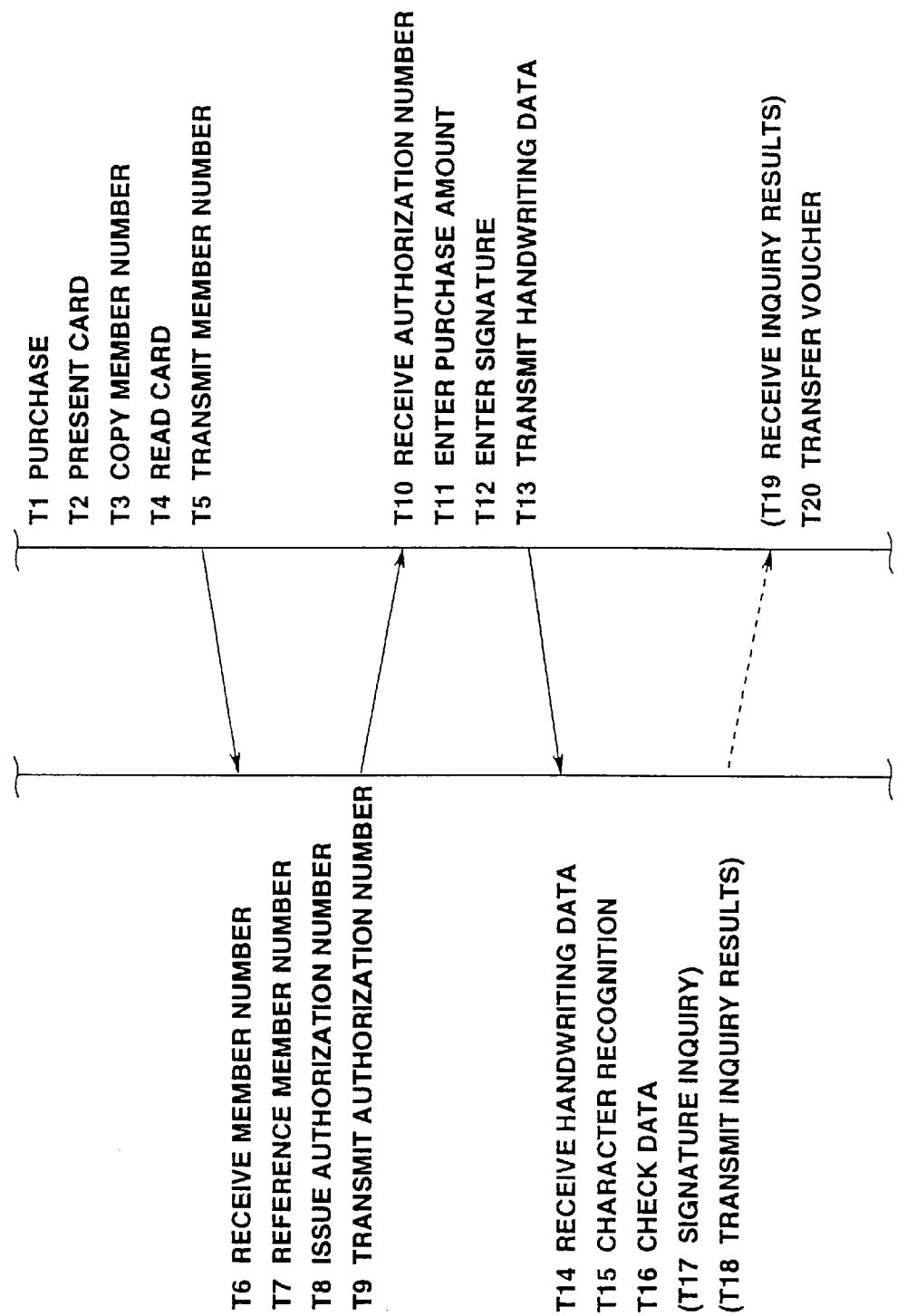
FIG. 39 is a chart for describing card use processing in the ninth embodiment.

Card use processing is described next, making reference to the sequence chart in FIG. 39 (S3 in FIG. 37) which represents the details thereof. After a user makes a purchase in a subscriber store (Ti), when he or she presents his or her credit card to a store clerk (T2), the store clerk uses the imprinter 1b to transfer the member number, etc., on the credit card to the card voucher 1a (T3). Next, the store clerk reads the magnetic stripe on the back of the credit card using the card reader of the reading apparatus 10 (T4). The reading apparatus 10 transmits the member number, etc., so read to the card company 2 via the communication infrastructure 3 (T5). The character recognition apparatus 20 at the card company 2 receives the member number (T6), and verifies whether that member number is valid (T7). Upon verifying that the member number is valid, the character recognition apparatus 20 issues an authorization number (T8), which it transmits back to the reading apparatus 10 via the communications infrastructure 3 (T9). The reading apparatus 10 receives the authorization number (T10) and displays it on the LCD 10g. Seeing this, the store clerk recognizes that the credit card has been approved for use, and, using the pen 1d, enters the purchase amount on a card voucher 1a that is placed on the reading apparatus 10 (T11). The digitizer 10a detects the coordinates of the pen 1d, and outputs the changes over time in those coordinates as handwriting X(t) and Y(t) data. The output handwriting X(t) and Y(t) data are stored in the handwriting data memory 10b.

Inclination correction and position correction are effected in the same way as in the first embodiment.

Next, the store clerk has the user write his or her signature on the card voucher 1a placed on the reading apparatus 10. The user writes his or her signature on the card voucher 1a using the pen 1d (T12). This signature also is stored in the handwriting data memory 10b as handwriting X(t) and Y(t) data. These handwriting X(t) and Y(t) data for the purchase amount and signature are transmitted to the character recognition apparatus 20 via the communications infrastructure 3 (T13). The character recognition apparatus 20 receives these handwriting X(t) and Y(t) data (T14), and performs character recognition based thereon (T15). The details of this character recognition processing are as noted for the first embodiment, so no further description is given here. The character recognition apparatus 20 performs data checking on the results of the character recognition (T16). If there are characters other than numerals inside the purchase amount data field, an error is indicated as the result of the data checking. An error will also be indicated as the result of data checking when the product unit prices and purchase amount total are inconsistent. By performing such data checks, erroneous character recognition can be discovered.

Furthermore, when the user's signature has been registered by the card company 2, signature comparison processing is performed (T17 to T19). More specifically, the character recognition apparatus 20 makes a comparison to determine whether the signature transmitted from the subscriber store 1 matches the pre-registered signature (T17). If the two signatures do not match, that is, when the credit card user is not a valid user, the character recognition apparatus 20 disallows the purchase to be transacted. If the two signatures do match, on the other hand, the character recognition apparatus 20 allows the purchase to be transacted. The results of this comparison are transmitted to the reading apparatus 10 (T18, T19), and displayed on the LCD log. Seeing this display, the store clerk gives the card voucher copy 1g to the card user only when a match is indicated (T20). The card company copy 1e is sent to the card company 2 at a later date.

In the processing chain described in the foregoing, should an erroneous character, etc., be written on the card voucher 1a, the same cancellation processing is performed as in the first embodiment.

Based on this embodiment, the handwriting data stored in the reading apparatus 10 may be sent in batches to the card company 2. That is, handwriting X(t) and Y(t) data for a plurality of card transactions may be stored in the reading apparatus 10, and later, after the store has closed, these stored handwriting X(t) and Y(t) data may be transferred to the card company 2 by pushing a prescribed switch button. It is also possible to display an entire day's worth of transactions, cancellations, validations (=transactions–cancellations), and transmissions on the LCD 10g.

Figure 40:
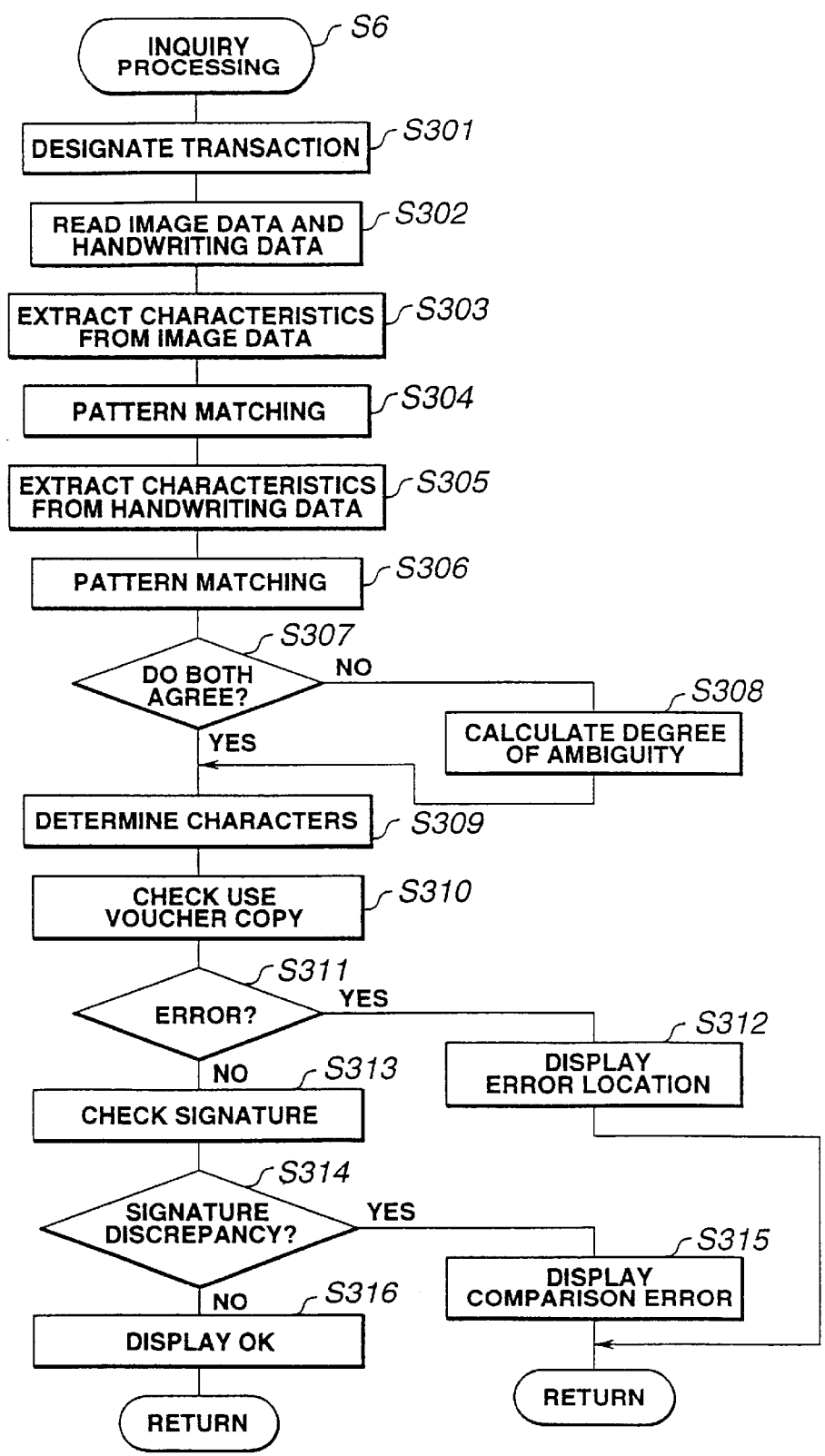
FIG. 40 is a flowchart for describing comparison processing in the ninth embodiment.

Inquiry processing will now be described, making reference to the lowchart in FIG. 40 (S6 in FIG. 37) which provides the details thereof. This processing, as noted earlier, is performed in cases where it is necessary to examine the particulars of a transaction because some trouble has arisen after the purchase was transacted.

In this flowchart, the transaction to be inquired into is first designated by its authorization number (S301). The CPU 20n in the character recognition apparatus 20 reads out image data and handwriting X(t) and Y(t) data from the image memory 20h and handwriting memory 20i, respectively (S302). The CPU 20n next extracts characteristics from the image data (S303). For example, the CPU 20n subjects the image data to fine-line processing, and extracts only the characteristic portions of characters. Pattern matching is then performed on the characteristic portions so extracted (S304).

The CPU 20n also subjects the handwriting X(t) and Y(t) data to similar characteristic extraction processing (S305). For the handwriting X(t) and Y(t) data extraction, orthogonal transformations such as Hadamard transformations and Karhunen-Loeve transformations can be used. Pattern matching is performed on the characteristic portions from the handwriting X(t) and Y(t) data (S306).

The CPU 20n compares the recognition results based on the image data and the recognition results based on the handwriting X(t) and Y(t) data. If these two sets of data do not agree (No in S307), then the degree of ambiguity is calculated (S308). More specifically, the CPU 20n calculates the degree of ambiguity by representing the degree of disparity between the two sets of recognition results as a flag or number. This degree of ambiguity is displayed on the display 20b and is also stored together with the recognized characters in the host computer. When the two sets of recognition results differ, moreover, the recognition results based on the handwriting X(t) and Y(t) data are given priority and output as the recognized characters. However, the degree of ambiguity can also be displayed together with the recognized characters, so that an operator can recognize the precision of the character recognition by looking at this display. When, on the other hand, the two sets of recognition results agree (Yes in S307), the recognition results are displayed as the recognized characters on the display 20b (S309).

Next, the operator compares these recognized characters with the card company copy 1e to determine whether there is a disparity between the two (S310). If there is such a disparity (Yes in S311), the operator inputs the location of the disparity using the keyboard 20c, etc. The designated and input disparity location is output on the display 20b, etc.

(S312). When, on the other hand, the recognized characters and the card company copy 1e agree (No in S311), the CPU 20n next performs a signature check (S313). If the recognized signature differs from the pre-registered signature (No in S314), a message to the effect that an error has occurred in the comparison results is displayed on the display 20b (S315). In that case, it can be said that there is a high probability that the transaction in question was not conducted by the authorized user of the credit card. If the two signatures match (Yes in S314), on the other hand, a message to the effect that the comparison results indicate no problem is displayed on the display 20c (S316). By registering a stroke order different from the regular stroke order, signature certification can be performed with even greater reliability. Even with the common name "Tanaka," for example, by registering an altered stroke order, wrongful use by a credit card thief, etc., can be prevented.

Based on this embodiment, as described in the foregoing, the following advantages can be realized.

Firstly, the keyboard entries associated with credit card use can be made unnecessary. With the present invention, when the purchase amount, etc., is entered on the card voucher using the pen, handwriting data are transmitted from the reading apparatus to the host computer, and the purchase amount, etc., is discerned on the basis of the handwriting data. In other words, the purchase amount, etc., is entered directly onto the card voucher, using the pen, without key entry. Accordingly, there is no need for the card company to transmit information to a subscriber store for the purpose of printing the purchase amount, etc., on the card voucher, nor do such problems as communications errors or blurring of characters printed by dot matrix impact printer occur. Accordingly, the keyboard entry of the card company copy as performed conventionally is made altogether unnecessary by the present invention. Therefore, based on the present invention, keyboard entry work can be eliminated, and thus the labor involved during credit card use greatly reduced.

Secondly, undesired character alteration can be prevented. Conventionally, as discussed earlier, low-redundancy character code is is transmitted, so data are sometimes altered while passing through a communications line. Also, since a three-part voucher must be printed on a dot matrix impact printer, characters are sometimes blurred. Based on the present invention, however, by transmitting data exhibiting comparatively high redundancy, such as handwriting data, the effects of data alteration in the communications lines can be diminished. Also, the purchase amount, etc., is written directly on the card voucher, without using a printer. Accordingly, based on the present invention, it is possible to prevent unwanted character alteration.

Thirdly, by performing signature certification based on handwriting data, highly reliable certification can be performed. More specifically, based on the present invention, character recognition is performed wherein stroke order is considered as well as the external appearance of each character, wherefore character recognition can be performed very accurately. When signatures are registered, moreover, by registering a signature with the way the characters are written deliberately altered, certification reliability can be raised even higher.

(Tenth Embodiment)

A tenth embodiment of the present invention concerns the application of the present invention to teller operations in a bank, etc., beginning with the objects thereof.

A first object of this embodiment is to provide teller processing wherewith the work of voucher data entry is lessened. A second object of this embodiment is to provide teller processing wherewith keyboard entry errors are eliminated. A third object of this embodiment is to provide teller processing wherewith customers waiting their turns can be efficiently managed.

The configuration is now described.

Figure 41:
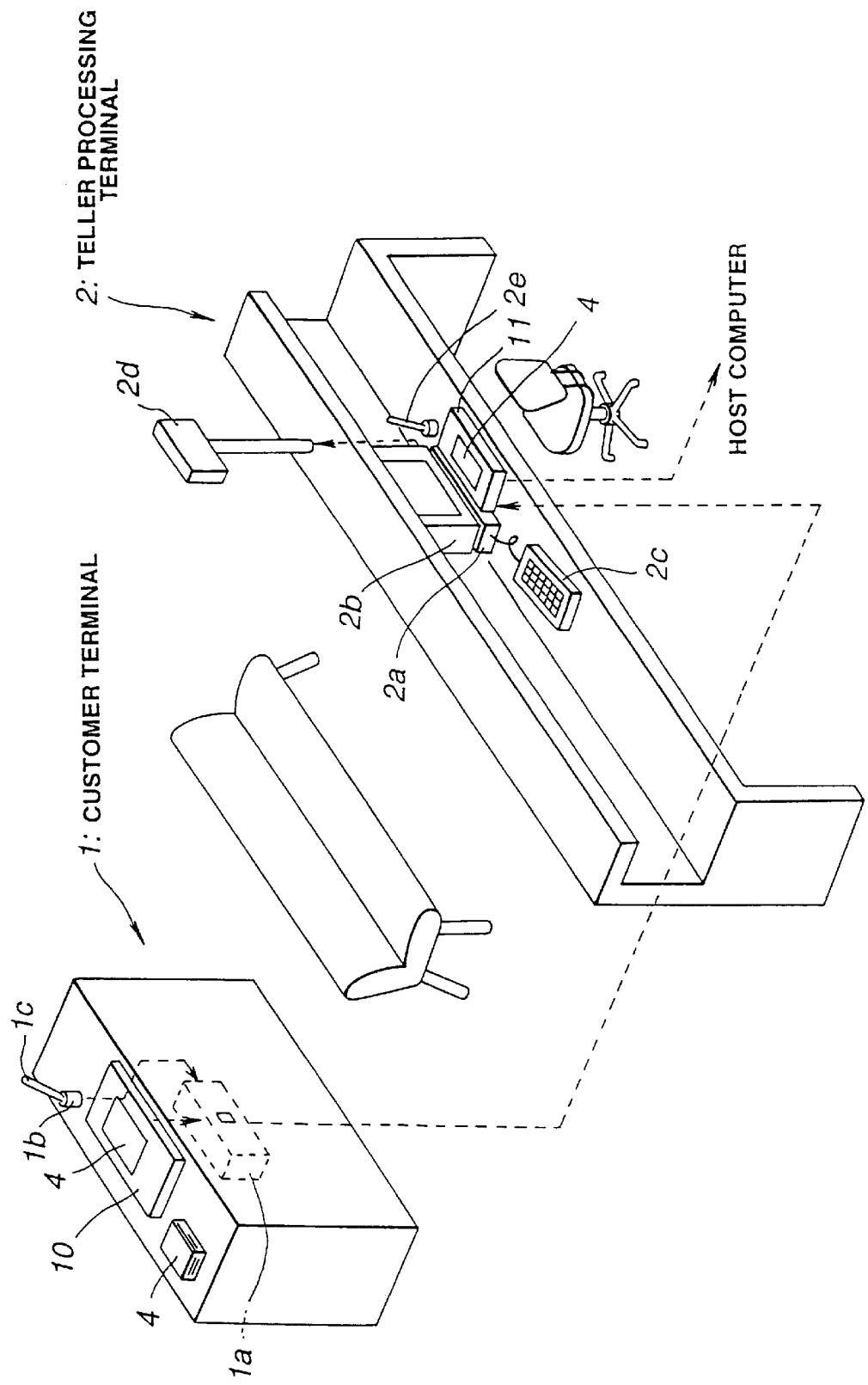
FIG. 41 is a simplified diagram of a counter management system in a tenth embodiment.
Figure 42:
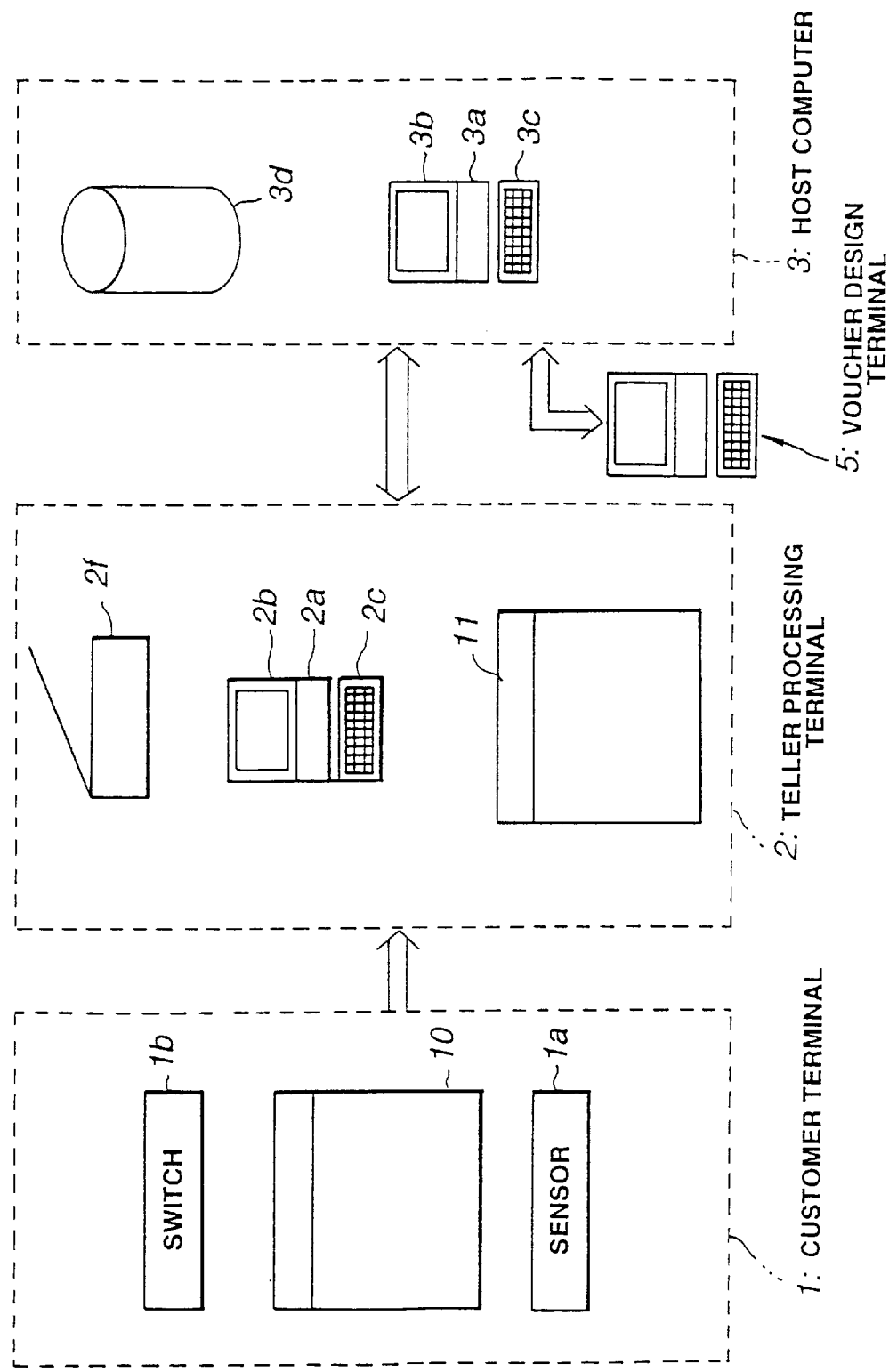
FIG. 42 is a block diagram of the counter management system in the tenth embodiment.

FIG. 41 is a conceptual drawing of a financial transaction management system in this embodiment. FIG. 42 is a block diagram of this financial transaction system. As depicted in these figures, the financial transaction management system comprises a customer terminal 1, a teller processing terminal 2, a host computer 3, and a voucher design terminal 5.

The customer terminal 1, provided for the customer to enter necessary information on withdrawal vouchers and deposit transfer vouchers, etc., comprises a reading apparatus 10, sensor 1a, switch 1b, and pen 1c, etc. The reading apparatus 10 comprises a digitizer, card reader, and display screen, etc. When a voucher 4 is placed on the character recognition 10, and characters are written directly on the voucher 4 using the pen 1c, handwriting data representing changes over time in the coordinates of the pen point are detected. The reading apparatus 10 also comprises communications functions, and can transmit the detected handwriting data to the teller processing terminal 2.

The sensor 1a comprises a light emitting element (light emitting diode or laser diode, etc.), a light detecting element (phototransistor, etc.), and a detection circuit, etc., and is capable of detecting that a customer has approached the customer terminal 1. The switch 1b, which detects whether or not a customer has lifted the pen 1c, can be a made with a mechanical switch or photosensor, etc. The reading apparatus 10, sensor 1a, and switch 1b are connected through a cable to the teller processing terminal 2, and handwriting data, etc., output from the reading apparatus 10 can be transmitted to the teller processing terminal 2. Each customer terminal is assigned a terminal number which is transmitted together with the handwriting data to the teller processing terminal.

The teller processing terminal 2 is provided for processing withdrawals and managing customers waiting their turns, based on the handwriting data, etc., transmitted from the customer terminal 1 and on vouchers, etc., received from customers. This teller processing terminal 2 comprises a reading apparatus 11, main computer unit 2a, display 2b, keyboard 2c, advisory display panel 2d, pen 2e, and scanner 2f, etc. The reading apparatus 11 is the same as the reading apparatus provided at the customer terminal 1, being provided so that characters and other handwriting data entered on the voucher 4 by bank personnel can be detected. The pen 2e is configured the same as the pen 1c provided at the customer terminal 1.

The main computer unit 2a executes processing for deposits and withdrawals, etc., and manages customers waiting their turns. The display 2b can display image data stored in the main computer unit 2a such as images of unprocessed vouchers (for customers waiting their turns), character images based on handwriting data, and character strings resulting from the recognition of handwriting data. Bank personnel, by comparing character strings entered on the actual voucher 4 against character strings resulting from character recognition and displayed on the display screen 2b, can prevent the occurrence of transaction errors resulting from erroneous recognition.

The keyboard 2c is used as input means to supplement the reading apparatus 11. More specifically, in a case where characters written by hand on the voucher 4 are not correctly recognized, the teller can enter the correct characters by the keyboard 2c.

The advisory display panel 2d is configured with a LED display or plasma display, etc., and is provided for the purpose of displaying, in order, the names of customers waiting their turns. Based on this embodiment, customer names, etc., can be automatically recognized based on the handwriting data detected by the reading apparatus 10. Hence it is possible to call customers to the teller station by displaying their names on the advisory display panel 2d. The scanner 2f functions so is as to read, as image data, seal images affixed to vouchers. A handheld scanner may also be used.

The host computer 3 is connected to the teller processing terminal 2 and comprises the main computer unit 3a, display screen 3b, keyboard 3c, and database 3d, etc. Stored in the database 3d are customer account data, handwriting data for processed vouchers, and image data representing seal images, etc.

The voucher design terminal 5 is also connected to the host computer 3. This voucher design terminal 5 is used in designing deposit and withdrawal vouchers, deposit transfer vouchers, and other vouchers. More specifically, an operator can design vouchers in an interactive format while viewing menu screens and vouchers, etc., displayed on the display monitor. Voucher block copy is printed out from a printer (not shown). Vouchers are then printed in volume from the block copy. The reading apparatuses 10 and 11 are configured the same as in the first embodiment, so no further description is given here.

Figure 43:
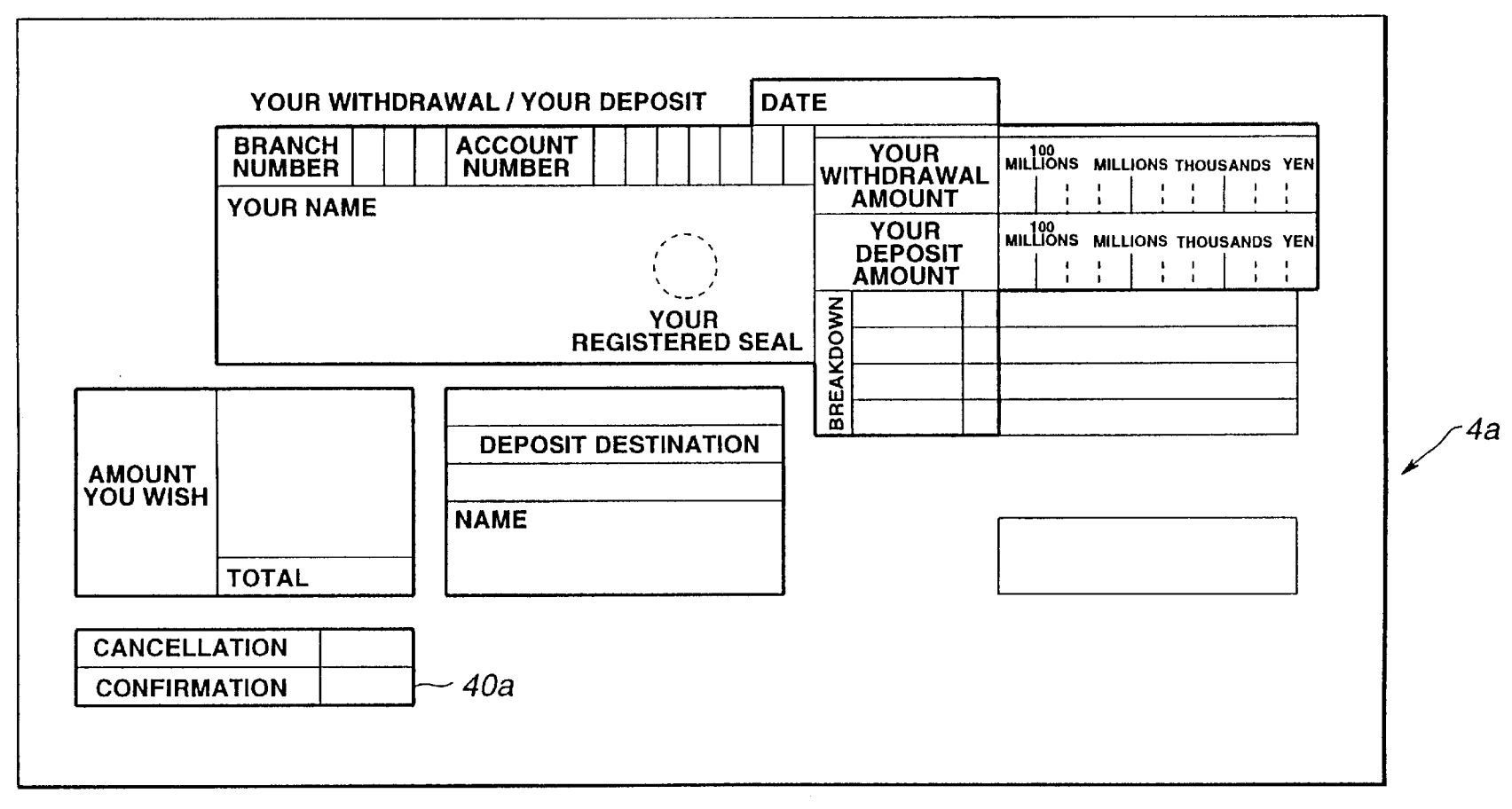
Figure 44:
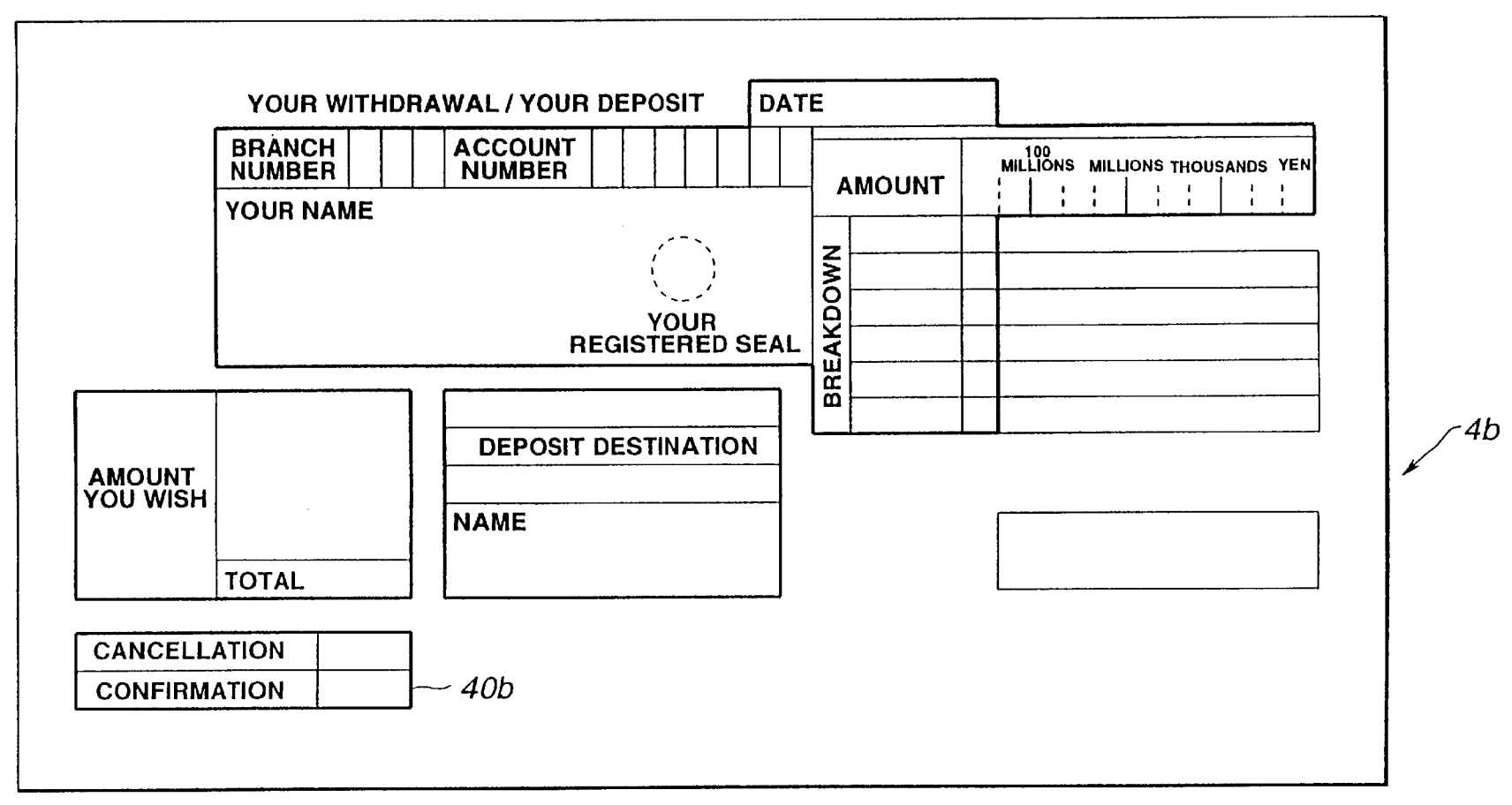

The reading apparatuses 10 and 11 may also comprise the character recognition functions of the character recognition apparatus 20, as explained in connection with the first embodiment. In that case, the character recognition processing can be removed from the computer 2a. FIGS. 43, 44, and 45 depict vouchers pertaining to this embodiment. The vouchers illustrated in FIGS. 43 and 44 are vouchers used for both deposits and withdrawals, making it possible to process deposits and withdrawals using the same voucher. The voucher illustrated in FIG. 45 is used in applying for a deposit transfer.

The voucher 4a in FIG. 43 is provided with columns for "your withdrawal amount" and for "your deposit amount." Thus the customer enters the amount in whichever of these two columns corresponds to the transaction desired. That having been done, the main computer unit 2a, upon receiving the handwriting data, can recognize whether to process a is deposit or a withdrawal. That is, when numerals are entered in the "your withdrawal column," a withdrawal is processed, and when numerals are entered in the "your deposit column," a deposit is processed. The voucher 4b illustrated in FIG. 44 is designed so that the transaction can be recognized as either a deposit or withdrawal by having the customer circle one side or the other in the "your withdrawal/your deposit" caption at the top of the form. The teller processing terminal 2 determines the position of the encircling, whether "your withdrawal" or "your deposit," whereupon either a withdrawal or a deposit can be processed. Moreover, as concerning a transfer voucher, which is not illustrated in either FIG. 43 or 44, an entry column for a transfer amount may be provided, at some position other than the positions of the amount columns in the vouchers 4a and 4b, making it thereby possible to identify whether or not it is a transfer voucher. Alternatively, a transfer voucher may be identified by determining whether or not characters, etc., have been entered in a recipient column.

A column captioned "recipient" is provided at the top of the voucher 4c illustrated in FIG. 45. Accordingly, the teller processing terminal 2 determines whether a bank name and branch name have been entered into this column, thereby identifying it as a transfer voucher.

Cancellation/confirmation columns 40a, 40b, and 40c are provided at the lower left in the vouchers 4a, 4b, and 4c, respectively, illustrated in these figures. When a customer notices that he or she has made an error while entering information in a voucher, he or she may cancel that voucher by entering an X or O symbol (or making a special mark) in the cancellation column of the cancellation/confirmation column 40a, 40b, or 40c. When the customer judges that there are no errors in the information entered on a voucher, he or she enters a symbol in the confirmation column in the cancellation/confirmation column 40a, 40b, or 40c, whereupon the information entered in the voucher is transmitted as handwriting data to the teller processing terminal 2.

The operation of the teller management system in this embodiment is described next. First, the vouchers to be used in this embodiment are set. The details of the voucher design process are the same as in the first embodiment, so no further description thereof is given here.

Figure 46:
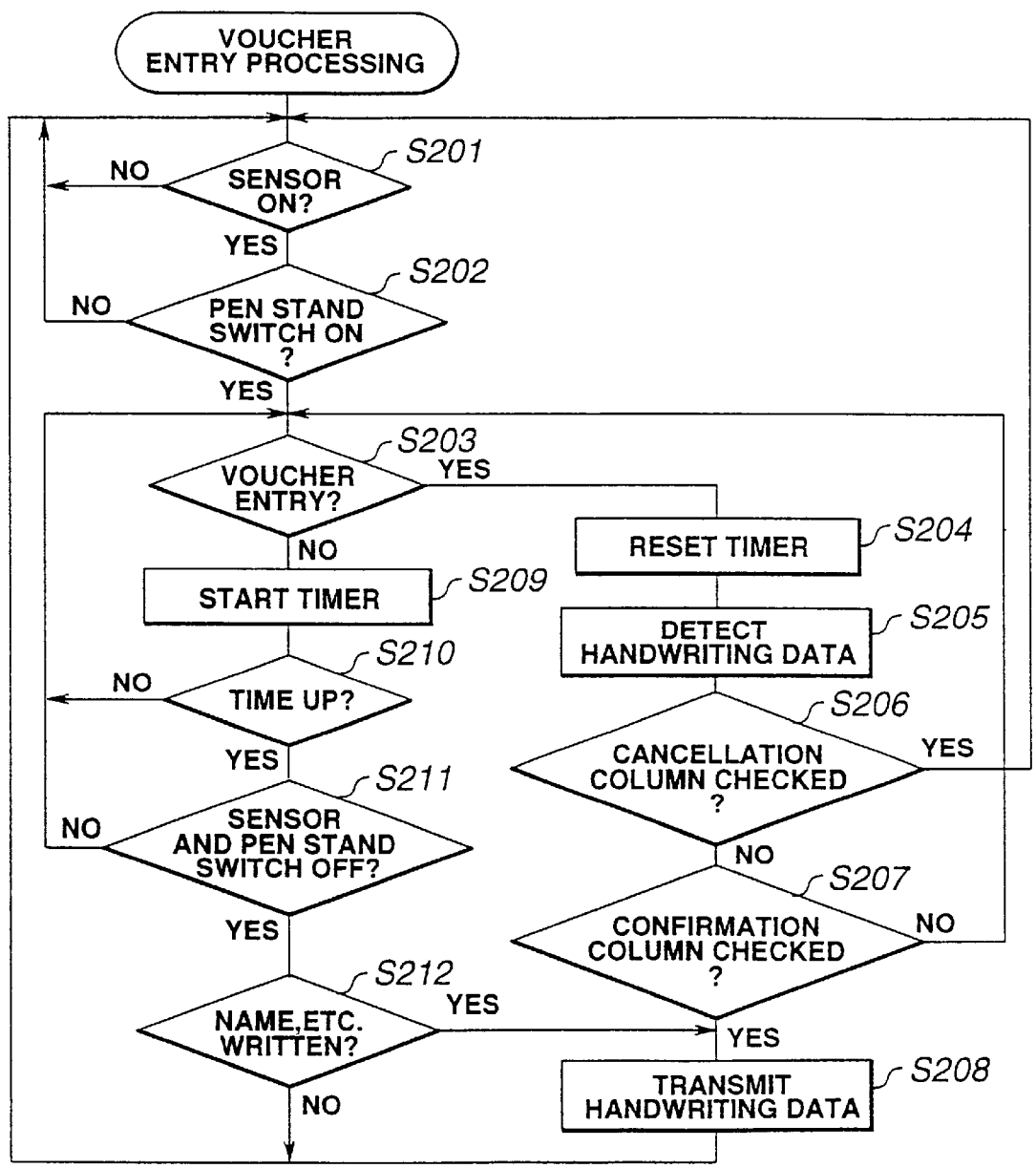
FIG. 46 is a flowchart for describing voucher entry processing in the tenth embodiment.

The voucher entry process is now described, making reference to the flowchart given in FIG. 46. First, the customer terminal 1 determines whether or not the sensor 1a is on or not, that is, whether or not a customer is positioned in front of the customer terminal 1 (S201). When the sensor 1a is off (No in S201), the customer terminal continues to execute the S201 decision routine until the sensor 1a is turned on. When a customer is positioned in front of the customer terminal 1 and the sensor 1a is on (Yes in S201), the customer terminal 1 determines whether or not the switch 1b is on (S202).

When the pen 1c has not been taken out of the pen stand by a customer and is still therefore in the pen stand, the switch 1b continues in the off state (No in S202). When this is the case, the customer terminal 1 continues to monitor the status of the sensor 1b and switch 1c (S201 and S202). However, once a customer raises the pen 1c, the switch turns on (Yes in S202), and the routine from S203 on is executed.

In S203, the customer terminal 1 determines whether or not characters have been entered in the voucher 4, that is, whether or not the point of the pen 1c has come in contact with the surface of the reading apparatus 10. At this point, the customer selects the desired voucher from among the various vouchers available at the customer terminal 1, and places this on the reading apparatus 10. Now, when the customer brings the point of the pen 1c into contact with the voucher, the reading apparatus 10 detects that characters, etc., are beginning to be written on the voucher (Yes in S203). Thereupon, the customer terminal 1 resets a timer which indicates the time during which no characters are being written (S204). This timer counts up as time elapses, indicating the time elapsed since the point of the pen 1c was removed from the surface of the voucher. In S205, the reading apparatus 10 reads the coordinates (X coordinate and Y coordinate) of the point of the pen 1c, and temporarily stores these coordinates as handwriting data in memory in the reading apparatus 10.

Next the customer terminal 1 determines whether or not a mark has been entered in the cancellation column on the voucher, and if it determines that no such mark has been entered (No in S206), it continues to execute the routine from S207 on. When a mark has been entered in the cancellation column (Yes in S206), the customer terminal 1 suspends detection of handwriting data and returns to standby status (S201). On the other hand, if no mark is made in the cancellation column (No in s206), the customer terminal 1 determines whether a mark has been made in the confirmation column, that is, whether the customer has made a mark in the confirmation column after entering all necessary information (S207). When no mark has been entered in the confirmation column (Yes in S207), it is assumed that the customer will continue to make entries in the voucher, so the customer terminal 1 returns to S203 and continues to detect handwriting data. While the customer is entering characters, etc., in the voucher, the customer terminal 1 continues to execute the subroutines for timer reset (S204), handwriting data detection (S205), and cancellation/confirmation check (S206, S207).

When the customer has finished making all entries of necessary information on the voucher, in this fashion, and makes a mark in the confirmation column, the customer terminal 1 transmits the handwriting data stored in the reading apparatus 10 to the teller processing terminal 2 (S208), and returns to standby status (S201). Together with the handwriting data, data (time stamp data) indicating the time of transmission, and customer terminal number data are transmitted to the teller processing terminal 2.

When in S203 the customer terminal 1 determines that characters are not being entered on the voucher, that is, that the point of the pen 1c is not in contact with the voucher, the customer terminal 1 advances the timer noted earlier (S209). If the timer has not reached a certain value (No in S210), the customer terminal 1 again determines whether or not characters are being entered on the voucher (S203). In the case where a customer notices an error while entering characters on a voucher and allows the voucher to stay in that condition, the no-character-entry time exceeds a certain value, and the timer reaches a certain value (Yes in S210).

Thereafter, the customer terminal 1 determines whether the sensor 1a or the switch 1b has turned off (S211). More specifically, when a customer has moved away from the customer terminal 1, or has returned the pen 1c to the pen stand (Yes in S211), the customer terminal 1 determines whether or not at least a name, amount, and account have been entered (S212). When it determines that a name, amount, and account have been entered (Yes in S212), these handwriting data are transmitted to the teller processing terminal 2 (S208). In other words, even if no mark is made in either the cancellation or confirmation column, so long as a name, amount, and account have been entered, these handwriting data are treated as valid entries. Accordingly, even if a customer forgets to mark the cancellation or confirmation column, he or she can still be called to the teller counter. As will be described subsequently, however, if the customer has still not appeared at the teller counter after a certain time has elapsed since he or she was called, it is likely that the voucher has been voided, so the handwriting data pertaining to that customer are cancelled. In cases where it is determined in S212 that no name, etc., has been entered, however, the customer terminal 1 returns the processing to S201, and waits for another customer.

In a modification of the voucher entry procedures described above, the S212 subroutine may be left out. That is, when time runs out before a mark is made in either the cancellation or confirmation column, the detected handwriting data may be treated as invalid.

Furthermore, in the S206 subroutine described above, when an erroneous character, etc., has been written on the voucher 4, it is possible to cancel that voucher as in the first embodiment.

Figure 47:
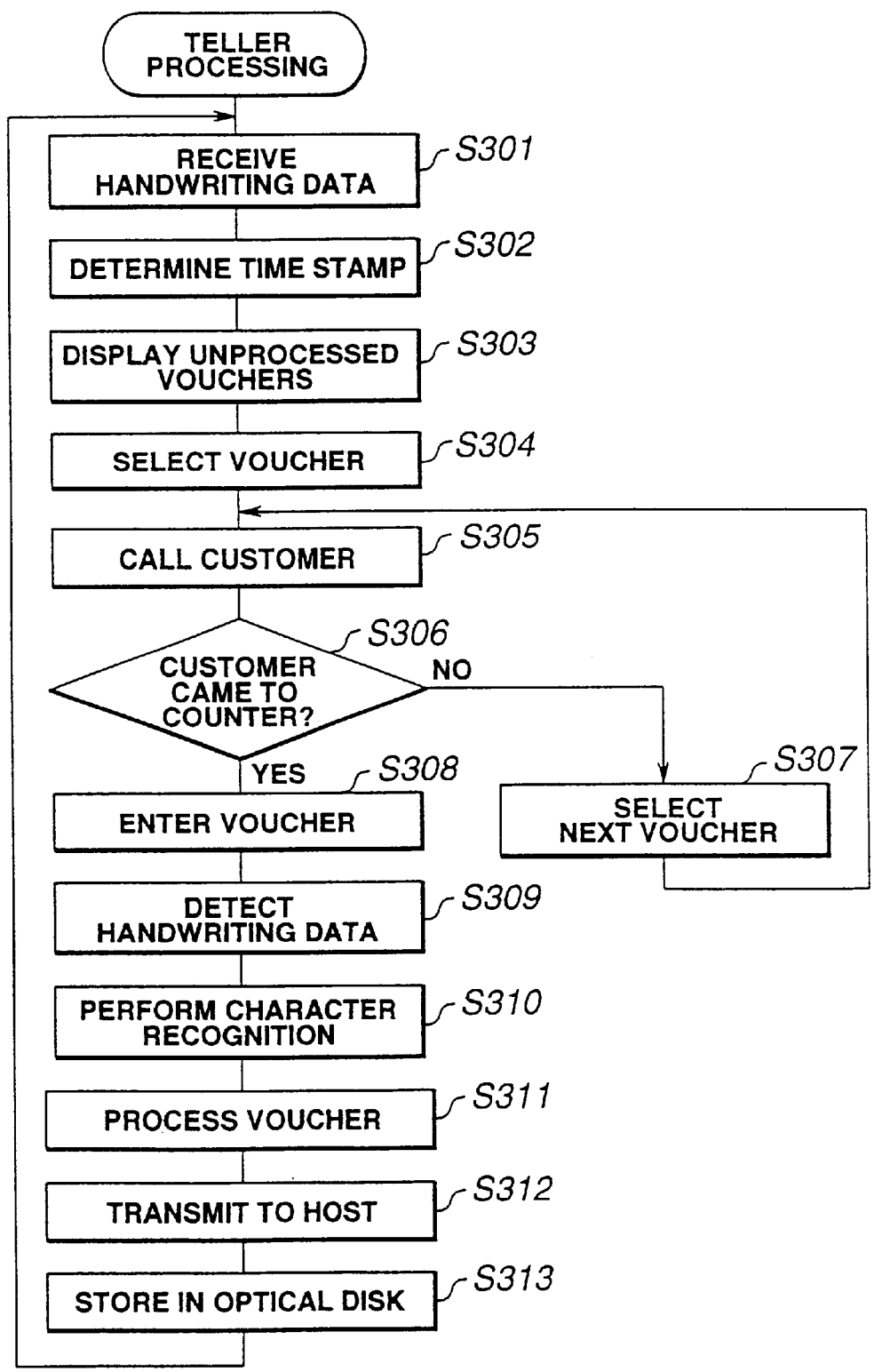
FIG. 47 is a flowchart for describing counter processing in the tenth embodiment.

Teller processing is now described, with reference to the flowchart given in FIG. 47. This processing is mainly performed by the teller processing terminal 2. First, the teller processing terminal 2, after receiving handwriting data from the customer terminal 1 (S301), examines the time stamp data appended to the handwriting data (S302). Thereupon, the teller processing terminal 2 displays unprocessed vouchers on the display 2b in the order of time stamp seniority (S303). The vouchers displayed on the display screen 2b are image data which have been reproduced from the handwriting data. Recognized character strings (text data) based on the handwriting data may be displayed also, however.

The teller processing terminal 2 automatically selects, from among the vouchers displayed on the display screen 2b, the one having the oldest time stamp (S304). Alternatively, a teller may make the voucher selection from among the vouchers displayed on the display screen 2b. The teller processing terminal 2 performs character recognition on the handwriting data for the name on the voucher, and displays the personal name or organization name that is the character string thus produced on the advisory display panel 2d, thereby calling that customer to the teller counter (S305). Alternatively, a plurality of personal or organization names may be displayed on the advisory display panel 2d, thereby enabling waiting customers to estimate how long it will be until they are called. As yet another alternative, a speech synthesizer apparatus (not shown in the drawings) may be used to announce the personal or organization names.

If the customer does not appear at the teller counter before a certain time elapses after the customer is called (No in S306), it is possible that the customer has left the building carrying his or her voucher. In such cases, therefore, the next voucher in order is selected (S307), and the order of voucher processing for the non-appearing customer is moved back. Then, if that customer does eventually appear at the teller counter, the teller can call up the handwriting data concerning that customer from memory and process the voucher. However, the handwriting data for a customer called hours earlier (say six hours earlier, for example) will be automatically deleted from the files of the teller processing terminal 2. Thus the memory can be kept from overflowing due to too great a volume of handwriting data.

When, however, a customer does appear at the teller counter (Yes in S306), the teller receives the voucher from the customer, and places it on the reading apparatus 11. In this case, it is preferable that the voucher be placed in a predetermined position on the reading apparatus 11. When that is done, the teller processing terminal 2 can accurately determine the columns in which any additional information is entered on the voucher by a teller.

The teller, in addition to entering necessary information (such as cash denominations, etc.) outside the heavy black lines on the voucher on the reading apparatus 11, also enters any necessary information within the heavy black lines that has been omitted (S308). The reading apparatus 11 detects the changes in the coordinates of the point of the pen 2e as handwriting data (S309), and stores these in memory. The teller processing terminal 2 corrects the coordinate values in the handwriting data entered by the teller, and generates handwriting data from relative coordinates which are relative to standard coordinates on the voucher (such as, for example, the coordinates of the lower left corner of the voucher). Also, since the voucher is placed in a predetermined position on the reading apparatus 11 by the teller, the relative coordinates can be easily calculated.

The teller processing terminal 2, furthermore, as in the first embodiment, makes corrections to the coordinate values in the handwriting data input by customers, by the following procedures. Two types of corrected handwriting data (customer handwriting data and teller handwriting data) are mutually associated and one set of handwriting data is generated corresponding to one voucher. The teller processing terminal 2 then performs character recognition on this set of handwriting data (S310). The character recognition procedures will be described in detail subsequently, but are described generally here. First, in performing character recognition, the allowable characters are determined beforehand, and these characters are input to the reading apparatus 11. The characters written on the reading apparatus 11 are stored in the teller processing terminal 2 as basic handwriting data. The basic handwriting data most similar to the handwriting data that are to be recognized are retrieved, and the characters corresponding to these basic handwriting data are output as identification results. Alternatively, image data (data resulting from coordinate functions) based on handwriting data may be generated, and character recognition based on those image data may also be performed. By performing character recognition using both handwriting data and image data, it is possible to improve the recognition rate.

Recognized character strings are displayed on the display 2b together with images of vouchers reproduced from the handwriting data. By comparing these, the teller can discover erroneous recognition results, and thereby prevent mishaps from happening.

When character strings (name, account number, amount, etc.) based on handwriting data are recognized, the teller processing terminal 2 processes the voucher (S311). The teller processing terminal 2 first identifies the type of voucher. The type of voucher can be identified by the position of the amount entry column in the voucher 4a illustrated in FIG. 43. The type of voucher can be identified in the case of the voucher 4b illustrated in FIG. 44 by whether "your withdrawal" or "your deposit" is marked. And the voucher illustrated in FIG. 45 can be identified by whether or not a bank name has been entered.

Once the voucher type has been identified, the teller processing terminal 2 processes the deposit, withdrawal, or transfer, according to the voucher type (S311). In the case of a withdrawal transaction, for example, the teller processing terminal 2 subtracts the amount of the withdrawal from the account stored in memory in the database 3d in the host computer 3.

When voucher processing is concluded, the teller reads the seal image affixed to the voucher with the scanner 2f. The seal image so read is transmitted as image data to the host computer together with the voucher handwriting data and the time stamp data (S312). The host computer 3 stores these image data, handwriting data, and time stamp data in the database 3d (S312). These data are written, for example, to an optical disk (S313). Subsequently, if it becomes necessary to make an inquiry, the host computer retrieves the seal image data, and reads the corresponding handwriting data and time stamp data from the database 3d. Based on the data so read, the seal image, voucher, and time stamp are displayed on the display screen, so the teller can easily make comparisons. Based on this embodiment, furthermore, the time stamp data and terminal number are stored in the database 3d, wherefore the voucher examination operation can be performed efficiently. In a case where the voucher of a customer who used a specific customer terminal on a specific date at a specific time is to be retrieved and examined, it can be found immediately with the teller management system in this embodiment.

The character recognition processing is the same as in the first embodiment, so no further description thereof is given here.

Figure 48:
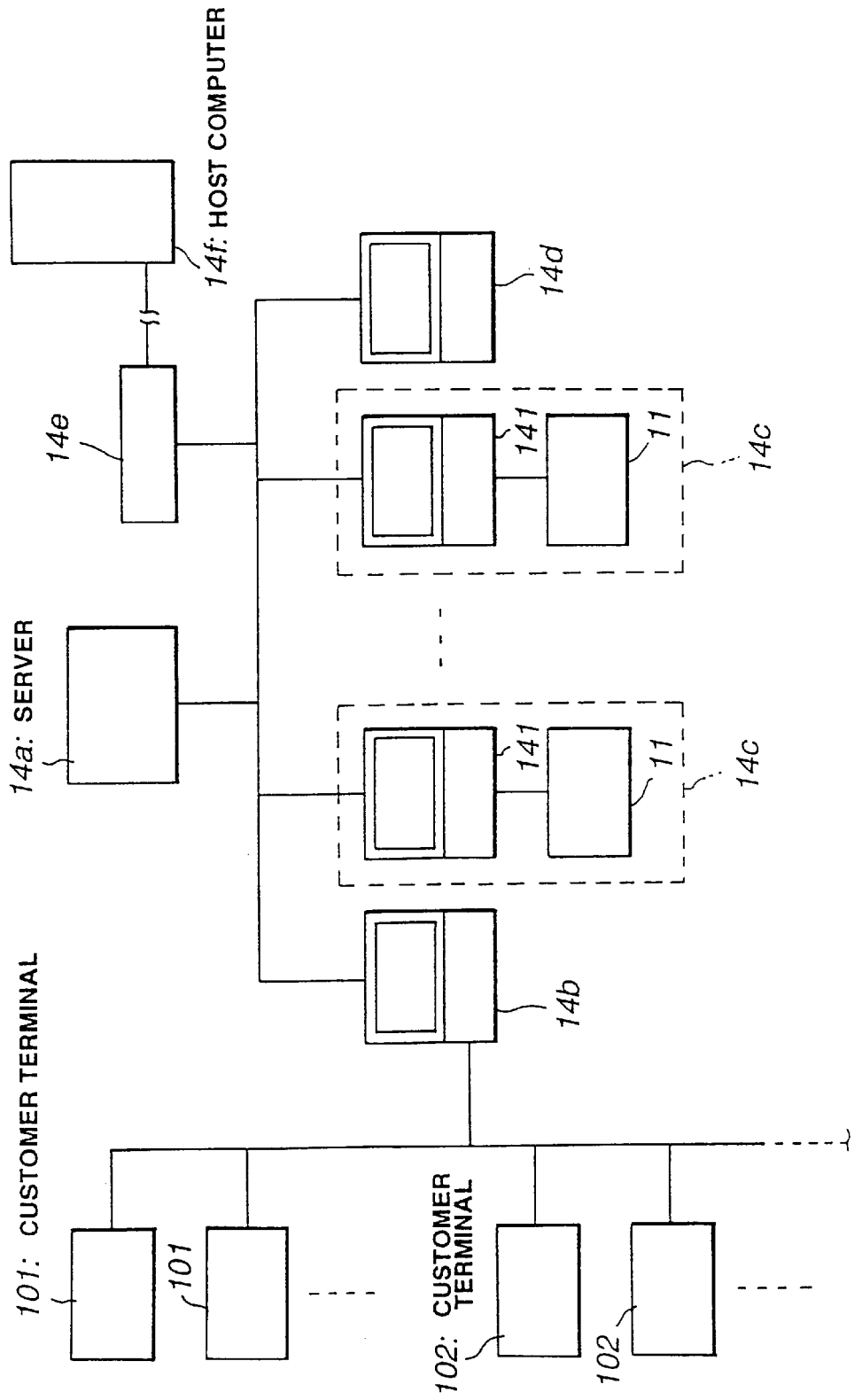
FIG. 48 is a block diagram of a variation of the tenth embodiment.

A teller management system in a variation of this tenth embodiment is now described with reference to FIG. 48.

This teller management system differs from the teller management system in the tenth embodiment described above in that a plurality of customer terminals and a plurality of teller processing terminals 14c are connected by a LAN (local area network). In FIG. 48, a server 14a is connected to a client 14b, a plurality of teller processing terminals 14c, a voucher design terminal 14d, and a gateway 14e.

The customer terminals 101 and 102 are configured the same as the customer terminal 1 in the tenth embodiment, comprising a reading apparatus for detecting handwriting data and a sensor for detecting the presence of a customer, etc. However, the customer terminal 101 is dedicated to deposit and withdrawal vouchers, while the customer terminal 102 is dedicated to deposit transfer vouchers. Accordingly, when a customer enters necessary information on a deposit or withdrawal voucher, he or she must use the customer terminal 101 dedicated to deposit and withdrawal transactions, and when a customer enters necessary information on a transfer voucher, he or she must use the customer terminal 102 dedicated to transfer transactions.

Alternatively, instead of dividing the customer terminals into two is types, a voucher type selection switch or the like may be provided on one customer terminal. In that case, it is preferable that a display be made at the customer terminal directing the customer to manipulate the switch accordingly.

The customer terminals 101 and 102 are connected to the client 14b. The client 14b determines the voucher type based on handwriting data entered from the customer terminals 101 and 102, and executes processing such as selecting the appropriate teller processing terminal 14c. The client 14b will also transmit handwriting data to the appropriate teller processing terminal 14b upon request by a teller processing terminal 14b. An advisory display panel (not shown) is connected to the client 14b. When handwriting data pertaining to a voucher that should be processed next are sent to a teller processing terminal 14c, the personal name or organization name associated with that voucher is displayed on the advisory display panel.

The teller processing terminals 14c are configured almost the same as the teller processing terminal 2 in the tenth embodiment, and comprises a client 141 and reading apparatus 11, etc. These teller processing terminals 14c perform prescribed teller processing based on handwriting data sent from the client 14b and server 14c. When a teller selects the voucher to be processed next while viewing the displays on the teller processing terminal 14c and client 141, the handwriting data pertaining to that voucher are transmitted to the teller processing terminal 14c from the client 14b. When a voucher is presented at a teller counter by a called customer, the teller places the voucher on the reading apparatus 11 and enters any necessary information. The handwriting data detected by the reading apparatus 11 are input to the client 141. The client 141 performs character recognition on those handwriting data and on handwriting data Inputted by the customer. Following the results of this character recognition, the teller processing terminal 14c accesses a database in the host computer 14f and thereby processes the deposit or withdrawal.

The plurality of teller processing terminals 14c may be divided between deposit and withdrawal transactions and transfer transactions. In that case, the client 14b must send handwriting data, etc., to a teller processing terminal corresponding to the voucher type.

The server 14a comprises functions for providing handwriting data and other types of data upon request by the client 14b, teller processing terminal 14c, voucher design terminal 14d, or gateway 14e. The voucher design terminal 14d is also configured the same as the voucher design terminal 5 in the first embodiment. The gateway 14e is for connecting the LAN in the bank, which is built around the server 14a, to the host computer 14f outside the bank. Account data and handwriting data for all customers are stored in the host computer 14f. The teller processing terminals 14c can thus process deposits, withdrawals, and transfers, etc., by accessing the host computer 14f.

Based on this embodiment, as described in the foregoing, the following advantages can be realized.

Firstly, it is possible to reduce the busy work involved in data entry. As described above, information entered on vouchers by customers is transmitted as handwriting data to a teller processing terminal. Thus there is no need for tellers to key in information entered on vouchers, wherefore the work load on the tellers can be reduced.

Secondly, the erroneous inputting of data associated with keyboard entry can be avoided. Based on this embodiment, information entered on a voucher is input as handwriting data, thus eliminating the need to key in such information. Accordingly, it is possible to avoid the input errors associated with keyboard entry.

Thirdly, it is possible to efficiently manage customers waiting their turns. Conventionally, a ticket dispensing apparatus must be used in managing customers waiting their turns, placing an enormous burden on both customers and tellers. Based on this embodiment, however, customers waiting their turns can be automatically displayed on an advisory display panel or the like, based on handwriting data entered by the. customers, wherefore the troublesome management task conventionally required is rendered unnecessary.

(11th Embodiment)

An 11th embodiment of the present invention is applied to information management in a medical facility, beginning with the objects thereof. A first object of this embodiment is to provide a medical information input system which does not require the busy work associated with keyboard entry. A second object of this embodiment is to provide a medical information input system wherewith data entry errors can be avoided. A third object of this embodiment is to provide a medical information input system wherewith treatment efficiency can be improved by providing medical services smoothly.

The configuration of this embodiment is now described.

Figure 49:
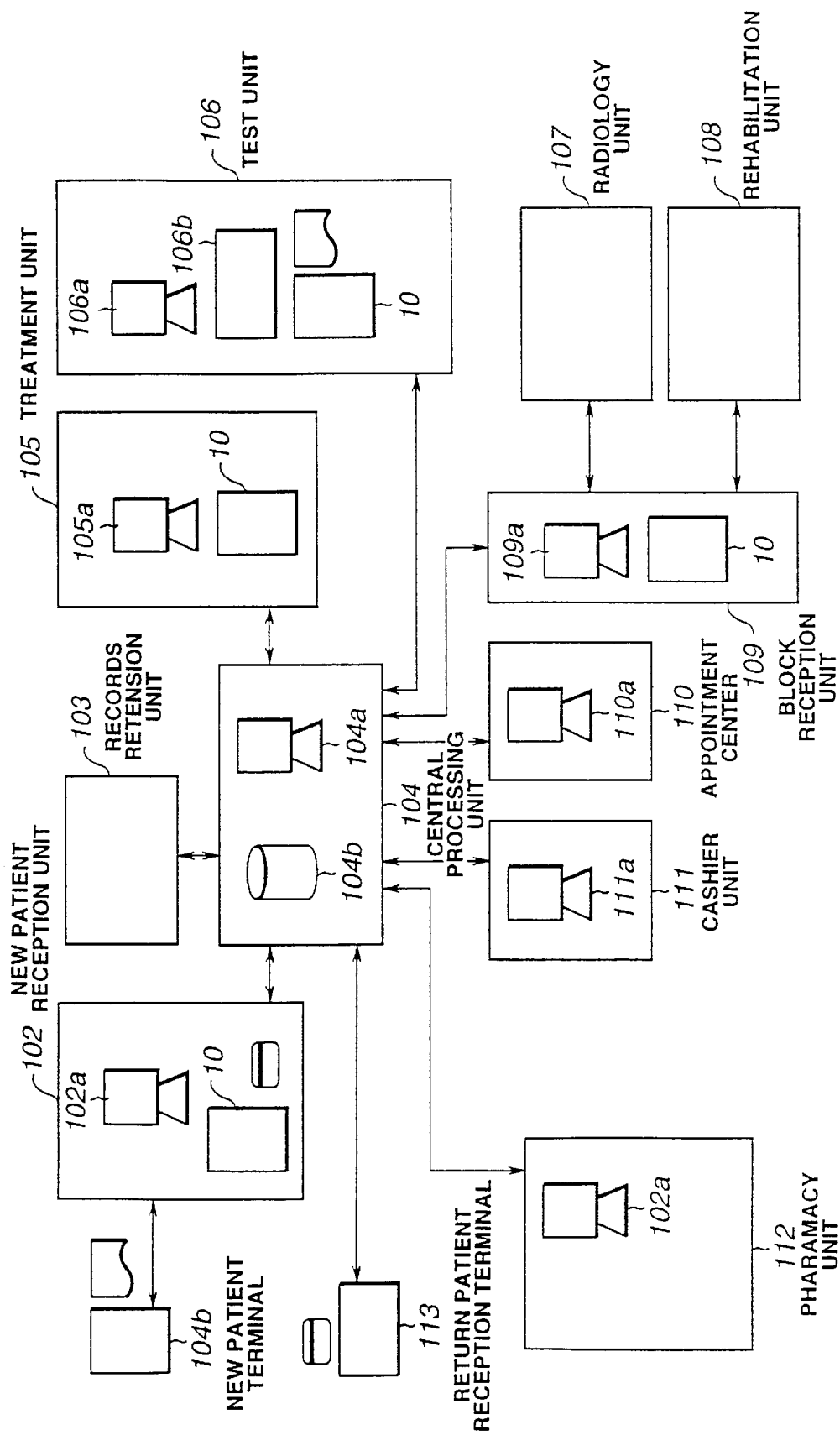
FIG. 49 is a block diagram of a medical information input system in an 11th embodiment.

In FIG. 49 is given a general diagram of the medical information input system in this embodiment. The medical information input system diagrammed in this figure is for outpatient applications and comprises a new patient terminal 101, new patient reception unit 102, records retention unit 103, central processing unit 104, examination unit 105, test unit 106, radiology unit 107, rehabilitation unit 108, block reception unit 109, appointment center 110, cashier unit 111, pharmacy unit 112, and return patient reception terminal 113, etc.

The new patient terminal 101 is used by a new patient when entering necessary information on an initial examination voucher. When a new patient writes characters on an initial examination voucher on the new patient terminal 101, the configuration is such that handwriting data are detected by the new patient terminal 101. The new patient reception unit 102 comprises a computer 102a for new patient reception processing and a reading apparatus 10 for use by office personnel. That is, the new patient reception unit 102 conducts procedures for receiving a new patient based on handwriting data detected by the new patient terminal 101.

In the records retention unit 103 are retained medical records and other original documents. The records retained in the records retention unit 103 are managed by the central processing unit 104. When the need arises to reference an original document, the necessary record is retrieved from the records retention unit 103, and the number corresponding to a bar code applied to the record is displayed on a display screen. As will be described subsequently, it is possible to retrieve needed records from the records retention unit 103 with ease based on this bar code number. When retrieving a record, a search can be made using any of various information contained in the record, such as the patient name, patient ID, physician name, medication name, date, and name of disease, etc., as a search key.

The examination unit 105 is a unit where patients are diagnosed or treated by physicians, etc. In this examination unit 105 are provided a computer 105a, for use by the physicians, and a reading apparatus 10 for reading handwriting on a record. When a physician enters the results of a diagnosis on a record, the handwriting is detected as handwriting data by the reading apparatus 10 and sent to the central processing unit 104.

The test unit 106 is a unit for performing physiological tests on patients. In the test unit 106 are installed a computer 106a, test apparatus 106b, and reading apparatus 10. The test apparatus 106b automatically performs blood tests, urinalyses, and other tests. The test results are displayed on the computer 106a and are also sent to the central processing unit. The reading apparatus 10 reads characters entered on a test voucher as handwriting data and sends the handwriting data to the central processing unit 104.

The radiology unit 107 comprises such equipment (not shown in the figure) as a radiation test apparatus, radiation treatment apparatus, computer, and reading apparatus, etc. Characters entered on a radiology voucher are detected as handwriting data by the reading apparatus and sent by the detection apparatus to the central processing unit 104. The rehabilitation unit 108 is a unit where patient rehabilitation is conducted. A reading apparatus (not shown) is also installed in this rehabilitation unit 108 for reading handwriting on rehabilitation vouchers as handwriting data.

The block reception unit 109 comprises a computer 109a and reading apparatus 10, and performs reception procedures for patients in the radiology unit 107 and rehabilitation unit 108. The appointment center 110 is provided with a computer 110a and makes examination appointments. A telephone line is connected to the computer 110a so that examination appoints can be made from a patient's home by telephone.

The cashier unit 111 is provided with a computer 111a and processes payments for medical services. The pharmacy unit 112 is a unit for filling prescriptions for drugs according to prescriptions input by physicians. This pharmacy unit 112 is provided with a computer 112a. Pharmacists can fill prescriptions according to prescription lists displayed on the computer 112a.

The return patient reception terminal 113 is an unmanned terminal for receiving return patients. It is equipped with a card reader. When a returning patient has his or her ID card read by the card reader, the return patient reception terminal 113 sends the information on the ID card so read to the central processing unit 104. The central processing unit 104, based on the ID card information, adds that patient to a list of scheduled patients for the examination unit 105.

The central processing unit 104 comprises a host computer 104a and a database 104b, and controls units 102, 103, and 105 to 113. The host computer 104a comprises functions for performing character recognition, etc., based on handwriting data sent from the reading apparatuses 10, and for sending the character strings recognized to the units 103, 103, and 105 to 113. Stored in the database 104b are all medical information data entered on the medical records, prescription forms, and accounting vouchers, etc. These medical information data configure separate medical information files compiled for each patient ID. Accordingly, by using a patient ID as a search key, it is possible to display all of the medical information data for a patient instantaneously on the computer display. In other words, the host computer 104a can provide necessary information, based on the information stored in the database 104b, to any of the units 102, 103, or 105 to 113.

The host computer 104a can also be used as a voucher design terminal by the same method as in the first embodiment. When an operator inputs a prescribed command to the host computer 104a, the host computer 104a reads a voucher design program from a hard disk and executes the program. Voucher design processing is performed in an interactive format, enabling the operator to design the desired voucher while viewing the display monitor of the host computer 104.

The various types of medical vouchers include new patient reception vouchers, medical records, treatment procedure vouchers, injection vouchers, test vouchers, prescription forms, transfusion vouchers, surgery vouchers, material transfer vouchers, records of physician's rounds, invoices for medical services, and receipts, etc. The format of each medical voucher designed is stored in the database 104b.

Figure 50:
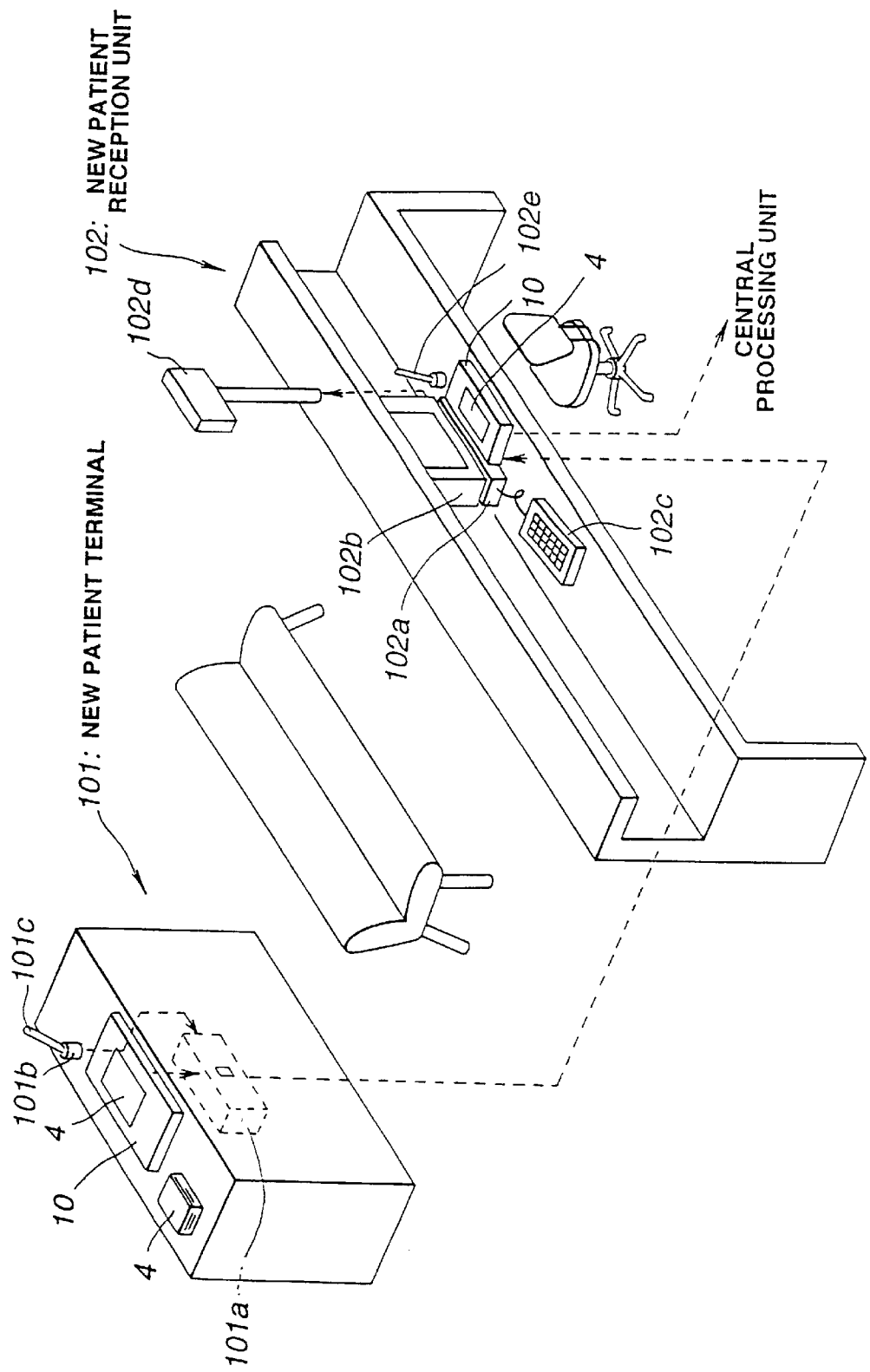
FIG. 50 is a simplified diagram of the medical information input system in the 11th embodiment.

FIG. 50 is a block diagram of the new patient terminal 101 and the new patient reception unit 102. As depicted in this figure, the new patient terminal 101 is provided for the entering of necessary information by a new patient on a treatment request form, and comprises a reading apparatus 10, sensor 101a, switch 101b, and pen 101c, etc. The reading apparatus 10 comprises a digitizer, card reader, and display, etc. When a treatment request form 4 is placed on the reading apparatus 10 and he pen 101c is used to write characters directly on the treatment request form 4, handwriting data representing changes over time in the coordinates of the pen point are detected. When a patient writes his or her name, address, sex, and date of birth on a treatment request form 4, handwriting data representing this handwriting are detected. The reading apparatus 10 also comprises communications functions and is able to transmit the detected handwriting data to the new patient reception unit 102. The sensor 101a comprises a light emitting element (such as a light emitting diode or laser diode), a photosensitive element (such as a phototransistor), and a detection circuit, etc., and is capable of detecting that a patient has approached the new patient terminal 101. The switch 101b detects whether a patient has lifted the pen 101c or not. It may be made with a mechanical switch or a photosensor, etc. These units, namely the reading apparatus 10, sensor 101a, and switch 101b, are connected via cable to the new patient reception unit 102. The handwriting data output from the reading apparatus 10 can be transmitted to 2. Each new patient terminal 101 has a terminal number assigned to it which is transmitted together with the handwriting data to the central processing unit 104.

The new patient reception unit 102 is provided for performing new patient reception processing and managing patients waiting their turns, based on character strings based on the handwriting data, and on reception vouchers received from the patients. This new patient reception unit 102 comprises a reading apparatus 10, computer 102a, display 102b, keyboard 102c, advisory display panel 102d, pen 102e, and scanner 102f, etc. The reading apparatus 10 is identical with the reading apparatus 10 provided for the new patient terminal 101, and is capable of detecting, as handwriting data, characters, etc., entered by office personnel on a treatment request form 4. The pen 102e is also configured the same as the pen 101c provided for the new patient terminal 101.

The computer 102a manages customers waiting their turns, based on handwriting data from the reading apparatus 10 and data entered from the keyboard 102c, etc. The display 102b can display images of unprocessed vouchers (for patients waiting their turn) stored in the computer 102a, character images based on handwriting data, and character strings resulting from character recognition, etc. Office personnel can prevent mishaps from being caused by recognition errors by comparing character strings resulting from character recognition and displayed on the display screen 102b with character strings entered on the actual treatment request form 4.

The keyboard 102c is used as supplemental input means for the reading apparatus 10. That is, in cases such as where handwritten characters entered on a treatment request form 4 have not been correctly recognized, an office worker can enter the correct characters from the keyboard 102c. Office personnel are also able, while looking at a medical insurance card received from a patient, to additionally write the insurance type, insurance card number, and insurance expiration date, etc., on the treatment request form 4.

The advisory display panel 102d comprises a LED display or plasma display, etc., and displays the names, etc., of patients waiting their turns. Based on this embodiment, patient names, etc., can be automatically recognized from the handwriting data detected by the reading apparatus 10. Thus patients can be called to the new patient reception counter by displaying their names on the advisory display panel 102d.

The configuration of the reading apparatus 10 is the same as in the first embodiment, so no further description thereof is given here. The computers 102a, 105a, 106a, 109a, 110a, 111a, and 112a are also configured the same as the computer 20 in the first embodiment, so no further description is given here.

The reading apparatuses 10 may also comprise the character recognition functions of the character recognition apparatus 20, as noted in conjunction with the first embodiment. In that case, character recognition processing can be eliminated from the computers 102a, 105a, 6a, and 109a.

FIG. 51 illustrates one example of a medical record. This record is called a medical insurance record, and complies with the legal form prescribed by order of the Ministry of Health and Welfare. In the field 6a on this record are entered the insurance policy number, name of examinee, insurer, office, and name of disease or injury. In the field 6b are entered the name of the disease or injury, and the period of hospitalization, etc. Fields 6a and 6c are partitioned for each entry item, and predetermined types of characters, etc., are entered therein. Field 6b is a column for entering medical history, cause, major symptoms, prescriptions, and treatments, etc. Field 6b comprises character fields 6d and image cut fields 6e. The image cut fields 6e may have graphics (such as diagnostic charts) entered therein as well as characters. Character recognition is performed on characters written in character fields. The characters and graphics in the image cut fields are detected as handwriting data, but are stored as images, without character recognition, in the database 104b.

A new record may be used for each diagnosis or treatment. When that is done, handwriting data and image data pertaining to multiple records are stored, together with a time stamp, in the database 104b, for each patient ID. Accordingly, by calling out handwriting data and image data for the same patient ID from the database 104b, medical record information can be displayed in chronological sequence on the display screen for that patient.

FIG. 52 illustrates an example of a treatment request form. This treatment request form comprises character fields 7a and 7c that are filled out by the patient, and character field 7b that is filled out by office personnel. The character fields 7a and 7c are filled out by the patient at the new patient terminal 101. Of these, the character field 7b is a column for indicating cancellation or confirmation. When a patient notices that he or she has made an error in entering information on the treatment request form, an X or O mark, or some other symbol (special mark) can be entered in the cancellation column of the cancellation/confirmation column 7c, thereby canceling the treatment request form. When a patient has determined that the entries have been made on the treatment request form without error, a symbol may be entered in the confirmation column in the cancellation/confirmation column 7c, whereupon the information entered on the treatment request form will be treated as valid handwriting data. Such a cancellation/confirmation column may also be provided on the medical record form described above.

Figure 53:
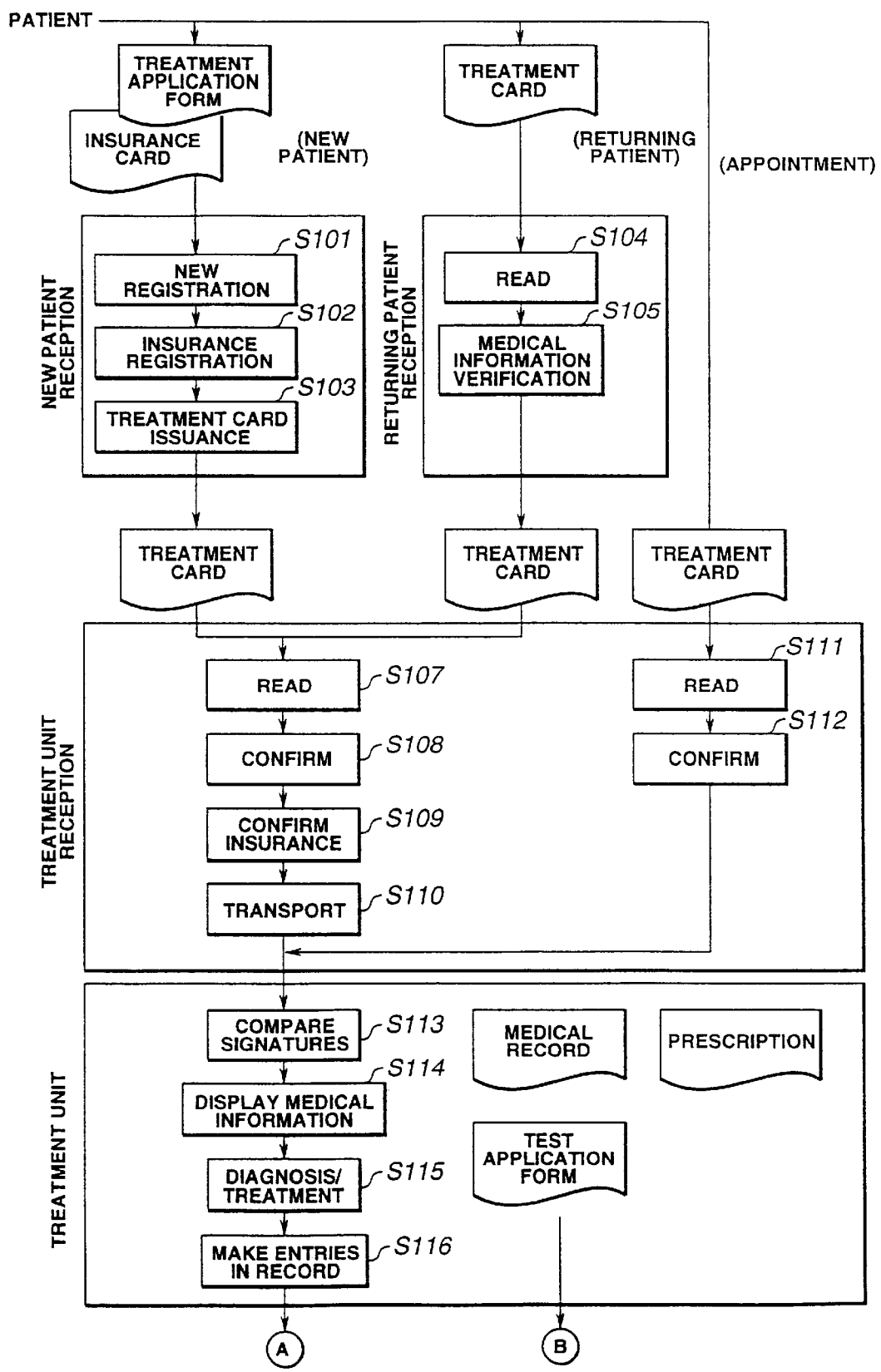
FIG. 53 is a flowchart for describing medical information entry processing in the 11th embodiment.
Figure 54:
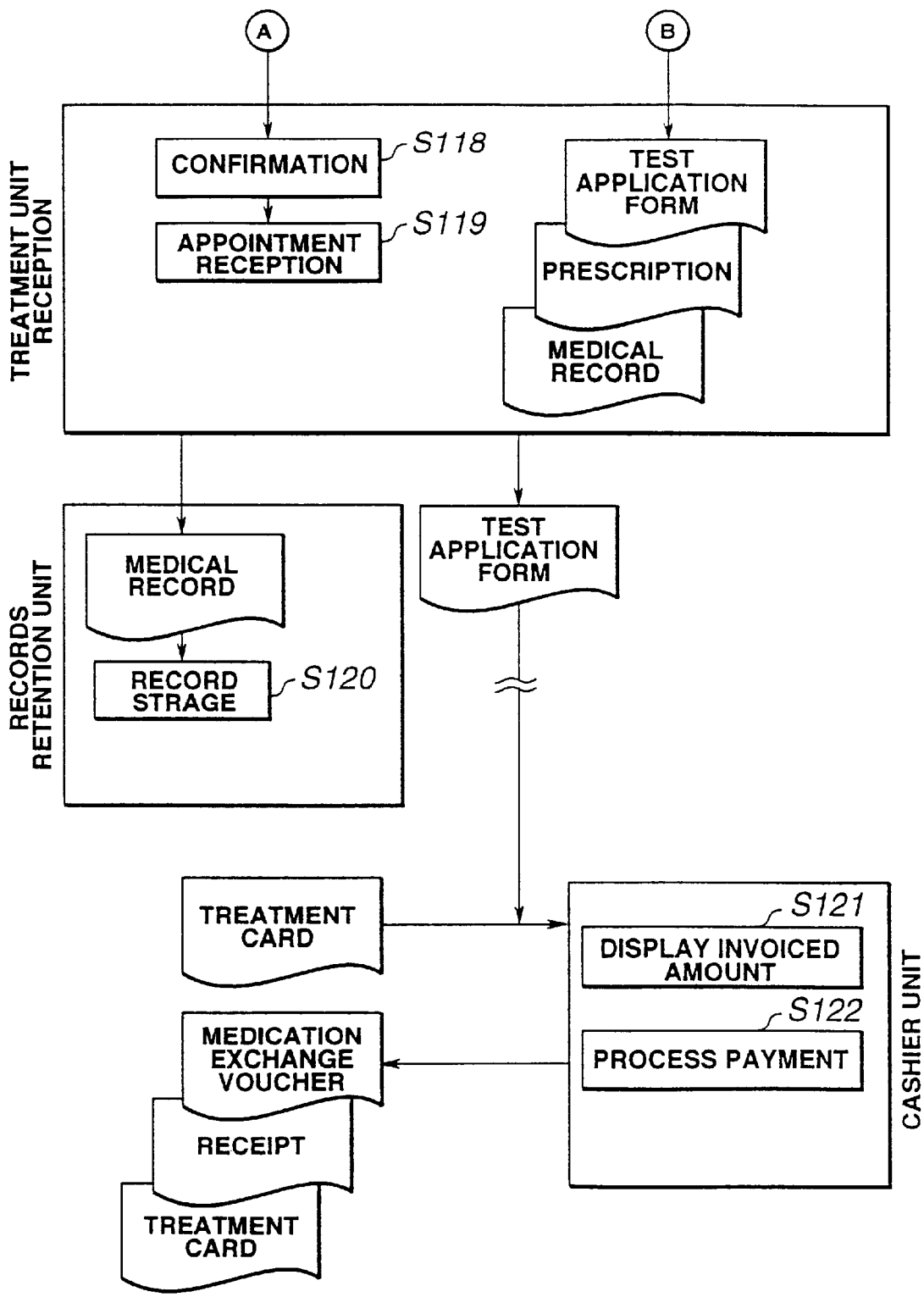
FIG. 54 is a flowchart for describing medical information entry processing in the 11th embodiment.

The entry error revision method and correction procedures are the same as in the first embodiment, and so are not further described here. The overall operation of the medical information input system in this embodiment is described next. FIGS. 53 and 54 are diagrams for describing the diagnostic or treatment flow, indicating processing routines according to the case, that is, whether new patient, return patient, or appointment. First, in cases where the patient is a new patient, the patient places a treatment request form on the new patient terminal 101 and enters the necessary information therein. The reading apparatus 10 detects handwriting data and sends them to the central processing unit 104. The patient, after finishing entering the necessary information on the treatment request form, presents the treatment request form and his or her insurance card at the new patient reception unit 102. When a new patient appointment has been made, the appointment card is also presented at the counter.

At the new patient reception unit 102, an office worker writes the insurance card number, etc., on the treatment request form received from the patient. The reading apparatus 10 detects this additional handwritten information as handwriting data and sends them to the central processing unit 104. The host computer 104a in the central processing unit 104 performs character recognition on the handwriting data so sent, and sends the resulting recognized character data to the new patient reception unit 102. The recognized characters are displayed on the computer 102a in the new patient reception unit 102. Subsequently, the office worker in the new patient reception unit 102 registers the patient by operations on the computer 102a (S101). The host computer 104 in the central processing unit 104 assigns a new ID to the patient being processed, and stores that ID in the database 104b. Then the host computer 104a stores the insurance number on the insurance card, etc., in the database 104b (S102), and sends new treatment card data to the new patient reception unit 102. The computer 102a in the new patient reception unit 102 issues a new treatment card based on the treatment card data (S103). The ID and other data are recorded on a magnetic stripe applied to the treatment card. Alternatively, a magnetic card may be used instead of an IC card as the treatment card. In that case, it is possible to record a large volume of information on the treatment card, including the treatment history.

A patient receives a treatment card from the new patient reception unit 102 and carries it to the examination unit 105. An office worker or nurse receives the treatment card from the patient and has it read by a card reader (S107). The card reader transmits the ID read from the treatment card to the host computer 104a. The host computer 104a sends various kinds of information pertaining to that ID to the examination unit 105. Office personnel in the examination unit 105 verify the information so returned to check for errors (S108), and particularly verify the information concerning medical insurance (S109). If, after verification, there are no problems, an office worker, etc., gives the treatment card, etc., to a physician in the examination unit 105 (S110). When it is his or her turn to be examined, the patient enters the examination unit 105 and sits down in front of a physician. A computer 105a and reading apparatus 10 are installed in front of the physician. The physician affixes his or her own signature to the medical record placed on the reading apparatus 10. The reading apparatus 10 detects this signature as handwriting data and sends those data to the host computer 104a. The host computer compares the handwriting data against already registered handwriting data. If it determines that the two signatures were made by the same person, the patient's medical information file is opened. The host computer extracts medical information data from the medical information file and transmits them to the computer 105a. The patient's medical information is displayed on the display monitor of the computer 105a (S114). The physician can then examine the patient while viewing the medical information on the display (S115).

The physician, while conducting the examination, enters information such as the major symptoms, treatment measures, and prescribed medication on the medical record placed on the reading apparatus (S116). The reading apparatus 10 detects the characters, graphics, and other handwriting on the medical record as handwriting data and sends them to the host computer 104a. The host computer 104a performs character recognition on the handwriting data within the character fields in the handwriting data transmitted to it. The handwriting data within the image fields are converted to image data using coordinate axis functions. These handwriting data, recognized character data, and image data are associated with the ID and stored in the database 104a.

Simultaneously, these data are transmitted to the computer 105a, and the recognized characters and images entered on the record are displayed on the display monitor. As necessary, the physician makes entries in prescription forms or test request forms. The handwriting data for the characters entered on these forms are detected in the same manner by the reading apparatus 10, and processed by the host computer 104a.

The physician verifies these displays, and, after determining that there are no errors, informs the computer 105a to that effect. It is also permissible to have an operator verify entered characters only in cases where it is impossible to effect character recognition on the entered handwriting data, or where there is a danger of erroneous character recognition. In other words, after a physician has finished entering information in a medical record, either a physician or an operator strikes an input key (enter key) on the keyboard of the computer 105a (or, instead of striking the enter key, enters a symbol in a designated column on the record). Thereupon, when the host computer 104a has detected handwriting data, in the handwriting data input, which cannot be character-recognized, or concerning which there is a danger of erroneous character recognition, that fact is brought to an operator s attention by a buzzer sounding, etc., and characters based on the handwriting data at issue are displayed as images on the display monitor. Thereupon the operator, while comparing the characters on the display against those in the record, can input the correct characters to the computer 105a.

It is also permissible to register abbreviations of disease names and drug names in the database 104b, in the form of a conversion table, and to convert abbreviations entered on the medical records to their proper names when performing character recognition, using the conversion table. By so doing, time required to make entries on records can be shortened.

When the diagnosis/treatment has been completed, an office worker in the examination unit 105 verifies the filled-out medical record, prescription forms, and test request forms (S118), and performs appointment reception for the next treatment (S119). The host computer 104a, by referencing the appointment data in the database 104b, determines whether the date and time for the treatment appointment desired by the patient is available or not.

The filled-out medical records, etc., are retained in the records retention unit 103 (S120). A bar code is applied to each record. An operator inputs the bar code and patient ID to the host computer 104a. After this input operation, records are collected together each treatment day and retained in the records retention unit 103. Should a need to make any inquiry arise on a later date, the operator inputs the patient ID into the host computer 104a, whereupon the bar code associated with that patient ID is displayed on the display monitor. The operator, after identifying the place of retention in the records retention unit 103 based on the bar code, extracts the required record from the records retention unit 103. Thus an operator can quickly access a required record in the records retention unit 103. When a patient needs to have a test done, he or she receives a treatment card and a test request form from the examination unit 105 and enters the test unit 106. Characters, etc., entered on the various vouchers (test voucher, injection voucher, surgery voucher, etc.) are written to the medical information file for that patient ID as handwriting data. When all diagnosis/treatment and testing have been completed, the patient presents the treatment card and prescription forms at the cashier unit 111. An office worker inside the cashier unit 111 reads the ID on the treatment card with a card reader, and the ID is transmitted to the host computer 104a. The host computer 104a opens the medical information file for the patient, based on that ID, and calculates an invoice amount. This invoice amount is displayed on the computer 111a the cashier unit 111 (S121). The office worker requests payment the patient of the amount displayed and, after receiving the payment from the patient, processes the payment (S122). A pharmacy exchange voucher and payment receipt are output from a printer connected to the computer 111a, and these are given to the patient together with a treatment card.

Meanwhile, the prescription information is sent from the host computer to the computer 112a in the pharmacy unit 112. A pharmacist fills the prescription while viewing the prescription information displayed on the computer 112a, and gives the prescription medications to the patient in exchange for the pharmacy exchange voucher. In this system, moreover, all medical information pertaining to one patient is retained as one medical information file. A physician, therefore, can always ascertain what medications are being dispensed in other departments. Therefore, even if medications are given by more than one department, it is possible to avoid drug combinations that might produce side effects. After receiving the medications from the pharmacy unit 112, the patient exits the hospital. Thus is concluded all processing pertaining to the outpatient treatment of that patient.

When a patient returns on a later date, the ID on the patient s treatment card is read at the return patient reception terminal 113 (S104). The host computer 104a opens the patient's medical information file, based on the ID, verifying that the patient is a returning patient (S105). When it has been verified that this is a returning patient, the return patient reception unit 113 displays a message to that effect. The patient takes back the treatment card, takes care of reception procedures at the examination unit, and enters the examination unit 105.

In providing diagnosis/treatment to the returning patient (S113 to S116), a physician calls the medical information file pertaining to the patient ID to the computer 105a from the database 104b, and displays a list of information titles on the display monitor. When the physician selects the desired information from the list so displayed, the host computer 104a sends the information from the information title selected the computer 105a. If the physician selects test results, for example, the test results are displayed on the computer 105a, and the physician can treat the patient while monitoring the display.

The results of the diagnosis or treatment conducted in this way are recorded in a new medical record that is not the same as the record used for the initial examination. At this time, handwriting data detected by the reading apparatus 10 are transmitted to the host computer 104a and there subjected to character recognition. The recognized character strings are written to the medical information file associated with the patient ID and added to the information in the records already maintained. When the medical information file is retrieved on a subsequent day, data from multiple records are output in the order they were input (i.e. in time stamp order).

Processing for appointment treatment is described next. A patient who has made an appointment for diagnosis or treatment can submit his or her treatment card directly to the examination unit 105 and thereupon receive an examination. More specifically, when the patient submits his or her treatment card to the receptionist in the examination unit 104, an office worker reads the treatment card with a card reader (S111). After the patient's medical information has been verified (S112), the patient is examined, as noted above (S113 and following).

Voucher design processing is the same as was described in the first embodiment, so no description thereof is given here.

In cases where a medical information database has already been brought on line in the hospital, the medical information input system in this embodiment can be set up while using the existing database. If the data code formatting (such as for data arrays, for example) in the existing database differs from the data code formatting in this embodiment, however, it will be necessary to make the two conformable. In that case, it is preferable that the following processing be done when designing vouchers.

Let it be assumed that a voucher has been designed comprising items A to E, as diagrammed in FIG. 59. Ordinarily, the data contained in one voucher, i.e. the data in items A to E here, are combined and stored in a database as one record. However, if the record in the existing database employs data arrays like the one represented in the lower tier in FIG. 60, it will be necessary to alter the arrangement of the data in items A to E to conform to that array. Thereupon, the voucher design processing to which this embodiment pertains is devised so that the output format of data records can be designated. More specifically, when an operator designates an array for the data in items A to E on the display screen, the input data array (upper tier in FIG. 60) is automatically converted to the existing database data array format (lower tier in FIG. 60). Thus it is possible to set up the medical information input system in this embodiment in a hospital while maintaining compatibility with a preexisting database. In addition to designating the data arrays, it is of course also possible to designate data length (character digits), character types, and other data attributes.

Figure 55:
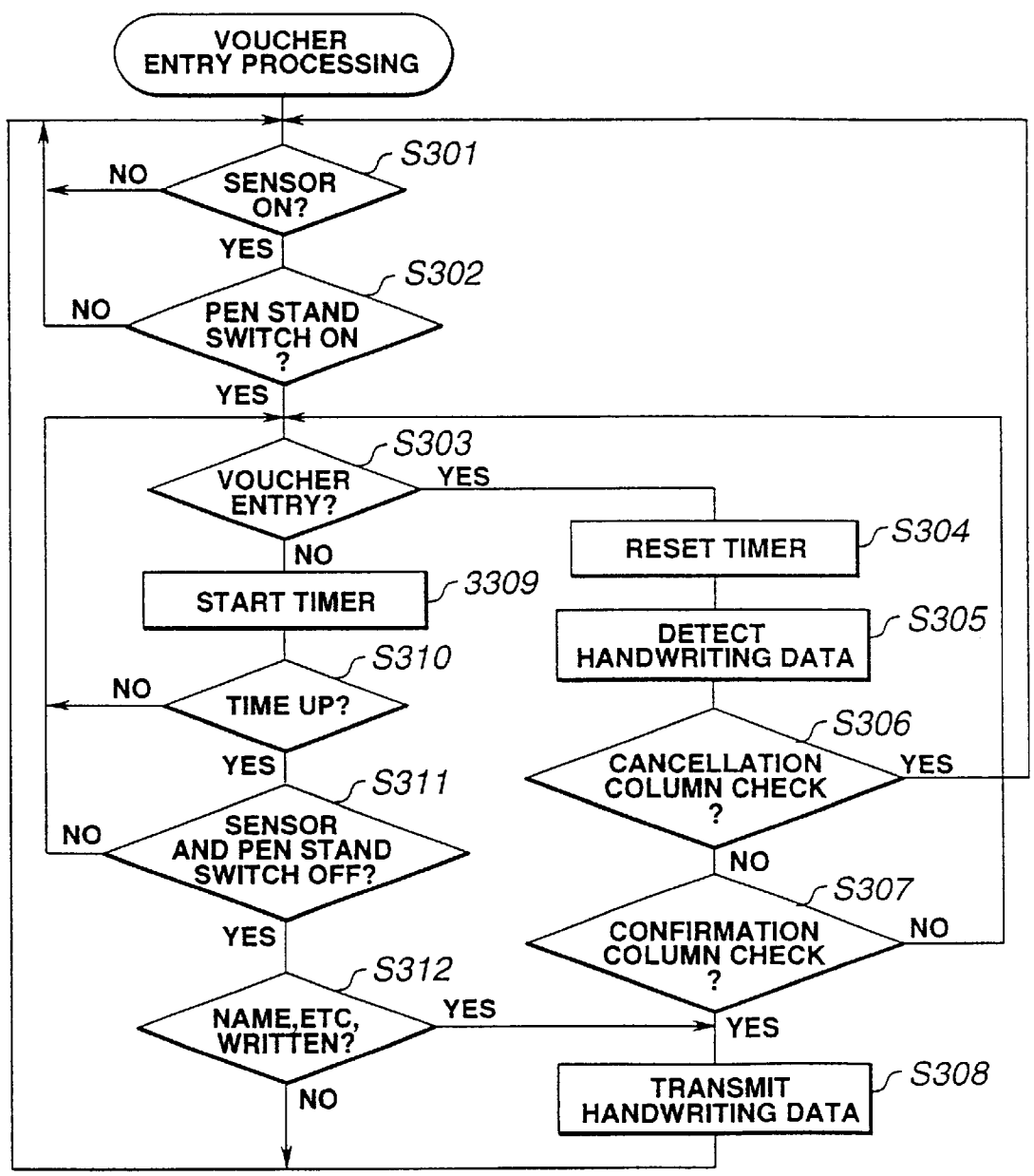
FIG. 55 is a flowchart for describing voucher content processing in the 11th embodiment.

In FIG. 55 is given a flowchart for new patient application form entry processing. First, the new patient terminal 101 determines whether the sensor 1a is on or not, that is, whether or not a patient is positioned in front of the new patient terminal 101 (S301). If the sensor 1a is off (No in S301), the new patient terminal 101 continues to execute this routine S301 until the sensor 1a turns on. When a patient is positioned in front of the new patient terminal 101 and the sensor 1a is on (Yes in S301), the new patient terminal 101 determines whether the switch 1b is turned on or not (S302).

If the pen 1c has not been lifted by the patient from the pen stand, and is still in the pen stand, the switch 1b continues in the off condition (No in S302). In this case, the new patient terminal 101 continues to monitor the status of the sensor 1b and switch 1c (S301 and S302). When the patient has lifted the pen 1c from the stand, and the switch is turned on (Yes in S302), the routine from S303 on is executed.

In S303, the new patient terminal 101 determines whether the patient is entering characters on the new patient application form, that is, whether the point of the pen 1c is in contact with the surface of the reading apparatus 10 or not. Let it be assumed here that the patient has picked a voucher up off of the new patient terminal 101 and placed it on the reading apparatus 10. When the patient touches the voucher with the point of the pen 1c, the reading apparatus 10 detects that characters, etc., have begun to be written on the new patient application form (Yes in S303). Thereupon, the new patient terminal 101 resets a timer that indicates the time that characters are not being entered (S304). This timer counts up as time elapses, indicating the time elapsed since the point of the pen 1c was removed from the surface of the new patient application form. In S305, the reading apparatus 10 reads the coordinates (X coordinate and Y coordinate) of the point of the pen 1c, and temporarily stores these coordinates as handwriting data in memory in the reading apparatus 10.

Next the new patient terminal 101 determines whether or not a mark has been entered in the cancellation column on the new patient application form, and if it determines that no such mark has been entered (No in S306), it continues to execute the routine from S307 on. When a mark has been entered in the cancellation column (Yes in S306), the new patient terminal 101 suspends detection of handwriting data and returns to standby status (S301).

On the other hand, if no mark is made in the cancellation column (No in S306), the new patient terminal 101 determines whether a mark has been made in the confirmation column, that is, whether the patient has made a mark in the confirmation column after entering all necessary information (S307). When no mark has been entered in the confirmation column (Yes in S307), it is assumed that the patient will continue to make entries in the voucher, so the new patient terminal 101 returns to S303 and continues to detect handwriting data. While the patient is entering characters, etc., in the new patient application form, the new patient terminal 101 continues to execute the subroutines for timer reset (S304), handwriting data detection (S305), and cancellation/confirmation check (S306, S307).

When the patient has finished making all entries of necessary information on the new patient application form, in this fashion, and makes a mark in the confirmation column, the new patient terminal 101 transmits the handwriting data stored in the reading apparatus 10 to the central processing unit 104 (S308), and returns to standby status (S301). Together with the handwriting data, data (time stamp data) indicating the time of transmission and the terminal number of the new patient terminal 101 are transmitted to the teller central processing unit 104.

When in S303 the new patient terminal 101 determines that characters are not being entered on the new patient application form, that is, that the point of the pen 1c is not in contact with the new patient application form, the new patient terminal 101 advances the timer noted earlier (S309). If the timer has not reached a certain value (No in S310), the new patient terminal 101 again determines whether or not characters are being entered on the new patient application form (S303). In the case where a patient notices an error while entering characters on a new patient application form and allows the new patient application form to stay in that condition, the no-character-entry time exceeds a certain value, and the timer reaches a certain value (Yes in S310). Thereafter, the new patient terminal 101 determines whether the sensor 1a or the switch 1b has turned off (S311). More specifically, when a patient has moved away from the new patient terminal 101, or has returned the pen 1c to the pen stand (Yes in S311), the new patient terminal 101 determines whether or not at least a name and address have been entered on the new patient application form (S312). When it determines thereby that a name and address have been entered on the new patient application form (Yes in S312), these handwriting data are transmitted to the new patient reception unit 102 (S308). In other words, even if no mark is made in either the cancellation or confirmation column, so long as a name and address have been entered, these handwriting data are treated as valid entries. Accordingly, even if a patient forgets to mark the cancellation or confirmation column, he or she can still be called to the counter. As will be described subsequently, however, if the patient has still not appeared at the counter after a certain time has elapsed since he or she was called, it is likely that the new patient application form has been voided, so the handwriting data pertaining to that patient are cancelled. In cases where it is determined in S312 that no name, etc., has been entered, however, the new patient terminal 101 returns the processing to S301, and waits for another patient to come.

In a modification of the voucher entry procedures described above, the S312 subroutine may be left out. That is, when time runs out before a mark is made in either the cancellation or confirmation column, the detected handwriting data may be treated as invalid.

Furthermore, in the S306 subroutine described above, when an erroneous character, etc., has been written on the voucher, it is possible to have that voucher cancelled. Also, the processing described in the foregoing is not limited to new patient application forms, but may be applied to all voucher entry processing in the hospital.

Counter processing is now described.

Figure 56:
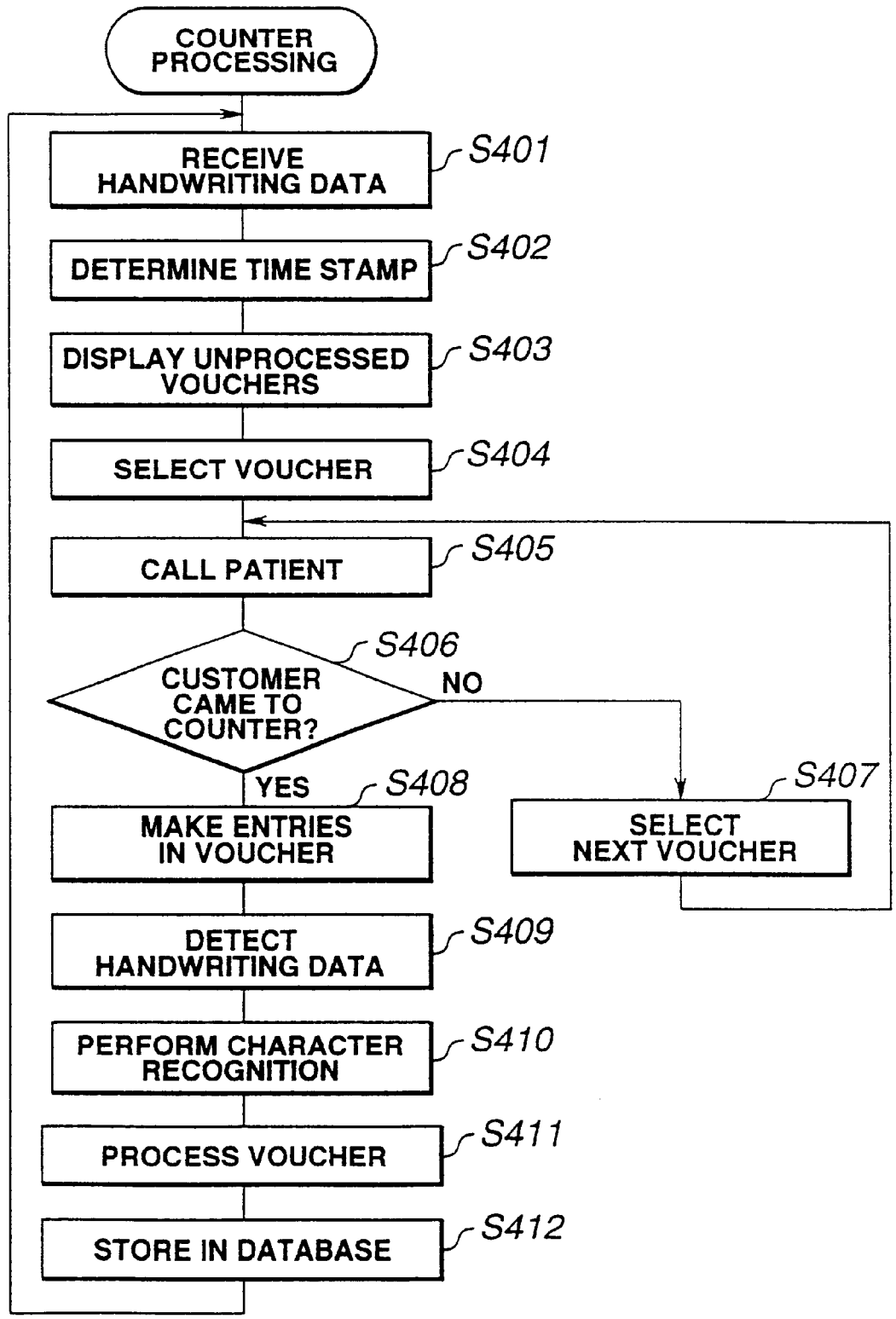
FIG. 56 is a flowchart for describing counter processing in the 11th embodiment.

In FIG. 56 is given a flowchart for counter processing routines. This processing is executed primarily by the new patient reception unit 102 and the central processing unit 104. First, the central processing unit 104, after receiving handwriting data from the new patient terminal 101 (S401), examines the time stamp applied to the handwriting data (S402). The central processing unit 104 then transmits the handwriting data from unprocessed vouchers, in the order of time stamp seniority, to the new patient reception unit 102. Thereupon, the unprocessed vouchers are displayed on the computer 102a in the new patient reception unit 102 in the order of time stamp seniority (S403). The vouchers displayed on the computer 102a are images reproduced from handwriting data. However, recognized character strings (text data) based on handwriting data may also be displayed on the computer 102a.

The new patient reception unit 102 automatically selects the displayed voucher having the oldest time stamp (S404). Alternatively, an office worker may select a voucher from among those displayed on the computer 102a. The new patient reception unit 102 performs character recognition on the handwriting data for the name on the voucher, and displays the patient name that is the character string resulting from the character recognition on the advisory display panel 2d, thereby calling that patient to the counter (S405). A plurality of patient names may also be displayed on the advisory display panel 2d, in which case patients can estimate roughly when they will be called. Or a speech synthesizer apparatus (not shown in the drawings) may be used to call patients' names.

If the patient does not appear at the counter before a certain time elapses after the patient is called (No in S406), it is possible that the patient has left the building carrying his or her voucher. In such cases, therefore, the next voucher in order is selected (S407), and the order of voucher processing for the non-appearing patient is moved back. Then, if that patient does eventually appear at the counter, the office worker can call up the handwriting data concerning that patient from memory and process the voucher. However, the handwriting data for a patient called hours earlier (say six hours earlier, for example) will be automatically deleted from the database 104a in the central processing unit 104. Thus the memory can be kept from overflowing due to too great a volume of handwriting data.

When, however, a patient does appear at the counter (Yes in S406), the office worker receives the voucher from the patient, and places it on the reading apparatus 10. In this case, it is preferable that the voucher be placed in a predetermined position on the reading apparatus 10. When that is done, the host computer 104 can accurately determine the columns in which any additional information has been entered on the voucher by a office worker.

The office worker, in addition to entering necessary information (such as insurance card number, etc.) outside the heavy black lines on the voucher on the reading apparatus 10, also enters any necessary information within the heavy black lines that has been omitted (S408). The reading apparatus 10 detects the changes in the coordinates of the point of the pen as handwriting data (S409), and stores these in memory. The computer 102 corrects the coordinate values in the handwriting data entered by the office worker, and generates handwriting data from relative coordinates which are relative to standard coordinates on the voucher (such as, for example, the coordinates of the lower left corner of the voucher). Also, since the voucher is placed in a predetermined position on the reading apparatus 10 by the office worker, the relative coordinates can be easily calculated.

The new patient reception unit 102 furthermore, as in the first embodiment, makes corrections to the coordinate values in the handwriting data input by patients. Two types of corrected handwriting data (patient handwriting data and office worker handwriting data) are mutually associated and one set of handwriting data is generated corresponding to one voucher. The host computer 104*a* then performs character recognition on this set of handwriting data (S410). The character recognition procedures will be described in detail subsequently, but are described generally here. First, in performing character recognition, the allowable characters are determined beforehand, and these characters are input to the reading apparatus 10. The characters written on the reading apparatus 10 are stored in the database 104*b* as basic handwriting data. The basic handwriting data most similar to the handwriting data that are to be recognized are retrieved, and the characters corresponding to these basic handwriting data are output as identification results. Alternatively, image data (data resulting from coordinate functions) based on handwriting data may be generated, and character recognition based on those image data may also be performed. By performing character recognition using both handwriting data and image data, it is possible to improve the recognition rate.

Recognized character strings are displayed on the computer 102*a* together with images of vouchers reproduced from the handwriting data. By comparing these, the office worker can discover erroneous recognition results, and thereby prevent mishaps from happening. When character strings (patient name, etc.) based on handwriting data are recognized, the host computer 104*a* processes the voucher (S411). The host computer 104*a* first identifies the voucher type. The identification of the voucher type can be done by having an office worker input a designation to the computer 102*a*, or the type may be determined from the information written on the voucher.

After the voucher type has been identified the host computer 104*a* executes processing according to the voucher type (S411). If the voucher is a new patient application form, for example, the host computer 104*a* performs such processing as registering the patient's ID. When voucher processing has been completed, the host computer 104*a* stores these image data, handwriting data, time stamp data, and patient ID data, etc., in the database 104*a* (S412). The counter processing described in the foregoing is not limited to processing conducted in the new patient reception unit 102, but may be applied to operations in the examination unit 105, block reception unit 109, cashier unit 111, or pharmacy unit 112.

Character recognition processing is performed as in the first embodiment.

A variation of this embodiment is now described.

Figure 57:
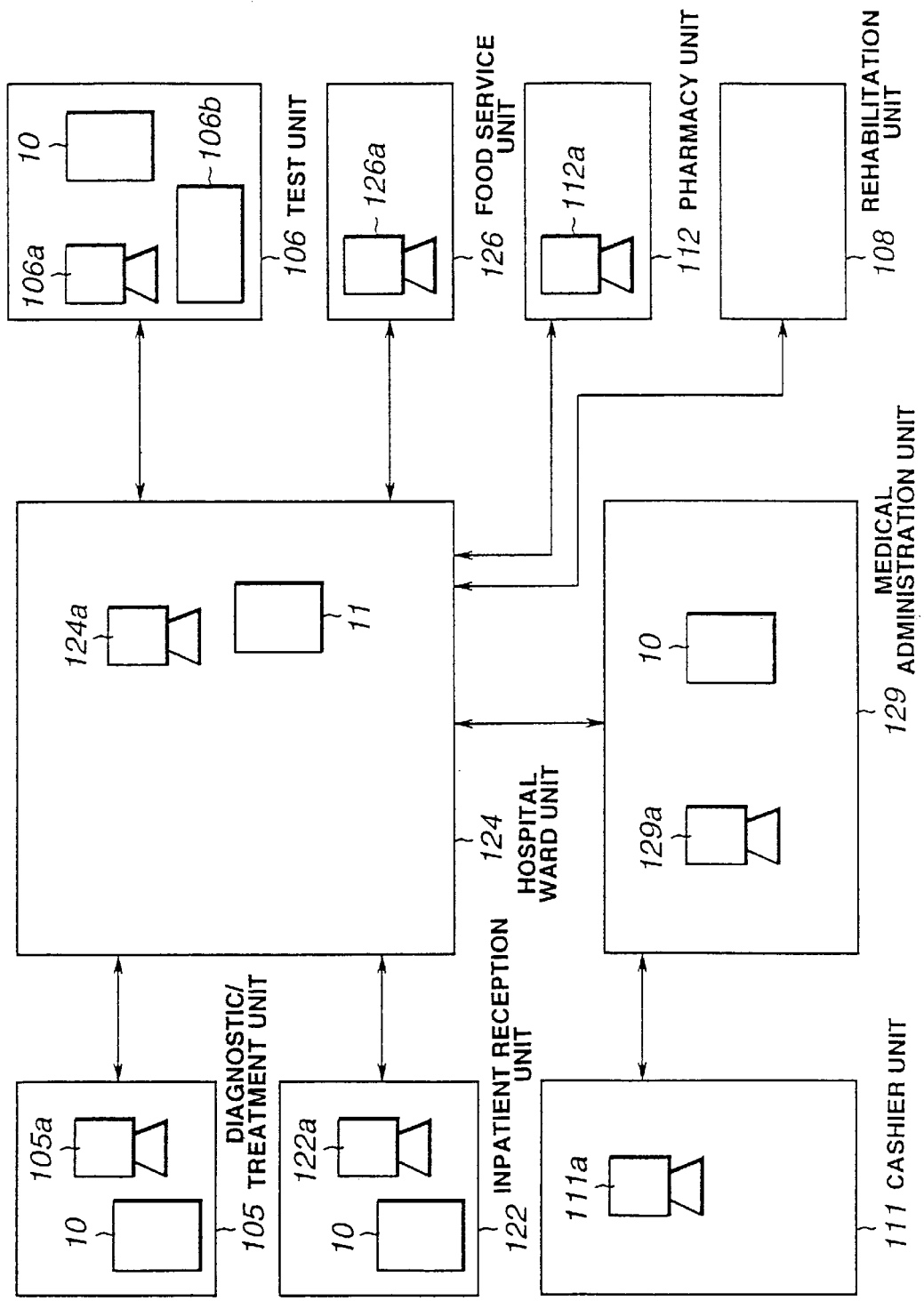
FIG. 57 is a block diagram for a variation of the medical information input system in the 11th embodiment.

FIG. 57 diagrams a variation of the medical information input system in this embodiment. The medical information input system diagrammed in this figure is for use in a hospital ward and comprises a treatment unit 105, in-patient reception unit 122, ward unit 124, food service unit 126, medical administration unit 129, examination unit 105, test unit 106, pharmacy unit 112, and cashier unit 111. Although not so shown in this figure, the units diagrammed here are connected to the central processing unit 104 in the first embodiment.

In FIG. 57, the ward unit 124 comprises a computer 124*a* and reading apparatus 11, and performs treatments on and manages hospitalized patients. The reading apparatus 11 comprises a card reader, batteries, and infrared communications features, etc., and can be used as a portable device. When a physician and a nurse make rounds to see hospitalized patients, the nurse carries the reading apparatus 10, and can thus record the results of examinations on vouchers thereon. The food service unit 126 is provided with a computer 126*a*. On this computer 126*a* are displayed, for each patient, a food menu prepared by a nutritionist. Food preparation specialists can thus prepare meals according to these menus. The medical administration unit 129 comprises a computer 129*a* and reading apparatus 10, and performs administrative tasks concerning hospitalization and release from hospital. The reading apparatus 10 is used for entering information on vouchers pertaining to hospitalization and release from hospital. The examination unit 105, test unit 106, pharmacy unit 112, and cashier unit 111 are configured as in the first embodiment, and the same reference characters are used in the drawings, so no further description thereof is given here.

Figure 58:
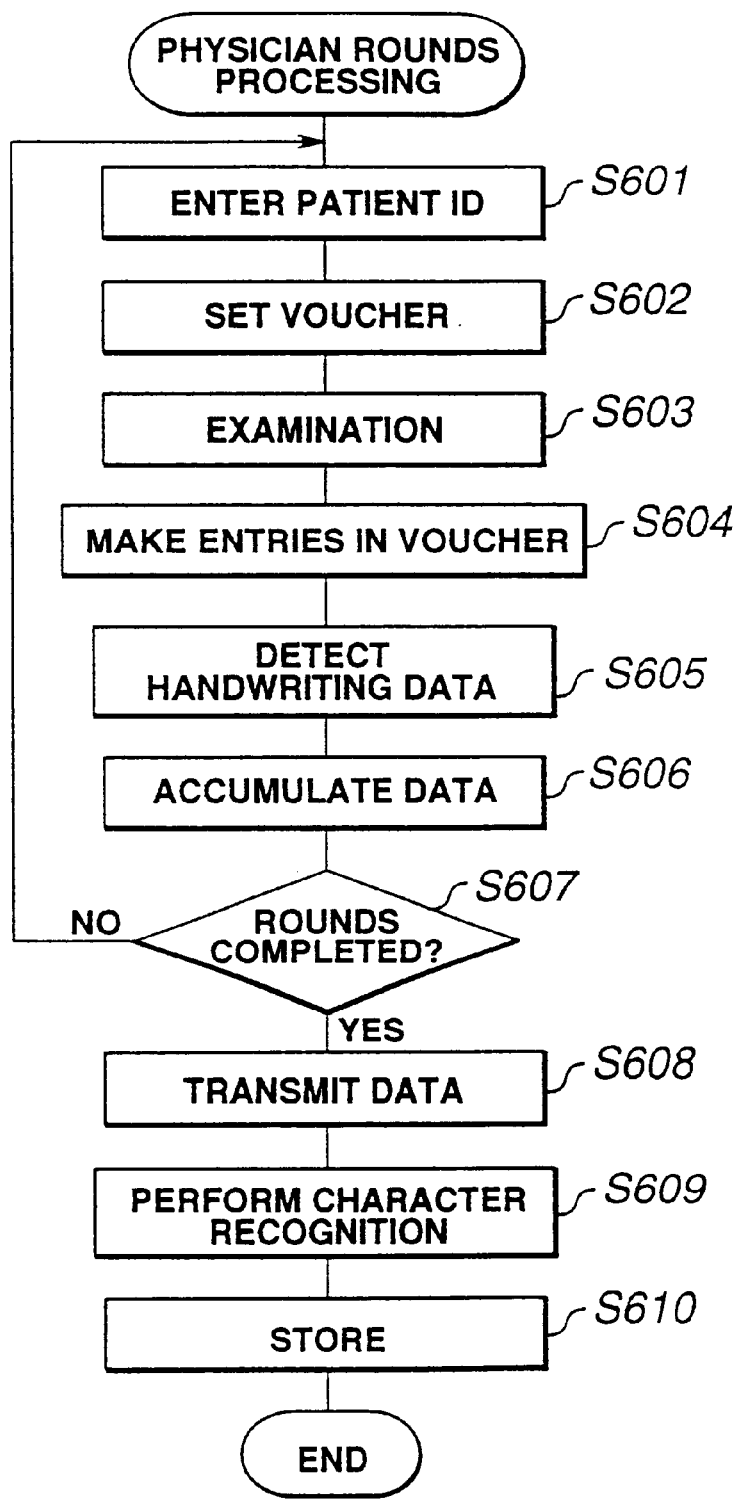
FIG. 58 is a flowchart for describing patient visitation processing in a variation of the medical information input system in the 11th embodiment.

Physician's examining rounds processing in this variation is described next, making reference to FIG. 58. First, a physician and a nurse, taking the reading apparatus 11 in hand, walk up to the bed of a hospitalized patient. The nurse reads the patient's treatment card using the card reader on the reading apparatus 11, and stores the patient ID in memory in the reading apparatus 11 (S601). Next, the nurse places a voucher on the reading apparatus 11 (S602), and the physician examines the patient (S603). The results of this examination are entered on a voucher on the reading apparatus 11 by either the physician or the nurse (S604), and the resulting handwriting data are stored in memory in the reading apparatus 11 together with the patient ID and time stamp (S605 and S606).

In this fashion, the above processing routines S601 to S607 are executed repeatedly until rounds have been made to all of the hospitalized patients. The voucher on the reading apparatus 11 is replaced for each patient. When all of the hospitalized patients have been completely processed (Yes in S607), the physician and nurse return to their ward room, etc., and transfer the handwriting data stored in the reading apparatus 11 to the computer 124*a* (S608). This data transfer may also be performed using the infrared communication features provided in the reading apparatus 11. Alternatively, data transfers can be conducted using memory cards. The vouchers used on the reading apparatus 11 are retained in a records retention unit (not shown).

The handwriting data, patient ID, and time stamp data sent to the computer 124*a* are from there sent to the host computer 104*a* together with the reading apparatus 11 identification data. The host computer 104*a* performs character recognition on the handwriting data, and stores the recognized character strings, handwriting data, time stamp data, and identification data in a medical information file for each patient ID (S610). The recognized character strings are returned to the computer 124*a*, so that a physician, etc., can verify examination results while viewing recognized character strings displayed on the computer 124*a*.

The vouchers used for the examining rounds may also be of two types, namely one type for nurses and one type for physicians. In other words, a voucher form may be prepared for nurses for entering patient temperatures and blood pressures, etc., and another voucher form prepared for physicians for entering observations made on the patient's condition.

Also, a reading apparatus 11 may be installed at each patient s bedside. In that case, it is preferable that the reading apparatuses 11 be connected via communications cable to the host computer 104*a*. By installing a reading apparatus 11 at each bed, information entered by patient can be communicated in real time to a nurse at a nurse station. This also permits a patient unable to converse freely to communicate with the nurses.

Based on this embodiment, as described in the foregoing, the following advantages can be realized.

Firstly, medical information can be input to a computer while making entries in a medical record. Thus a physician, etc., need only enter the results of an examination in the record as conventionally, with there being no need to input medical information using a keyboard, etc. Based on this embodiment, moreover, it is possible to implement computer management of medical information without greatly altering the operations in the hospital. Also, in addition to medical information being input to computer, such information is also entered to the medical records as conventionally, so that the legal obligations of maintaining records can be satisfied.

Secondly, the entry of erroneous data can be avoided. Based on this embodiment, because there is no need to key in information entered on medical records, etc., data entry errors that develop during key entry can be avoided. Thus treatment mistakes and medical accounting errors can also be prevented.

Thirdly, medical services can be provided smoothly. Based on this embodiment, there is no need to input information entered on a medical record again from a keyboard, wherefore medical information entry work can be reduced.

Fourthly, it is rendered very difficult to make unauthorized alterations in the medical records. Based on this embodiment, medical information is retained in the form of data and also in the form of conventional medical records, making it very difficult to alter the results of an examination.

(Other Modifications)

The present invention is not limited by the embodiments described in the foregoing, but may be implemented in modified form so long as the fundamental theory of the present invention is not departed from.

(1) Re Character Recognition

In the embodiments described in the foregoing, character recognition based on image data and character recognition based on handwriting data may be conducted together. When the results of both modes of recognition agree, those recognition results may of course be used. When both modes of recognition do not agree, it is possible to inform an operator of the accuracy of the character recognition by calculating a degree of ambiguity. More specifically, with respect to the results of both modes of recognition, a degree of ambiguity expressed by a flag or numerical value may be calculated, and this degree of ambiguity displayed on the display monitor of the computer 20.

Because both the degree of ambiguity and the recognized characters can be displayed together, the operator can verify the accuracy of character recognition by looking at this display. when the two modes of recognition agree, on the other hand, the results of the recognition will be displayed on the computer monitor as recognized characters. Thus even more accurate character recognition can be performed. By performing character recognition that also considers pen pressure, character recognition can be performed with still higher accuracy. The system of the present invention, moreover, is not confined to the range of applications noted in the foregoing, but can be applied in any field of business where both paper records and data processing are required. Specifically, the paper form itself, after being filled out, is removed from the reading apparatus and can be used and retained, while the content of the entries made thereon can be recorded, processed, aggregated, and otherwise managed in a computer as recognizable character information or image data.

(2) Re Configuration

As explained in conjunction with the embodiments described in the foregoing, the present invention need not be configured with separate reading apparatuses that generate handwriting data, character recognition apparatuses that perform character recognition, and business processing apparatuses that perform business processing, but may be configured as expedient. More specifically, by combining handwriting data generating functions and character recognition functions in the reading apparatus, the character recognition apparatus can be eliminated. Or, alternatively, by combining business processing functions together with character recognition functions in the business processing apparatus, the character recognition apparatus can be eliminated.

(3) Applicable Business Management

The business management system of the present invention is not limited to the applications represented by the embodiments described in the foregoing, but is also applicable to many other business management systems.

The present invention can also be applied to a retrieval system, for example. When applied to a book retrieval system, a list is configured so that book titles, authors' names, and publishing companies can be entered. In the business processing apparatus 4, a database is provided, meanwhile, wherein book data are classified according to the information categories in the list. When a user places this list on a reading apparatus 10, and enters the information categories known to him or her, the business processing apparatus 4 extracts the relative records from the database and transmits them so that they may be displayed on the reading apparatus. The user can thus view this display and obtain information such as whether the book he or she wants is available.

When the application is to a case retrieval system, the list is configured with entry columns wherein a number of key words can be entered. The business processing apparatus 4, meanwhile, is provided with a database wherein cases are recorded in the form of records. When the user places this list on the character recognition 10 and enters key words for the case or cases being searched for, the business processing apparatus 4 searches the case information in the database for those key words, extracts cases containing those key words, and transmits those data so that they can be displayed on the reading apparatus 10. The user can thus look at this display to find the titles and content of the case or cases sought.

The present invention may also be applied to all kinds of other business. In an office or factory, for example, it can be used for managing order vouchers, as noted earlier, or purchase vouchers, for inventory management, for personnel attendance reports, for deposit and withdrawal processing, for sales reports, for material use reports, and for production processing step reports, etc. In such applications as these, in terms of writing media, vouchers used in the office or factory would be prepared for personnel attendance reports, deposits and withdrawals, incoming and outgoing inventory lists, sales reports, material use reports, and production processing step reports, etc. On sites where sales activities are being conducted, the present invention can be used for receiving and making orders for products, applications, estimates, delivery verification, construction work management, customer management, and various reports, etc. In such applications as these, in terms of writing media, various kinds of vouchers would be prepared for receiving and placing orders, applications, estimates, delivery verification, construction work management, customer management, and reports.

On sites where customers are being negotiated with, the present invention can be used for questionnaires, receiving complaints, and marketing activities, etc. In such applications as these, in terms of writing media, forms for handling marketing activities would be prepared.

Applications are also possible in other specialized operations, such as in traffic law enforcement, police questioning, traffic reports, and citation documents, etc., in law enforcement operations; medical records preparation and diagnosis/treatment reports, etc., in medical facilities; inspection reports, construction site worker reports, equipment transport reports, material procurement reports, and progress reports, etc., in construction operations; automobile maintenance checks in automobile maintenance operations; moving estimates, and moving article lists, etc., in moving operations; as well as product replenishment reports for vending machines and sales payment reports, etc. When used in applications like these, accounting documents, etc., would be prepared for use in such specialized operations as police questioning, traffic reports, citation documents and other memoranda, hospital records, diagnosis/treatment reports, test reports, construction site worker reports, equipment transport reports, material procurement reports, progress reports, automobile maintenance checks, moving estimates, moving lists, vending machine produce replenishment reports, and sales payment reports, etc.

INDUSTRIAL APPLICABILITY

Based on the present invention, which is configured such that handwritten content can be directly input to a computer, the following benefits can be realized.

Firstly, the busy work of keyboard entry associated with inputting ordinary writing media to computer can be avoided. More specifically, handwriting data are detected by a reading apparatus simultaneously with entries made on the writing media, which handwriting data are transmitted to character recognition means. Thus there is no need for an operator to key in information entered on the writing media, wherefore the operator work burden can be reduced. Furthermore, because filled-out writing media in which entries have been made on a reading apparatus remain close to hand, in operations where there is a legal requirement to retain the writing media, the present invention offers the benefit of reducing the redundant work involved in making handwritten copy and keyboard entry.

Secondly, the data input errors associated with keyboard entry can be avoided. Based on the present invention, the information written on the writing media is input in the form of handwriting data, so there is no need to key in the written information. Accordingly, it is possible to avoid the input errors associated with keyboard entry. When this is done, erroneous entries can be eliminated, wherefore, in cases where there are irregularities in the entries themselves made by hand on the writing media, the present invention is effective in permitting error checks to be made.

Thirdly, it is possible to process purchasing and accounting operations very quickly. Simultaneously with the making of entries in writing media and accounting documents, the resulting handwriting data are detected by a reading apparatus. For this reason, accounting operations can be settled on a daily basis, and, in ordering and purchasing operations, delivery delays can be avoided.

Based on the present invention, moreover, a configuration is provided wherewith time information is combined with written information, whereby data alteration and other wrongful processing operations can be prevented.

Based on the present invention, a configuration is provided wherewith certification information can be read, whereby improper writing media and unauthorized vouchers can be recognized and eliminated.

Based on the present invention, a configuration is provided wherewith handwriting can be read, even at indoor or outdoor sites where no cable connections are available, wherefore all kinds of operations can be made more efficient.

Based on the present invention, a configuration is provided wherewith it is possible to display responses to handwritten particulars, indoors or out, wherefore response information needed at the site can be provided quickly.

Based on the present invention, a configuration is provided wherewith corrections can be made when writing media are not positioned correctly, wherefore entries can be made without paying great attention to the position in which the writing media are loaded.

Based on the present invention, a configuration is provided wherewith it is possible to extract character information from handwriting entered on writing media, wherefore characters on the writing media can be accurately and efficiently recognized.

Based on the present invention, a configuration is provided wherewith deletions and corrections made to handwriting content in writing media can be read, wherefore the correct information can be recognized even when there are such deletions or corrections.

Based on the present invention, a configuration is provided wherewith writing media can be designed, wherefore it is possible to design writing media in any format desired.

Based on the present invention, a business management system is provided suitable for processing complaints as part of business management.

Based on the present invention, a business management system is provided suitable for managing inventory as part of business management.

Based on the present invention, a business management system is provided suitable for handling office work as part of business management.

Based on the present invention, a business management system is provided suitable for managing bidding as part of business management.

Based on the present invention, a business management system is provided suitable for processing scoring as part of business management.

Based on the present invention, a business management system is provided suitable for handling ticket sales as part of business management.

Based on the present invention, a configuration is provided wherewith, both indoors and out, handwritten data can be immediately subjected to character recognition and directly used in business processing, wherefore indoor and outdoor business processes can be greatly simplified. Accordingly, intermediate expenses can be cut in all kinds of operations, leading to reductions in product and service costs.

Based on the present invention, a configuration is provided wherewith, both indoors and out, responses to handwritten particulars can be displayed, wherefore response information needed in the field in questionnaire surveys or police questioning can be provided very promptly. Accordingly, conventionally impossible questionnaire surveys can be made, and the contact operation that in conventional police questioning must be made separately from the information entry operation is rendered unnecessary, wherefore services can be diversified and work times shortened.

Based on the present invention, ticket purchases can be made conveniently at sales locations available everywhere, such as at the nearest convenience store. Accordingly, the opportunities for purchasing tickets that conventionally have been restricted are immediately multiplied, and it is possible to provide systems convenient to both vendor and purchaser.

What is claimed is:

1. A business management system comprising:
   a reading apparatus, which comprises a structure that secures a writing medium to be handwritten upon and detects coordinates of a pen point while items are being written by pen on said writing medium, and generates and transmits handwriting data representing, for each writing medium, coordinate changes over time for said pen point;
   a character recognition apparatus that performs character recognition on said handwriting data; and
   a business processing apparatus that executes prescribed business processes based on recognized character strings;
   said reading apparatus is configured so that one writing medium can be selected from among one or more types of writing media by the operations of a writer; and
   said character recognition apparatus comprises:
      means for referencing style definition data that specify a format for a writing medium selected by said reading apparatus, and performing position correction processing on a writing medium based on said handwriting data transmitted from said reading apparatus; and
      means for performing character recognition on said handwriting data while referencing said style definition data after position correction.

2. The business management system according to claim 1, wherein said means for performing position correction processing in said character recognition apparatus comprise: means for detecting relative positions of said handwriting with respect to said reading apparatus based on said handwriting data; and means for determining relative position of said writing medium with respect to said reading apparatus based on said style definition data and on relative positions of said handwriting with respect to said reading apparatus.

3. The business management system according to claim 2, wherein: said means for detecting relative positions of said handwriting detect relative positions of handwriting entered in a plurality of mandatory entry columns wherein entries must always be made, with respect to said reading apparatus; and means for determining relative position of said writing medium determine orientation of said writing medium with respect to said reading apparatus, based on relative positions of handwriting entered in said mandatory entry columns, with respect to said reading apparatus.

4. The business management system according to claim 2, wherein means for performing position corrections in said character recognition apparatus comprise correction means for correcting positional displacements of said writing medium with respect to said reading apparatus, based on relative positions of said writing and on relative positions of said handwriting medium with respect to said reading apparatus.

5. The business management system according to claim 2, wherein means for performing position corrections in said character recognition apparatus detect inclinations in said writing media based on relative positions of said handwriting and on relative positions of said writing medium with respect to said reading apparatus, and correct inclinations in said writing media.

6. The business management system according to claim 1, wherein said character recognition apparatus comprises: means for segregating characters, symbols, figures, and character and symbol groups configuring character strings representing handwriting data transmitted from said reading apparatus; and means for performing character recognition on said segregated characters, symbols, figures, and character and symbol groups and converting them to recognized character strings made up of character codes.

7. The business management system according to claim 6, wherein means for converting to recognized character strings in said character recognition apparatus perform character recognition based on direction elements that indicate directions from one sampling point to next sampling point, including position where handwriting begins and position where handwriting ends.

8. The business management system according to claim 6, wherein means for converting to said recognized character strings in said character recognition apparatus prohibit recognition of character strings over which special predetermined have been written, upon detecting such overwritten character strings in recognized character strings, and, upon detecting character strings written above or alongside said overwritten character strings, perform character recognition on said character strings written above or alongside, and insert those character strings in said recognized character strings, in place of character strings overwritten by said special graphics.

9. A business management system comprising:
   a reading apparatus, which comprises a structure capable of securing a voucher or other writing media, that secures a writing medium and detects coordinates of a pen point while items are being written by pen on said writing medium, and generates and transmits handwriting data representing, for each writing medium, coordinate changes over time for said pen point;
   a character recognition apparatus that performs character recognition on said handwriting data, wherein said character recognition apparatus, upon recognizing that a predetermined type of character, symbol, or graphic has been entered at four corners or other predetermined complete-text-deletion columns in said writing medium, determines that said writing medium, in its entirety, is to be designated for deletion; and
   a business processing apparatus that executes prescribed business processes based on recognized character strings;
   said reading apparatus is configured so that one writing medium can be selected from among one or more types of writing media by the operations of a writer; and
   said character recognition apparatus comprises:
      means for referencing style definition data that specify a format for a writing medium selected by said reading apparatus, and performing position correction processing on a writing medium based on said handwriting data transmitted from said reading apparatus; and
      means for performing character recognition on said handwriting data while referencing said style definition data after position correction.

10. A business management system comprising:
    a reading apparatus, which comprises a structure capable of securing a voucher or other writing media, that secures a writing medium and detects coordinates of a pen point while items are being written by pen on said writing medium, and generates and transmits handwriting data representing, for each writing medium, coordinate changes over time for said pen point;

a character recognition apparatus that performs character recognition on said handwriting data, wherein said character recognition apparatus, upon recognizing that a predetermined type of character, symbol, or graphic has been entered at beginning of each entry line or other predetermined record-deletion columns in said writing medium, determines that recognized character strings based on handwriting data entered in entry lines corresponding to said record-deletion columns are to be designated for deletion; and a business processing apparatus that executes prescribed business processes based on recognized character strings;

said reading apparatus is configured so that one writing medium can be selected from among one or more types of writing media by the operations of a writer; and said character recognition apparatus comprises:

means for referencing style definition data that specify a format for a writing medium selected by said reading apparatus, and performing position correction processing on a writing medium based on said handwriting data transmitted from said reading apparatus; and means for performing character recognition on said handwriting data while referencing said style definition data after position correction.

11. The business management system according to claim 1, wherein said character recognition apparatus is configured so that new style definition data can be designed by connecting said reading apparatus, and so that, when data representing a plurality of coordinates are input from said reading apparatus while designing style definition data, a range specified by said plurality of coordinates can be set as a new entry column in said new style definition data.

12. The business management system according to claim 11, wherein means for setting style definition in said character recognition apparatus are configured so that, when said one entry column has been set, attributes of said entry column can be set together therewith.

13. The business management system according to claim 1, wherein: said reading apparatus comprises an output circuit for outputting data inclusive of said handwriting data so as to be compatible with a bus standard, and an input/output slot configured to permit the output of data inclusive of handwriting data output from said output circuit; and said input/output slot is configured so that a portable information communications device capable of radio-communicating data inclusive of said handwriting data can be attached thereto.

14. The business management system according to claim 1, wherein said reading apparatus is configured so that time stamp data indicating a time of creation, at prescribed timing intervals, when said handwriting data are generated, are incorporated in said handwriting data; said character recognition apparatus is configured so that, among said handwriting data sent from said reading apparatus, handwriting data pertaining to a signature can be output without modification to said business processing apparatus; and said business processing apparatus is configured so that, when handwriting data pertaining to a signature are contained in said handwriting data, said handwriting data pertaining to said signature can be compared against pre-registered compara-tive data, and so that a determination can be made as to whether or not said signature is proper based on time stamp data contained in said handwriting data pertaining to said signature.

15. The business management system according to claim 14, wherein said business processing apparatus accumulates usage times for each said reading apparatus, based on time stamp data contained in said handwriting data, and performs prescribed business processing according to accumulated usage times.

16. The business management system according to claim 1, wherein said business processing apparatus comprises: means for sequentially reading time stamp data contained in said handwriting data; and means for performing prescribed processing on said handwriting data when said time stamp data so read indicate that some data were recorded after a certain time period had elapsed relative to a time or times indicated for other data.

17. The business management system according to claim 16, wherein means for performing prescribed processing in said business processing apparatus, as to said prescribed processing, process said writing medium as invalid when some time stamp data indicate that they were recorded after said certain time period had elapsed.

18. The business management system according to claim 1, wherein said character recognition apparatus is configured so that, when an authorization process indicating that a writing medium subjected to character recognition has been authorized has been implemented by a manager over that character recognition apparatus, seal image data certifying that said writing medium has been authorized can be added to said handwriting data and sent to said business processing apparatus.

19. The business management system according to claim 18, wherein said business processing apparatus permits handwriting data to be processed only when a code has been added to said handwriting data indicating that authorization processing has been performed for that writing medium.

20. The business management system according to claim 1, being a business management system that pertains to an operation process designating system for implementing a certain operation, wherein: said writing medium designates a series of processing procedures for accomplishing said operation, designed with check columns provided for each process, wherein entries are made by a person in charge of implementing said operation; and said business processing apparatus is configured so that said series of operations can, overall, be managed, based on results of having recognized handwriting data on said writing medium, and configured so that, whenever marks are made by said person in charge of implementation in check columns on said writing medium, processes associated with said check columns are executed one by one.

21. The business management system according to claim 1, being a business management system that pertains to a scoring processing system, wherein: said writing medium is an answer sheet designed so as to comprise solution columns for prescribed problems and solution step entry columns therefor; said character recognition apparatus is configured so that handwriting entered in said solution step entry columns can be transmitted as image data to said business processing apparatus; and said business processing apparatus is configured so that, in addition to performing scoring processing, based on recognized character strings, to obtain scores for each examinee, overall averages, averages by problem, deviation values and the like, image displays can be made on an image display apparatus, both of image data entered by said examinees in said solution step entry columns, and of results of said scoring processing.

22. The business management system according to claim 1, being a business management system pertaining to a transaction management system for card use, wherein: said reading apparatus is configured so as to be able to read characters entered on a card use voucher which is said writing medium; said character recognition apparatus is configured so that, upon recognizing that characters other than characters of a predetermined type have been entered in a prescribed column on said card use voucher, said voucher is determined to be invalid, and so that, upon recognizing that characters of said predetermined type have been entered therein, said voucher is determined to be valid; and said business processing apparatus manages card use transactions according to recognized characters on said card use voucher when determined to be valid by said character recognition apparatus.

23. The business management system according to claim 22, wherein said business processing apparatus comprises display means and is configured so that character-recognized names of card users who can be handled at a counter can be specified and their names displayed on said display means.

24. The business method management system according to claim 1, being a business management system pertaining to a transaction management system wherein: said reading apparatus is configured so as to be able to function as a teller processing terminal in reading items from customer vouchers which constitute said writing media; and said business processing apparatus is configured so as to be able to process prescribed teller operations in response to recognized character strings, handles recognized handwriting data as invalid when predetermined columns on said voucher have no entries made therein within a prescribed time interval after the pen point has been removed from said voucher, and processes recognized handwriting data as valid data when entries have been made in said predetermined columns on said voucher.

25. The business management system according to claim 24, wherein said reading apparatus further comprises customer detection means for detecting whether or not a customer has approached said reading apparatus, and handles detected handwriting data as invalid when no special mark has been made in either said confirmation column or said cancellation column, said customer detection means detects that the customer has moved away from the reading apparatus, and no entries have been made in said predetermined columns on said voucher.

26. The business management system according to claim 24, wherein: said reading apparatus is configured so as to be able to transmit said handwriting data after including therein time stamp data indicating time said handwriting data were entered; and said business processing apparatus comprises display means for displaying unprocessed vouchers in chronological order according to said time stamp data, based on said handwriting data and said time stamp data received from said reading apparatus.

27. The business management system according to claim 24, wherein said business processing apparatus recognizes character strings representing at least personal names or organization names in information entered on unprocessed vouchers, and comprises advisory means for making public notice of said character strings to a plurality of customers.

28. The business management system according to claim 27, wherein said advisory means comprise speech synthesis means for reading said character strings representing said personal names or organization names.

29. The business management system according to claim 27, wherein said teller processing terminal moves back the order of processing for a customer when said customer fails to appear at a counter within a prescribed time interval after public notice has been made of said customer's personal name or organization name on said advisory means.

30. The business management system according to claim 24, wherein said character recognition apparatus identifies the type of a voucher by determining whether or not a special mark has been made designating one of a plurality of voucher names listed on said voucher.

31. The business management system according to claim 24, wherein said character recognition apparatus identifies the type of a voucher by determining whether or not an amount has been entered in one of a plurality of amount columns listed on said voucher.

32. The business management system according to claim 1, being a business management system pertaining to a medical information input system, wherein: said reading apparatus is configured so as to be able to generate handwriting data from medical vouchers which constitute said writing media; and said business processing apparatus comprises storage means for storing recognized character strings as medical information data, and moves back processing order for a patient when said patient fails to appear at a counter within a prescribed time interval after public notice has been made of patient's name by a display means.

33. The business management system according to claim 32, wherein said business processing apparatus is configured so as to be able to compare handwriting data for signatures detected by said reading apparatus against pre-registered handwriting data, and permit access to said medical information data when two sets of handwriting data agree.

34. The business management system according to claim 32, wherein said character recognition apparatus comprises a conversion table for converting recognized abbreviated character strings to regular character strings.

35. The business management system according to claim 1, wherein said business processing apparatus comprises a database for prescribed information, searches said database on basis of characters read by said reading apparatus and subjected to character recognition, and extracts information corresponding to said characters.

36. The business management system according to claim 1, being a business management system pertaining to an inventory processing system, wherein: said reading apparatus is configured so as to be able to read inventory lists that constitute said writing media, wherein entries are made by persons in charge of stocktaking; and said business processing apparatus comprises a database for accumulating information on product inventory quantities, searches said database on basis of character strings recognized by said character recognition apparatus, and updates said database with product inventory quantities indicated by retrieved character strings.

37. The business management system according to claim 1, being a business management system pertaining to a ticket reservation and sales system, wherein said reading apparatus reads vouchers which constitute said writing medium comprising entry columns concerning ticket reservation and sales wherein entries are made by a person in charge, and said business processing apparatus comprises a database wherein are recorded remaining numbers of salable tickets, and is configured so as to be able to reference said database when character strings recognized by said character recognition apparatus constitute data indicating a desire to purchase prescribed tickets, and transmit data to said reading apparatus granting permission to sell said tickets when said tickets are still available.

38. A business management method comprising the steps of:

reading card information recorded on a card and transmitting said information to a business processing apparatus;

certifying said card information in said business processing apparatus, and permitting credit card use upon determination that said credit card is proper;

selecting a card use voucher from style definition data specifying a format for a writing medium in a reading apparatus;

entering use amount and signature on the card use voucher in a reading apparatus, using a pen;

transmitting said use amount and signature as handwriting data to said business processing apparatus;

recognizing said use amount in said business processing apparatus by referring to the style definintion data;

certifying said signature in said business processing apparatus by comparing handwriting data for said signature against pre-registered signature handwriting data; and determining whether or not handwriting data for said signature approximates said pre-registered handwriting data, and prohibiting use of said credit card when said two sets of handwriting data do not approximate each one another.

39. The business management method according to claim 38, wherein, in said step for certifying said signature, said signature is certified, recognizable character by recognizable character, based on pre-registered regular stroke orders and stroke orders differing from regular stroke orders.

40. A business management method comprising the steps of:

selecting a medical voucher from style definition data specifying a format for a writing medium available on a portable reading apparatus;

detecting, as handwriting data, results of physician's rounds of hospital ward patients entered on medical vouchers using the portable reading apparatus;

holding said handwriting data in said reading apparatus, ward patient by ward patient;

transferring handwriting data held in said reading apparatus to a character recognition apparatus;

performing character recognition on transferred handwriting data by referring to the style definition data, using said character recognition apparatus; and storing results of said character recognition as medical information data, ward patient by ward patient.

\* \* \* \* \*